US012136039B1

(12) United States Patent
Sather et al.

(10) Patent No.: US 12,136,039 B1
(45) Date of Patent: Nov. 5, 2024

(54) OPTIMIZING GLOBAL SPARSITY FOR NEURAL NETWORK

(71) Applicant: Perceive Corporation, San Jose, CA (US)

(72) Inventors: Eric A. Sather, Palo Alto, CA (US); Steven L. Teig, Menlo Park, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 1065 days.

(21) Appl. No.: 16/923,004

(22) Filed: Jul. 7, 2020

Related U.S. Application Data

(63) Continuation-in-part of application No. 16/684,128, filed on Nov. 14, 2019, now Pat. No. 11,995,533.

(60) Provisional application No. 62/975,539, filed on Feb. 12, 2020, provisional application No. 62/955,349, filed on Dec. 30, 2019, provisional application No.
(Continued)

(51) Int. Cl.
*G06N 3/084* (2023.01)
*G06N 3/048* (2023.01)
*G06N 3/063* (2023.01)
*G06N 5/046* (2023.01)

(52) U.S. Cl.
CPC ............. *G06N 3/084* (2013.01); *G06N 3/048* (2023.01); *G06N 3/063* (2013.01); *G06N 5/046* (2013.01)

(58) Field of Classification Search
CPC ........ G06N 3/084; G06N 3/048; G06N 3/063; G06N 5/046; G06N 3/08; G06N 3/04; G06N 3/06; G06N 5/04
See application file for complete search history.

(56) References Cited

U.S. PATENT DOCUMENTS 5,621,863 A   4/1997 Boulet et al.
5,717,832 A   2/1998 Steimle et al.
(Continued)

FOREIGN PATENT DOCUMENTS

CN   113255885 A   8/2021
WO   2021027254 A1   2/2021

OTHER PUBLICATIONS

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.
(Continued)

*Primary Examiner* — Kamran Afshar
*Assistant Examiner* — Brian J Hales
(74) *Attorney, Agent, or Firm* — ADELI LLP

(57) ABSTRACT

Some embodiments provide a method for training multiple parameters of a machine-trained (MT) network subject to a sparsity constraint that requires a threshold portion of the parameters to be equal to zero. A first set of the parameters subject to the sparsity constraint are grouped into groups of parameters. For each parameter of a second set of the parameters subject to the sparsity constraint, the method determines an accuracy penalty associated with the parameter being set to zero. For each group of parameters in the first set of parameters, the method determines a minimum accuracy penalty for each possible number of parameters in the group being set to zero. The method uses the determined accuracy penalties to set to the value zero at least the threshold portion of the plurality of parameters.

19 Claims, 33 Drawing Sheets

Related U.S. Application Data

62/949,082, filed on Dec. 17, 2019, provisional application No. 62/926,382, filed on Oct. 25, 2019, provisional application No. 62/775,886, filed on Dec. 5, 2018.

(56) References Cited

U.S. PATENT DOCUMENTS

| | | | |
|---|---|---|---|
| 5,740,326 | A | 4/1998 | Boulet et al. |
| 5,956,703 | A | 9/1999 | Turner et al. |
| 10,685,285 | B2 | 6/2020 | Simard |
| 11,410,076 | B1 | 8/2022 | Huszar |
| 11,468,313 | B1 | 10/2022 | Naumov et al. |
| 2004/0078403 | A1 | 4/2004 | Scheuermann et al. |
| 2013/0138589 | A1* | 5/2013 | Yu .................. G06N 3/08 706/15 |
| 2015/0294219 | A1 | 10/2015 | Krizhevsky |
| 2016/0086078 | A1 | 3/2016 | Ji et al. |
| 2016/0174902 | A1 | 6/2016 | Georgescu et al. |
| 2016/0328643 | A1 | 11/2016 | Liu et al. |
| 2017/0161640 | A1 | 6/2017 | Shamir |
| 2017/0351948 | A1 | 12/2017 | Lee et al. |
| 2018/0018559 | A1 | 1/2018 | Yakopcic et al. |
| 2018/0107925 | A1 | 4/2018 | Choi et al. |
| 2018/0144242 | A1 | 5/2018 | Simard |
| 2018/0307950 | A1 | 10/2018 | Nealis et al. |
| 2018/0341857 | A1 | 11/2018 | Lee et al. |
| 2018/0373975 | A1 | 12/2018 | Yu et al. |
| 2018/0373987 | A1 | 12/2018 | Zhang et al. |
| 2019/0042948 | A1 | 2/2019 | Lee et al. |
| 2019/0087713 | A1* | 3/2019 | Lamb ............... G06N 3/045 |
| 2019/0087729 | A1 | 3/2019 | Byun et al. |
| 2019/0114499 | A1 | 4/2019 | Delaye et al. |
| 2019/0114544 | A1 | 4/2019 | Sundaram et al. |
| 2019/0114547 | A1 | 4/2019 | Jaganathan et al. |
| 2019/0138882 | A1 | 5/2019 | Choi et al. |
| 2019/0180176 | A1 | 6/2019 | Yudanov et al. |
| 2019/0180184 | A1 | 6/2019 | Deng et al. |
| 2019/0188557 | A1 | 6/2019 | Lowell et al. |
| 2019/0220741 | A1 | 7/2019 | Garcia et al. |
| 2019/0228274 | A1 | 7/2019 | Georgiadis et al. |
| 2019/0251444 | A1 | 8/2019 | Alakuijala et al. |
| 2019/0340492 | A1 | 11/2019 | Burger et al. |
| 2019/0354842 | A1 | 11/2019 | Louizos et al. |
| 2020/0104688 | A1 | 4/2020 | Benyahia et al. |
| 2020/0134461 | A1 | 4/2020 | Chai et al. |
| 2020/0202213 | A1 | 6/2020 | Rouhani et al. |
| 2020/0202218 | A1 | 6/2020 | Csefalvay |
| 2020/0210838 | A1 | 7/2020 | Lo et al. |
| 2020/0302269 | A1 | 9/2020 | Ovtcharov et al. |
| 2020/0364545 | A1 | 11/2020 | Shattil |
| 2021/0019630 | A1 | 1/2021 | Yao et al. |
| 2021/0241097 | A1 | 8/2021 | Zhao et al. |
| 2021/0264272 | A1 | 8/2021 | Luo et al. |

OTHER PUBLICATIONS

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

Ardakani, Arash, et al., "Sparsely-Connected Neural Networks: Towards Efficient VLSI Implementation of Deep Neural Networks," Proceedings of the 5th International Conference on Learning Representations (ICLR 2017), Apr. 24-26, 2017, 14 pages, ICLR, Toulon, France.

Bagherinezhad, Hessam, et al., "LCNN: Look-up Based Convolutional Neural Network," Proceedings of 2017 IEEE Conference on Computer Vision and Pattern Recognition (CVPR 2017), Jul. 21-26, 2017, 10 pages, IEEE, Honolulu, HI, USA.

Bong, Kyeongryeol, et al., "A 0.62mW Ultra-Low-Power Convolutional-Neural-Network Face-Recognition Processor and a CIS Integrated with Always-On Haar-Like Face Detector," Proceedings of 2017 IEEE International Solid-State Circuits Conference (ISSCC 2017), Feb. 5-7, 2017, 3 pages, IEEE, San Francisco, CA, USA.

Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.

Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.

Courbariaux, Matthieu, et al., "Binarized Neural Networks: Training Neural Networks with Weights and Activations Constrained to +1 or −1," Mar. 17, 2016, 11 pages, arXiv:1602.02830v3, Computing Research Repository (CoRR)—Cornell University, Ithaca, NY, USA.

Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Fu, Yao, et al., "Embedded Vision with INT8 Optimization on Xilinx Devices," WP490 (v1.0.1), Apr. 19, 2017, 15 pages, Xilinx, Inc., San Jose, CA, USA.

Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.

He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.

Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.

Huan, Yuxiang, et al., "A Low-Power Accelerator for Deep Neural Networks with Enlarged Near-Zero Sparsity," May 22, 2017, 5 pages, arXiv:1705.08009v1, Computer Research Repository (CoRR)—Cornell University, Ithaca, NY, USA.

Huang, Gao, et al., "Multi-Scale Dense Networks for Resource Efficient Image Classification," Proceedings of the 6th International Conference on Learning Representations (ICLR 2018), Apr. 30-May 3, 2018, 14 pages, ICLR, Vancouver, Canada.

Jain, Anil K., et al., "Artificial Neural Networks: A Tutorial," Computer, Mar. 1996, 14 pages, vol. 29, Issue 3, IEEE.

Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.

Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.

Kingma, Diederik P., et al., "Variational Dropout and the Local Reparameterization Trick," Proceedings of the 28th International Conference on Neural Information Processing Systems (NIPS '15), Dec. 7-12, 2015, 14 pages, MIT Press, Montreal, Canada.

Leng, Cong, et al., "Extremely Low Bit Neural Network: Squeeze the Last Bit Out with ADMM," Proceedings of 32nd AAAI Conference on Artificial Intelligence (AAAI-18), Feb. 2-7, 2018, 16 pages, Association for the Advancement of Artificial Intelligence, New Orleans, LA, USA.

Li, Fengfu, et al., "Ternary Weight Networks," May 16, 2016, 9 pages, arXiv:1605.04711v1, Computing Research Repository (CoRR)—Cornell University, Ithaca, NY, USA.

Louizos, Christos, et al., "Bayesian Compression for Deep Learning," Proceedings of Advances in Neural Information Processing

(56) References Cited

OTHER PUBLICATIONS

Systems 30 (NIPS 2017), Dec. 4-9, 2017, 17 pages, Neural Information Processing Systems Foundation, Inc., Long Beach, CA, USA.

Merolla, Paul, et al., "Deep Neural Networks are Robust to Weight Binarization and Other Non-linear Distortions," Jun. 7, 2016, 10 pages, arXiv:1606.01981v1, Computing Research Repository (CoRR)—Cornell University, Ithaca, NY, USA.

Molchanov, Dmitry, et al., "Variational Dropout Sparsifies Deep Neural Networks," Feb. 27, 2017, 10 pages, arXiv:1701.05369v2, Computing Research Repository (CoRR)—Cornell University, Ithaca, NY, USA.

Moons, Bert, et al., "Envision: A 0.26-to-10TOPS/W Subword-Parallel Dynamic-Voltage-Accuracy-Frequency-Scalable Convolutional Neural Network Processor in 28nm FDSOI," Proceedings of 2017 IEEE International Solid-State Circuits Conference (ISSCC 2017), Feb. 5-7, 2017, 3 pages, IEEE, San Francisco, CA, USA.

Moshovos, Andreas, et al., "Exploiting Typical Values to Accelerate Deep Learning," Computer, May 24, 2018, 13 pages, vol. 51—Issue 5, IEEE Computer Society, Washington, D.C.

Non-Published Commonly Owned Related U.S. Appl. No. 16/923,003, filed Jul. 7, 2020, 139 pages, Perceive Corporation.

Non-Published Commonly Owned Related U.S. Appl. No. 16/923,006, filed Jul. 7, 2020, 139 pages, Perceive Corporation.

Park, Jongsoo, et al., "Faster CNNs with Direct Sparse Convolutions and Guided Pruning," Jul. 28, 2017, 12 pages, arXiv:1608.01409v5, Computer Research Repository (CoRR)—Cornell University, Ithaca, NY, USA.

Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Notes in Computer Science, vol. 9908, Springer, Cham, Amsterdam, Netherlands.

Ren, Mengye, et al., "SBNet: Sparse Blocks Network for Fast Inference," Jan. 7, 2018, 10 pages, arXiv:1801.02108v1, Computer Research Repository (CoRR)—Cornell University, Ithaca, NY, USA.

Sen, Sanchari, et al., "SPARCE: Sparsity aware General Purpose Core Extensions to Accelerate Deep Neural Networks," Nov. 29, 2017, 13 pages, arXiv:1711.06315v2, Computer Research Repository (CoRR)—Cornell University, Ithaca, NY, USA.

Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.

Shin, Dongjoo, et al., "DNPU: An 8.1TOPS/W Reconfigurable CNN-RNN Processor for General-Purpose Deep Neural Networks," Proceedings of 2017 IEEE International Solid-State Circuits Conference (ISSCC 2017), Feb. 5-7, 2017, 3 pages, IEEE, San Francisco, CA, USA.

Sim, Jaehyeong, et al., "A 1.42TOPS/W Deep Convolutional Neural Network Recognition Processor for Intelligent IoE Systems," Proceedings of 2016 IEEE International Solid-State Circuits Conference (ISSCC 2016), Jan. 31-Feb. 4, 2016, 3 pages, IEEE, San Francisco, CA, USA.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Theis, Lucas, et al., "Faster Gaze Prediction with Dense Networks and Fisher Pruning," Jul. 9, 2018, 18 pages, arXiv:1801.05787, Computer Research Repository (CoRR)—Cornell University, Ithaca, NY, USA.

Wang, Min, et al., "Factorized Convolutional Neural Networks," 2017 IEEE International Conference on Computer Vision Workshops (ICCVW '17), Oct. 22-29, 2017, 9 pages, IEEE, Venice, Italy.

Wen, Wei, et al., "Learning Structured Sparsity in Deep Neural Networks," Oct. 18, 2016, 10 pages, arXiv:1608.03665v4, Computer Research Repository (CoRR)—Cornell University, Ithaca, NY, USA.

Yang, Xuan, et al., "DNN Dataflow Choice Is Overrated," Sep. 10, 2018, 13 pages, arXiv:1809.04070v1, Computer Research Repository (CoRR)—Cornell University, Ithaca, NY, USA.

Zhang, Dongqing, et al., "LQ-Nets: Learned Quantization for Highly Accurate and Compact Deep Neural Networks," Jul. 26, 2018, 21 pages, arXiv:1807.10029v1, Computer Research Repository (CoRR)—Cornell University, Ithaca, NY, USA.

Zhang, Shijin, et al., "Cambricon-X: An Accelerator for Sparse Neural Networks," 2016 49th Annual IEEE/ACM International Symposium on Microarchitecture (MICRO '16), Oct. 15-19, 2016, 12 pages, IEEE, Taipei, Taiwan.

Zhou, Shuchang, et al., "DoReFa-Net: Training Low Bitwidth Convolutional Neural Networks with Low Bitwidth Gradients," Jul. 17, 2016, 14 pages, arXiv:1606.06160v2, Computer Research Repository (CoRR)—Cornell University, Ithaca, NY, USA.

Zhu, Chenzhuo, et al., "Trained Ternary Quantization," Dec. 4, 2016, 9 pages, arXiv:1612.01064v1, Computing Research Repository (CoRR)—Cornell University, Ithaca, NY, USA.

Vaswani, Sharan, "Exploiting Sparsity in Supervised Learning," Month Unknown 2014, 9 pages, retrieved from https://vaswanis.github.io > optimization_report.

Yan, Shi, "L1 Norm Regularization and Sparsity Explained for Dummies," Aug. 27, 2016, 13 pages, retrieved from https://blog.mlreview.com/l1-norm-regularization-and-sparsity-explained-for-dummies-5b0e4be3938a.

Han, Song, et al., "Learning Both Weights and Connections for Efficient Neural Networks," Oct. 30, 2015, 9 pages, retrieved from https://arxiv.org/abs/1506.02626.

Hu, Hengyuan, et al., "Network Trimming: A Data-Driven Neuron Pruning Approach towards Efficient Deep Architectures," Jul. 12, 2016, 9 pages, retrieved from https://arxiv.org/abs/1607.03250v1.

Wang, Peiqi, et al., "SNrram: An Efficient Sparse Neural Network Computation Architecture Based on Resistive Random-Access Memory," DAC '18, Jun. 24-29, 2018, 7 pages, ACM, San Francisco, CA, USA.

Martens, James, "New Insights and Perspectives on the Natural Gradient Method," Nov. 21, 2017, 59 pages, retrieved from https://arxiv.org/abs/1412.1193v9.

Withagen, Heini, "Reducing the Effect of Quantization by Weight Scaling," Proceedings of 1994 IEEE International Conference on Neural Networks (ICNN '94), Jun. 28-Jul. 2, 1994, 3 pages, IEEE, Orlando, Florida, USA.

Boo, Yoonho, et al., "Structured Sparse Ternary Weight Coding of Deep Neural Networks for Efficient Hardware Implementations," 2017 IEEE Workshop on Signal Processing Systems (SiPS), Oct. 3-5, 2017, 6 pages, IEEE, Lorient, France.

Deng, Lei, et al., "GXNOR-Net: Training Deep Neural Networks with Ternary Weights and Activations without Full-Precision Memory under a Unified Discretization Framework," Neural Networks 100, Feb. 2018, 10 pages, Elsevier.

Wang, Peiqi, et al., "HitNet: Hybrid Ternary Recurrent Neural Network," 32nd Conference on Neural Information Processing Systems (NeurIPS '18), Dec. 2018, 11 pages, Montreal, Canada.

Chen, Shangyu, et al., "Deep Neural Network Quantization via Layer-Wise Optimization Using Limited Training Data," Proceeding of the 33rd AAAI Conference on Artificial Intelligence (AAAI-19), Jul. 2019, 8 pages, AAAI.

He, Yang, et al., "Soft Filter Pruning for Accelerating Deep Convolutional Neural Networks," Aug. 21, 2018, 8 pages, retrieved from https://arxiv.org/abs/1808.06866.

Hu, Yiming, et al., "A Novel Channel Pruning Method for Deep Neural Network Compression," May 29, 2018, 10 pages, retrieved from https://arxiv.org/abs/1805.11394.

Molchanov, Pavlo, et al., "Pruning Convention Neural Networks for Resource Efficient Inference," Jun. 8, 2017, 17 pages, retrieved from https://arxiv.org/abs/1611.06440.

Spall, James C., "The Information Matrix in Control: Computation and Some Applications," Proceedings of the 38th Conference on Decision & Control, Dec. 1999, 6 pages, IEEE, Phoenix, Arizona, USA.

Sydorov, Vladyslav, et al., "Deep Fisher Kernels—End to End Learning of the Fisher Kernel GMM Parameters," 2014 IEEE

(56) References Cited

OTHER PUBLICATIONS

Conference on Computer Vision and Pattern Recognition, Jun. 23-28, 2014, 8 pages, IEEE, Columbus, OH, USA.

Wieschollek, Patrick, et al., "Backpropagation Training for Fisher Vectors within Neural Networks," Feb. 8, 2017, 9 pages, arXiv:1702.02549v1.

Jin, Canran,, et al., "Sparse Ternary Connect: Convolutional Neural Networks Using Ternarized Weights with Enhanced Sparsity," 2018 23rd Asia and South Pacific Design Automation Conference (ASP-DAC), Jan. 22-25, 2018, 6 pages, IEEE, Jeju, South Korea.

Marban, Arturo, et al., "Learning Sparse & Ternary Neural Networks with Entropy-Constrained Trained Terrorization (EC2T)," May 25, 2020, 11 pages, arXiv:2004.01077, Computer Research Repository (CoRR)—Cornell University, Ithaca, NY, USA.

Han, Song, "Efficient Methods and Hardware for Deep Learning," Sep. 2017, 125 pages, Stanford University, Palo Alto, CA, USA.

Yu, Zilin, et al., "Cross-Channel Intragroup Sparsity Neural Network," Jun. 12, 2020, 11 pages, arXiv: 1910.11971v2, Computer Research Repository (CoRR)—Cornell University, Ithaca, NY, USA.

* cited by examiner $$H = \nabla^2 \mathcal{L}(w)$$

$$800 \begin{bmatrix} \dfrac{\partial^2 \mathcal{L}}{(\partial w_1)^2} & \dfrac{\partial^2 \mathcal{L}}{\partial w_1 \partial w_2} & \dfrac{\partial^2 \mathcal{L}}{\partial w_1 \partial w_3} \\ \dfrac{\partial^2 \mathcal{L}}{\partial w_2 \partial w_1} & \dfrac{\partial^2 \mathcal{L}}{(\partial w_2)^2} & \dfrac{\partial^2 \mathcal{L}}{\partial w_2 \partial w_3} \\ \dfrac{\partial^2 \mathcal{L}}{\partial w_3 \partial w_1} & \dfrac{\partial^2 \mathcal{L}}{\partial w_3 \partial w_2} & \dfrac{\partial^2 \mathcal{L}}{(\partial w_3)^2} \\ \vdots & & \ddots \end{bmatrix}$$

*Figure 8*

$$900 \quad g_{ni} \begin{bmatrix} g_{11} & g_{12} & g_{13} & & g_{N1} \\ g_{21} & g_{22} & g_{23} & \cdots & g_{N2} \\ g_{31} & g_{32} & g_{33} & & g_{N3} \\ & \vdots & & & \vdots \end{bmatrix}$$

*Figure 9*

$$1000 \quad \beta_i \begin{Bmatrix} \beta_1 \\ \beta_2 \\ \beta_3 \\ \cdots \end{Bmatrix}$$

*Figure 10*

$$1100 \quad H_{ii} \text{ (Non-replica weights)} \begin{bmatrix} H_{11} & 0 & 0 & 0 \\ 0 & H_{22} & 0 & 0 \\ 0 & 0 & H_{33} & 0 \\ 0 & 0 & 0 & H_{44} \end{bmatrix}$$

*Figure 11*

$$1200 \quad H_{ii} \text{ (Replica weights with two replica layers)} \begin{bmatrix} H_{11} & H_{12} & 0 & 0 \\ H_{21} & H_{22} & 0 & 0 \\ 0 & 0 & H_{33} & H_{34} \\ 0 & 0 & H_{43} & H_{44} \end{bmatrix}$$

*Figure 12*

| PPU | alu_a | alu_b | alu_c | alu_d |
|---|---|---|---|---|
| 0 | alu0[0] | alu2[0] | alu0[0] | alu0[1:0] |
| 1 | alu0[1] | alu2[1] | alu0[1] | alu0[3:2] |
| 2 | alu0[2] | alu2[2] | alu0[2] | alu0[5:4] |
| 3 | alu0[3] | alu2[3] | alu0[3] | alu0[7:6] |
| 4 | alu0[4] | alu2[4] | alu0[4] | alu0[9:8] |
| 5 | alu0[5] | alu2[5] | alu0[5] | alu0[11:10] |
| 6 | alu0[6] | alu2[6] | alu0[6] | alu0[13:12] |
| 7 | alu0[7] | alu2[7] | alu0[7] | alu0[15:14] |
| 8 | alu0[8] | alu2[8] | alu0[8] | alu0[17:16] |
| 9 | alu0[9] | alu2[9] | alu0[9] | alu0[19:18] |
| 10 | alu0[10] | alu2[10] | alu0[10] | alu0[21:20] |
| 11 | alu0[11] | alu2[11] | alu0[11] | alu0[23:22] |
| 12 | alu0[12] | alu2[12] | alu0[12] | alu0[25:24] |
| 13 | alu0[13] | alu2[13] | alu0[13] | alu0[27:26] |
| 14 | alu0[14] | alu2[14] | alu0[14] | alu0[29:28] |
| 15 | alu0[15] | alu2[15] | alu0[15] | alu0[31:30] |

| PPU | alu_a | alu_b | alu_c | alu_d |
|---|---|---|---|---|
| 16 | alu0[16] | alu2[16] | alu1[0] | alu1[1:0] |
| 17 | alu0[17] | alu2[17] | alu1[1] | alu1[3:2] |
| 18 | alu0[18] | alu2[18] | alu1[2] | alu1[5:4] |
| 19 | alu0[19] | alu2[19] | alu1[3] | alu1[7:6] |
| 20 | alu0[20] | alu2[20] | alu1[4] | alu1[9:8] |
| 21 | alu0[21] | alu2[21] | alu1[5] | alu1[11:10] |
| 22 | alu0[22] | alu2[22] | alu1[6] | alu1[13:12] |
| 23 | alu0[23] | alu2[23] | alu1[7] | alu1[15:14] |
| 24 | alu0[24] | alu2[24] | alu1[8] | alu1[17:16] |
| 25 | alu0[25] | alu2[25] | alu1[9] | alu1[19:18] |
| 26 | alu0[26] | alu2[26] | alu1[10] | alu1[21:20] |
| 27 | alu0[27] | alu2[27] | alu1[11] | alu1[23:22] |
| 28 | alu0[28] | alu2[28] | alu1[12] | alu1[25:24] |
| 29 | alu0[29] | alu2[29] | alu1[13] | alu1[27:26] |
| 30 | alu0[30] | alu2[30] | alu1[14] | alu1[29:28] |
| 31 | alu0[31] | alu2[31] | alu1[15] | alu1[31:30] |

*Figure 32A*

| PPU | alu_a | alu_b | alu_c | alu_d |
|---|---|---|---|---|
| 32 | alu1[0] | alu3[0] | alu2[0] | alu2[1:0] |
| 33 | alu1[1] | alu3[1] | alu2[1] | alu2[3:2] |
| 34 | alu1[2] | alu3[2] | alu2[2] | alu2[5:4] |
| 35 | alu1[3] | alu3[3] | alu2[3] | alu2[7:6] |
| 36 | alu1[4] | alu3[4] | alu2[4] | alu2[9:8] |
| 37 | alu1[5] | alu3[5] | alu2[5] | alu2[11:10] |
| 38 | alu1[6] | alu3[6] | alu2[6] | alu2[13:12] |
| 39 | alu1[7] | alu3[7] | alu2[7] | alu2[15:14] |
| 40 | alu1[8] | alu3[8] | alu2[8] | alu2[17:16] |
| 41 | alu1[9] | alu3[9] | alu2[9] | alu2[19:18] |
| 42 | alu1[10] | alu3[10] | alu2[10] | alu2[21:20] |
| 43 | alu1[11] | alu3[11] | alu2[11] | alu2[23:22] |
| 44 | alu1[12] | alu3[12] | alu2[12] | alu2[25:24] |
| 45 | alu1[13] | alu3[13] | alu2[13] | alu2[27:26] |
| 46 | alu1[14] | alu3[14] | alu2[14] | alu2[29:28] |
| 47 | alu1[15] | alu3[15] | alu2[15] | alu2[31:30] |

| PPU | alu_a | alu_b | alu_c | alu_d |
|---|---|---|---|---|
| 48 | alu1[16] | alu3[16] | alu3[0] | alu3[1:0] |
| 49 | alu1[17] | alu3[17] | alu3[1] | alu3[3:2] |
| 50 | alu1[18] | alu3[18] | alu3[2] | alu3[5:4] |
| 51 | alu1[19] | alu3[19] | alu3[3] | alu3[7:6] |
| 52 | alu1[20] | alu3[20] | alu3[4] | alu3[9:8] |
| 53 | alu1[21] | alu3[21] | alu3[5] | alu3[11:10] |
| 54 | alu1[22] | alu3[22] | alu3[6] | alu3[13:12] |
| 55 | alu1[23] | alu3[23] | alu3[7] | alu3[15:14] |
| 56 | alu1[24] | alu3[24] | alu3[8] | alu3[17:16] |
| 57 | alu1[25] | alu3[25] | alu3[9] | alu3[19:18] |
| 58 | alu1[26] | alu3[26] | alu3[10] | alu3[21:20] |
| 59 | alu1[27] | alu3[27] | alu3[11] | alu3[23:22] |
| 60 | alu1[28] | alu3[28] | alu3[12] | alu3[25:24] |
| 61 | alu1[29] | alu3[29] | alu3[13] | alu3[27:26] |
| 62 | alu1[30] | alu3[30] | alu3[14] | alu3[29:28] |
| 63 | alu1[31] | alu3[31] | alu3[15] | alu3[31:30] |

*Figure 32B*

OPTIMIZING GLOBAL SPARSITY FOR NEURAL NETWORK

CLAIM OF BENEFIT TO PRIOR APPLICATIONS

This application claims the benefit of U.S. Provisional Patent Applications 62/949,082, filed Dec. 17, 2019; 62/955,349, filed Dec. 30, 2019; and 62/975,539, filed Feb. 12, 2020. This application is a continuation-in-part of U.S. patent application Ser. No. 16/684,128, filed Nov. 14, 2019, now issued as U.S. Pat. No. 11,995,533, which claims the benefit of U.S. Provisional Patent Applications 62/775,886, filed Dec. 5, 2018; and 62/926,382, filed Oct. 25, 2019. U.S. patent application Ser. No. 16/684,128, now issued as U.S. Pat. No. 11,995,533, as well as U.S. Provisional Patent Applications 62/949,082; 62/955,349; 62/975,539; 62/775,886; and 62/926,382 are incorporated herein by reference.

BACKGROUND

Machine learning automates the creation, based on historical data, of models that can then be used to make predictions. A class of models called deep neural networks (or DNNs) has become popular over the last few years, and there is now a menagerie of types of DNNs. Some examples of DNN's include feed-forward, convolutional, recurrent, long-short term memory (LSTM), and Neural Turing Machines (NTM).

Neural networks typically involve many (e.g., thousands, millions, or even potentially billions) of weights that are calculated during training and then used when the neural network is embedded into a device. Recently, techniques have been introduced to solve this issue in part by creating very sparse networks (i.e., with most weight values set to zero). However, in some cases this can reduce complexity of the network too far.

BRIEF SUMMARY

Some embodiments of the invention train the parameters of a machine-trained (MT) network by using multiple copies (or replicas) of certain layers of the network in order to increase a number of possible values for parameters of the layer. In some embodiments, each parameter of a set of the parameters has a discrete set of allowed values, and using multiple copies of a network layer increases this set of allowed values for the parameters of a layer. In some embodiments, the MT network is a multi-layer network, with each layer including one or more computation nodes. Each node of at least a subset of the layers generates an output value based on one or more input values (which in many cases are output values of some or all of the nodes of a previous layer) and one or more parameters. Specifically, for many of the layers in some embodiments, each node linearly combines its input values according to a set of parameters (referred to as weights), then applies a non-linear function to the result of this linear combination.

In some embodiments, the training process for the weights of the MT network involves initially training the layers without restricting the weights to allowed sets of values (e.g., as floating-point values), then using these initially-trained values for the weights to (i) determine the sets of allowed values for each layer and (ii) train the weights as restricted to their respective sets of allowed values. The restriction to the respective sets of allowed values is also referred to as weight quantization in some embodiments. After training, each weight value for each node in a given layer will have an assigned weight value that is one of the allowed values for the layer. In some such embodiments, the set of allowed values has two allowed values of $\{0, \text{positive value}\}$ or three allowed values of $\{0, \text{positive value}, \text{negation of positive value}\}$. The positive value, often referred to as the $\alpha_k$ for the layer, can vary between layers (and, as mentioned, may be determined based on the initial non-quantized training). During training, various techniques are used (e.g., as factors in a loss function that measures network output accuracy and is used to adjust the weight values and other parameters) to constrain the weights to their respective allowed values and, in some embodiments, to ensure that at least a threshold percentage of the values are set to 0.

These techniques of (i) using at most three weight values per layer that can be represented as $\{0, 1, -1\}$ and (ii) ensuring that at least a threshold percentage of the weight values are 0 enables the design of MT networks that can be loaded onto and executed by specialized network inference circuits that use the network to process input data (e.g., images, sound clips, etc.) for which the network is trained. Specifically, certain neural network computation chips are designed for networks that meet these constraints.

However, in some cases, a network will have some layers for which quantization may result in a loss of accuracy. For instance, layers with a lower number of weight values than is typical for the rest of the network (e.g., the initial layer of a network, 1×1 convolution layers) may have this issue. To ensure that these layers do not result in such a loss of accuracy, some embodiments replicate the layer and use different (though possibly related) sets of allowed weight values for each of the replica layers, then add together the outputs of these replica layers. This effectively increases the number of possible weight values for the layer, while still (i) ensuring that the requisite percentage of 0 values is reached and (ii) enabling the network to be executed by a chip designed for only two or three allowed weight values per layer.

Specifically, if a first replica layer has a set of allowed weight values $\{0, \alpha_k, -\alpha_k\}$, then in some embodiments the second replica layer is assigned possible weight values of $\{0, \alpha_k/3, -\alpha_k/3\}$ or $\{0, 3\alpha_k, -3\alpha_k\}$. If a third replica layer is used, then this third copy is assigned possible weight values of $\{0, \alpha_k/9, -\alpha_k/9\}$ or $\{0, 9\alpha_k, -9\alpha_k\}$. Subsequent replica layers allow for additional precision. Each node in each replica layer receives the same input as its corresponding nodes in the other replica layers, and each copy of the nodes generates its output separately. Before providing the outputs to the next layer of the network, the outputs of each group of corresponding replica nodes are added together. The effective result is that each node has an effective set of 9 possible weight values if two replica layers are used, 27 possible weight values if three replica layers are used, etc.

Similarly, if the first replica layer has two allowed weight values of $\{0, \alpha_k\}$, then in some embodiments the allowed weight values for the duplicate layer are $\{0, \alpha_k/2\}$ or $\{0, 2\alpha_k\}$, the allowed weight values for the triplicate layer are $\{0, \alpha_k/4\}$ or $\{0, 4\alpha_k\}$, etc. In this case, each node effectively has 4 possible weight values if two replica layers are used and 8 possible weight values if three replica layers are used.

In addition to enabling certain layers (e.g., layers with a lower number of weight values) to include more complexity and therefore avoid losing network accuracy, the use of replica layers also allows for an increase in the percentage of weight values set to 0. Because the non-zero weight values can provide more fine-grained analysis, more of the weight values can equal 0 in some embodiments. In addition, at a conceptual level, by replicating these layers, the data flow through the network becomes more laminar, rather than having the data compress down and expand.

When training the network with these replica layers, different embodiments use different approaches to training the weight values. As mentioned, some embodiments initially train the weights without quantization (e.g., using floating-point values), then quantize the weights and continue training with quantization. In some such embodiments, the replication of certain layers is introduced between the initial training (without quantization) and the subsequent quantization and additional training. Some such embodiments use the alternating direction method of multipliers (ADMM) technique to constrain the weight values for each quantized layer (including the sets of replica layers) to their respective sets of allowed values. In addition, some embodiments use a further set of penalty terms in the loss function that (i) accounts for the loss of accuracy introduced by quantization and (ii) accounts for the inter-relationship between corresponding weights of replica layers.

Specifically, during the ADMM training, some embodiments use a loss function that constrains the weight values to only the allowed quantized values, while accounting for a loss in accuracy of the network's output when using the quantized values instead of the optimized floating-point values as well as the inter-relationship between corresponding weights of replica layers. In some embodiments, the loss function includes (i) a first term that measures the difference between the actual output of the network and the expected output of the network, given a training input data set (i.e., a standard loss term) and (ii) a second term that constrains the weights to the sets of allowed values. This constraint term also accounts for the increase in loss when quantizing any individual weight (i.e., due to constraining the weights to the sets of allowed values), as well as the relationship between corresponding weights of replica layers (which make a difference due to quantization of the output values of the layers, as described further below). This constraint term can be referred to as a loss-aware penalty term.

Some embodiments calculate the loss-aware penalty term of the loss function using the Hessian matrix of the first term of the loss function (that measures the difference between actual output and expected output), where the diagonal values of the Hessian matrix are second-order partial derivatives of the loss function with respect to each weight in the MT network. The off-diagonal values of this matrix, in some embodiments, are partial derivatives of the first term of the loss function with respect to pairs of different weights. The weight terms are organized in this matrix such that corresponding weights of replica layers are grouped together, and thus for a set of R replicas, the diagonal and off-diagonal terms of interest (i.e., the partial derivative of the loss term with respect to two different corresponding weights from two replica layers) form R×R blocks along the diagonal of the Hessian matrix.

In some embodiments, the loss increase for a particular weight is linearly related to a corresponding diagonal term of the Hessian matrix. To minimize the computational burden of calculating the Hessian terms, some embodiments approximate the diagonal terms of the Hessian matrix using an empirical Fisher approximation method. The Fisher approximation method estimates the Hessian by computing first-order derivatives (e.g., gradients) of the loss function (with respect to the weights) during multiple prior training iterations of the MT network.

After initial training (before quantization), and with the Hessian matrix approximated (this is also referred to herein as the loss matrix), some embodiments initialize the quantization process by determining the allowed values (i.e. the scaling factor, or $\alpha_k$) for each layer and assigning each of the weights one of their respective allowed values (e.g., one of $\{-\alpha_k, 0, \alpha_k\}$, in the case of ternary weights). For replicated layers, prior to initializing quantization, the floating-point (or otherwise non-quantized) values of the various replica layers are set. Some embodiments decompose the trained non-quantized value for the initial layer (e.g., 0.8) into a set of values for the replica layers based on analysis that involves the relative scales of the replica layers (e.g., if a weight trained to 0.8 is decomposed into three weights in three layers, these could be 1.0, −0.3, 0.1). Other embodiments instead assign the entirety of the initially-trained weight value to a first one of the replica layers, and set the others to 0 (e.g., here the weight trained to 0.8 would be decomposed into 0.8, 0.0, 0.0).

As mentioned, initializing the quantized weight values in order to train the quantized network requires determining the scaling factor for each layer (including replica layers) and initializing each weight to one of the scaled ternary values. In some embodiments, the scaling factor for each layer of the network is first calculated by taking the variance of the floating-point weight values of the weights in that layer. The weight values in the k-th layer are initialized to the quantized values in some such embodiments by assigning each weight value to the nearest scaled ternary value, e.g. $\{-\alpha_k, 0, +\alpha_k\}$. In other embodiments, the scaling factor and the initial weight value assignments are iteratively calculated based on the floating-point weight values of the network and the gradient terms from the prior training iterations of the MT network that were used to calculate the Fisher approximation to the Hessian matrix.

In some embodiments, at least a predefined portion of the weight values are set to a value of zero as part of or immediately after initialization (this minimum percentage of weights set to zero is referred to herein as a sparsity condition). In order to minimize the impact on the loss that arises from imposing the sparsity condition, some embodiments compute a penalty for the quantization of each weight, and attempt to minimize this penalty while (i) assigning all of the weights to one of their respective allowed values and (ii) imposing the sparsity condition so that at least a minimum number of the weights are set to zero. Without the use of replica layers, each of the weights can be treated independently, and the training system sets to zero the weights with the smallest penalties for doing so. This penalty can be measured in different embodiments based on distance of the initially-trained value from zero or a more complex calculation involving multiple factors. In some embodiments, this calculation identifies an importance of the weight as indicated by the gradient terms used to calculate the loss matrix.

For replica layers, setting one of a group of corresponding weights to zero has an effect on the other weights, and therefore the initialization and sparsification is more complex. For a set of R replica layers, there are numerous groups of R corresponding weights. Some embodiments identify, for each such group, the minimum penalty for each possible number of parameters (i.e., 0, 1, 2 . . . R) being set to zero, and use these penalties to determine the optimal number of weights to set to zero for each group (and which of the weights in the group to set to zero). Specifically, some embodiments identify the biggest decrease in the penalty for changing weights from zero to non-zero, and use this number of non-zero weights (allowing for the possibility of increasing the number of non-zero weights if possible). It should be noted that this algorithm for setting the weights of the replica layers does not rely on the use of the loss matrix to compute the penalties (i.e., the algorithm can be used even when other techniques are used to compute the penalties for the groups of replica weights).

Once the weights are initialized to quantized values, some embodiments train the network in iterations of stages as per ADMM, while using the loss matrix to inform the training. This training, in some embodiments, involves a first type of stage (the training stage) in which inputs are processed through the quantized network and values are computed for the loss function (including the loss-aware penalty term using the loss matrix with off-diagonal entries for the replica layers). These values for the loss function are back-propagated to train the weight values of the MT network (which allows the weight values to be temporarily moved off of their quantized values). After one or more such stages, a second type of stage (the projection stage) projects all of the weight values to one of their allowed values again (and re-imposes the sparsity condition to ensure that enough of the weights are set to zero). In some embodiments, during projection, the scaling values for each layer are recomputed. In addition, after at least one iteration of training and projection stages, the loss matrix is re-calculated, for example by again using the Fisher approximation. The new loss matrix values are then used in subsequent training and projection stages.

In addition to training the weights, some embodiments also train batch normalization parameters during the training process. For typical (non-replica) layers, batch normalization training computes statistics (e.g., the mean and variance) for pre-activations (i.e., the dot product of weight values and inputs for a computation node, before the activation function is applied), and uses these statistics to apply shift and scale values to the pre-activations (e.g., shifting based on the mean and scaling based on the variance). However, for sets of replica layers, performing the scaling on the individual layers based on the variance removes the relative scale of the layers, while applying the shift to the sums of the layers results in a loss of precision due to value quantization after each individual layer. As such, some embodiments compute the mean for each individual replica node (and apply the shift at the individual replica node level) while computing the variance after the nodes have been added together.

When implemented on a neural network inference circuit such as that described above (i.e., designed for ternary weight values), the replica layers are all treated as separate layers, though the same set of input values are stored for use in each of the multiple copies of the layer. Each of the individual copies of the layer are computed separately, and then the chip combines the outputs of the corresponding sets of nodes using an element-wise operation to compute the output values that are stored as inputs for the next layer. In some embodiments, each replica layer is a convolutional layer, and the chip stores the corresponding outputs of each replica layer in a similar pattern across its memories. This pattern allows for the corresponding outputs to be easily read from the memories for the subsequent element-wise addition operation. Different embodiments may execute the combination of the replica layers as a single element-wise addition operation irrespective of the number of replica layers, or as a series of element-wise additions adding two sets of outputs at a time, depending on the constraints of the chip.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 8 illustrates an example Hessian matrix, which is a square matrix of size M×M, where M is the total number of weights.

FIG. 9 illustrates an example of gradient terms as a matrix of N columns (corresponding to each of the previous training epochs) and M rows (for M weights of the network).

FIG. 10 illustrates the average sum squared gradients as a vector of length M (the number of weights in the network).

FIG. 11 illustrates an example of portions of a Fisher matrix for non-replica weights, with only diagonal terms non-zero.

FIG. 12 illustrates an example of portions of a Fisher matrix for replica weights.

FIGS. 32A-B illustrate a table showing the mapping of ALU outputs to the different post-processing units for a neural network computation circuit of some embodiments.

DETAILED DESCRIPTION

Some embodiments of the invention train the parameters of a machine-trained (MT) network by using multiple copies (or replicas) of certain layers of the network in order to increase a number of possible values for parameters of the layer. In some embodiments, each parameter of a set of the parameters has a discrete set of allowed values, and using multiple copies of a network layer increases this set of allowed values for the parameters of a layer. In some embodiments, the MT network is a multi-layer network, with each layer including one or more computation nodes. Each node of at least a subset of the layers generates an output value based on one or more input values (which in many cases are output values of some or all of the nodes of a previous layer) and one or more parameters. Specifically, for many of the layers in some embodiments, each node linearly combines its input values according to a set of parameters (referred to as weights), then applies a non-linear function to the result of this linear combination.

Figure 1:
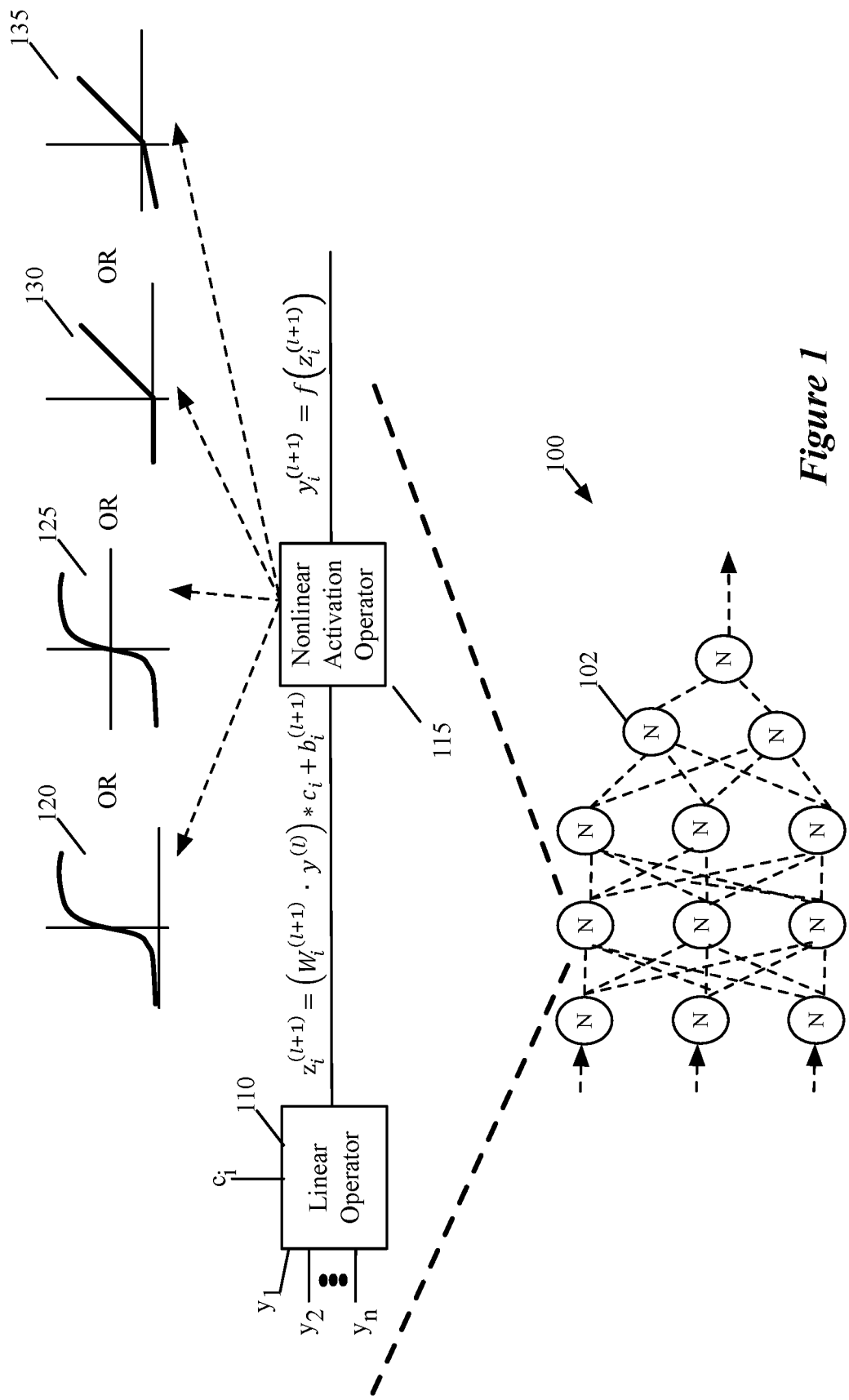
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 100 is a fully-connected network in which each node in a particular layer receives as inputs all of the outputs from the previous layer. However, the neural networks of some embodiments are convolutional feed-forward neural networks. In this case, the intermediate layers (referred to as "hidden" layers) may include convolutional layers, pooling layers, element-wise operation layers, fully-connected layers, and/or normalization layers. The convolutional layers of some embodiments use a small kernel (e.g., 3×3×3) to process blocks of input values (output values from the previous layer) in a set of two-dimensional grids (e.g., channels of pixels an image) with the same set of parameters. The kernels (also referred to as filters) are three-dimensional, and multiple kernels are used to process each group of input values in a layer (resulting in a set of three-dimensional output grids). Pooling layers combine the outputs of clusters of nodes from one layer into a single node at the next layer, as part of the process of reducing an image (which may have a large number of pixels) or other input item down to a single output (e.g., a vector output). In some embodiments, pooling layers can use max pooling (in which the maximum value among the clusters of node outputs is selected) or average pooling (in which the clusters of node outputs are averaged).

As shown in FIG. 1, each node in the neural network 100 has a linear component 110 and a nonlinear component 115. The linear component 110 of each hidden or output node in this example computes a dot product of a vector of weight coefficients and a vector of output values of prior nodes, plus an offset. In other words, a hidden or output node's linear operator computes a weighted sum of its inputs (which are outputs of the previous layer of nodes) plus an offset (also referred to as a bias). Similarly, the linear component 110 of each input node of some embodiments computes a dot product of a vector of weight coefficients and a vector of input values, plus an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable l can be any of the hidden layers (i.e., $l \in \{1, \ldots, L-1\}$ index the hidden layers of the network, with l=0 representing the input layer and l=L representing the output layer). The variable $z_i^{(l+1)}$ represents the output of the linear component of a hidden node i in layer l+1. As indicated by the following Equation (1), the variable $z_i^{(l+1)}$ is computed as the dot product of a vector of weight values $W_i^{(l+1)}$ and a vector of outputs $y^{(l)}$ from layer l multiplied by a constant value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n}\left(w_{ik}^{(l+1)} * y_k^{(l)}\right) * c_i + b_i^{(l+1)}. \quad (1)$$

The constant value $c_i$ is a value to which all the weight values are normalized. In some embodiments, the constant value $c_i$ is 1. The symbol * is an element-wise product, while the symbol • is the dot product. The weight coefficients $W^{(l)}$ are parameters that are adjusted during the network's training (as described in detail below) in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments require that at least a threshold percentage of the weight values are equal to zero (e.g., 75%, 80%, etc.).

The output of the nonlinear component 115 of a node in layer l+1 is a function of the node's linear component, and can be expressed as by Equation (2) below:

$$y_i^{(l+1)} = f(z_i^{(l+1)}). \quad (2)$$

In this equation, $f$ is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (2) can be expressed in the following expanded format of Equation (3):

$$y_i^{(l+1)} = f\left(z_i^{(l+1)}\right) = f\left[\left(\sum_{k=1}^{n} w_{ik} * y_k\right) * c_i + b_i^{(l+1)}\right]. \quad (3)$$

In this equation, $w_{ik}$ are weight values associated with the inputs $y_k$ of the node i in layer l+1.

Figure 2:
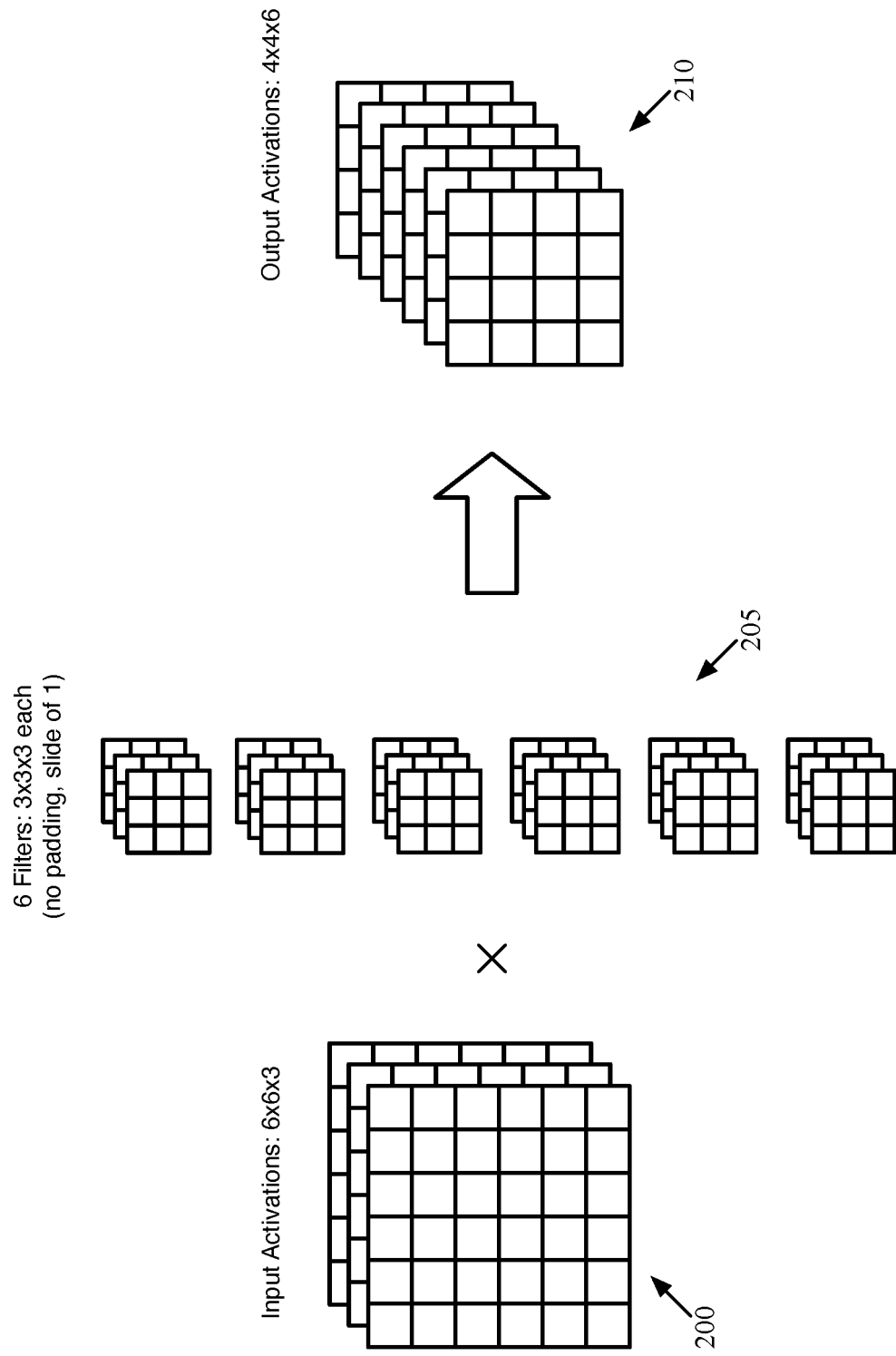
FIG. 2 conceptually illustrates a representation of a convolutional layer of a convolutional neural network.

FIG. 2 conceptually illustrates a representation of a convolutional layer of a convolutional neural network. The convolutional layer receives a set of input activation values 200 organized as a three-dimensional array. This three-dimensional array is either (i) a set of input values for the network, if the convolutional layer is the first layer of the network, or (ii) a set of output values of a previous layer of the network (e.g., a previous convolutional layer, a pooling layer, etc.). The array can be conceptualized as a set of two-dimensional grids, as shown in the figure. In this example, the dimensions of the input values are 6×6×3 (i.e., three 6×6 grids).

Each computation node of the convolutional layer involves a linear component (e.g., a dot product followed by scaling and bias functions) as well as a non-linear component, as described above. The input to each computation node is a subset of the input activation values, and the dot product for the computation node involves multiplying those input activation values by one of the filters of the layer. As shown, in this example the layer includes six filters 205, each of which is 3×3×3. Each value in one of the filters is a weight value that is trained using the techniques described herein. Thus, in the example shown in this figure, each filter includes 27 trainable weight values.

The size of the filters in the x and y directions can vary (3×3 and 5×5 are common sizes), but in some embodiments the depth is required to match the depth of the input activations (in this case there are three grids, or channels, so the depth is three). The number of filters in a given layer can also vary—in general, each filter is attempting to identify the presence of a particular feature in the input values. For instance, in image analysis, a filter in an early layer might test for the presence of an edge in a particular direction while a filter in a later layer tests for the presence of a more specific object type in the image (e.g., a nose).

To generate the output activations, each of the filters 205 is applied to numerous subsets of the input activation values. Specifically, in a typical convolution layer, each 3×3×3 filter is moved across the three-dimensional array of activation values, and the dot product between the 27 activations in the current subset and the 27 weight values in the filter is computed. This process starts in the top left corner (i.e., x=0-2, y=0-2) of the grid, and includes the full depth of the array. The filter moves across the rows, in this case using a slide of 1 (i.e., moving one column per computation node, such that the second dot product uses activations at x=1-3, y=0-2). When the end of a row is reached, the filter is moved back to the first columns (i.e., x=0-2) and down one row (i.e., y=1-3), and so on until the bottom right corner of the array is reached. Though not the case in this example, some embodiments use zero-padding at the edges of the grids.

The output activation values 210 are arranged in a 4×4×6 array in this example. The outputs from a single filter are arranged in a single grid, and because the example has six filters 205 the output activations have six grids. Using a slide value of 1 with no zero-padding results in a 4×4 output grid for each filter. These output activation values 210 are then the input activation values for the next layer of the neural network.

Before a multi-layer network (e.g., a convolutional neural network) can be used to solve a particular problem, the network is put through a supervised training process that adjusts the network's configurable parameters (e.g., the weight values, biases, etc.). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values). In addition, as described further below, some embodiments quantize the network (constraining the weight values to sets of allowed values), replicate certain layers of the network while assigning different weight scales to those layers, use the alternating direction method of multipliers (ADMM) to train the quantized weight values (which includes performing forward and backward propagation), and ensure that at least a threshold percentage of the weight values are set to zero.

I. Replication of Convolutional Layers

In some embodiments, the training process for the weights of the MT network involves initially training the layers without restricting the weights to allowed sets of values (e.g., as floating-point values), then using these initially-trained values for the weights to (i) determine the sets of allowed values for each layer and (ii) train the weights as restricted to their respective sets of allowed values. The restriction to the respective sets of allowed values is also referred to as weight quantization in some embodiments. After training, each weight value for each node in a given layer will have an assigned weight value that is one of the allowed values for the layer. In some such embodiments, the set of allowed values has two allowed values of $\{0, \text{positive value}\}$ or three allowed values of $\{0, \text{positive value}, \text{negation of positive value}\}$. The positive value, often referred to as the $\alpha_k$ for the layer, can vary between layers (and may be determined based on the initial non-quantized training). During training, various techniques are used (e.g., as factors in a loss function that measures network output accuracy and is used to adjust the weight values and other parameters) to constrain the weights to their respective allowed values and, in some embodiments, to ensure that at least a threshold percentage of the values are set to 0.

Before describing the training operations in greater detail, the concept of replica layers is introduced. The techniques of (i) using at most three weight values per layer that can be represented as $\{0, 1, -1\}$ (referred to as quantization) and (ii) ensuring that at least a threshold percentage of the weight values are zero (referred to as sparsification) enables the design of neural networks that can be loaded onto and executed by specialized network inference circuits that use the network to process input data (e.g., images, sound clips, etc.) for which the network is trained. Specifically, certain neural network computation chips are designed for networks that meet these constraints.

However, in some cases, a network will have some layers for which this quantization may result in a loss of accuracy. For instance, layers with a lower number of weight values than is typical for the rest of the network (e.g., the initial layer of a network, 1×1 convolution layers) may have this issue. To ensure that these layers do not result in such a loss of accuracy, some embodiments replicate the layer and use different (though possibly related) sets of allowed weight values for each of the replica layers, then add together the outputs of these replica layers. This effectively increases the number of possible weight values for the layer, while still (i) ensuring that the requisite percentage of 0 values is reached and (ii) enabling the network to be executed by a chip designed for only two or three allowed weight values per layer.

Specifically, if a first replica layer has a set of allowed weight values $\{0, \alpha_k, -\alpha_k\}$, then in some embodiments the second replica layer is assigned possible weight values of $\{0, \alpha_k/3, -\alpha_k/3\}$ or $\{0, 3\alpha_k, -3\alpha_k\}$. If a third replica layer is used, then this third copy is assigned possible weight values of $\{0, \alpha_k/9, -\alpha_k/9\}$ or $\{0, 9\alpha_k, -9\alpha_k\}$. Subsequent replica layers allow for additional precision. Each node in each replica layer receives the same input as its corresponding nodes in the other replica layers, and each copy of the nodes generates its output separately. Before providing the outputs to the next layer of the network, the outputs of each group of corresponding nodes of the replica layers are added together. The effective result is that each node has an effective set of 9 possible weight values if two replica layers are used, 27 possible weight values if three replica layers are used, etc.

In addition to enabling certain layers (e.g., layers with a lower number of weight values) to include more complexity and therefore avoid losing network accuracy, the use of replica layers also allows for an increase in the percentage of weight values set to 0. Because the non-zero weight values can provide more fine-grained analysis, more of the weight values can equal 0 in some embodiments. In addition, at a conceptual level, by replicating these layers, the data flow through the network becomes more laminar, rather than having the data compress down and expand.

Figure 3:
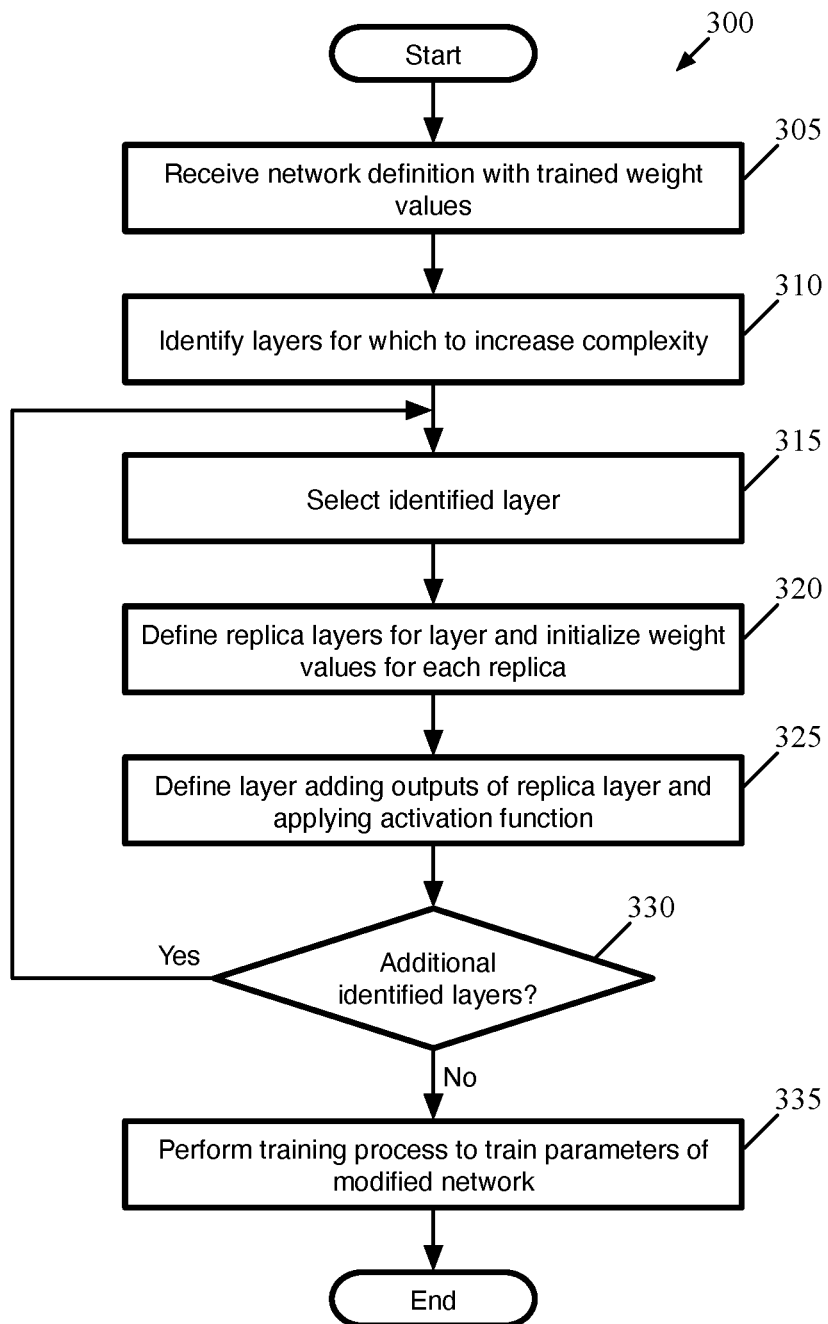
FIG. 3 conceptually illustrates a process of some embodiments to modify and train a network in order to functionally increase the number of possible weight values for at least some of the layers of the network.

FIG. 3 conceptually illustrates a process 300 of some embodiments to modify and train a network in order to functionally increase the number of possible weight values for at least some of the layers of the network. The process 300 increases the complexity of these layers of the network without altering the fundamental network structure, while maintaining sparsity (i.e., a high percentage of the weight values are still zero) and the ability to represent all the weight values of the modified network using the ternary set $\{0, 1, -1\}$, even when the effective number of different weight values for some of the layers is greater than three. The process 300 will be described in part by reference to FIG. 4, which illustrates how one node of an original layer is modified in a pair of replica network layers and the resulting network portion.

As shown, the process 300 begins by receiving (at 305) a network definition with trained weight values for the network. In some embodiments, the network definition specifies the structure of the network (i.e., the number of nodes in each layer, which output values from one layer are received by each node of the next layer, the activation functions used by each layer, etc.). As mentioned, in some embodiments each layer has a set of three $\{0, \alpha_k, -\alpha_k\}$ associated possible weight values. These $\alpha_k$ may be determined by randomly sampling a distribution (e.g., a Gaussian distribution), randomly assigning each weight value in the layer an initial value within a range and then selecting one of these as the associated $\alpha_k$ for the layer, training the network with floating-point values and then assigning the $\alpha_k$ values for each layer based on these trained floating-point values, or with other techniques. In other embodiments, the network is trained with floating-point weight values (i.e., prior to quantization), as described further below, and the replica layers are defined prior to quantization of the weights.

Next, the process 300 identifies (at 310) layers for which to increase the complexity. In some cases, a network will have some layers with a lower number of weight values than is typical for the rest of the network and using these techniques can result in a loss of accuracy at these layers. Thus, some embodiments identify layers that have less than a threshold number of weight values (e.g., 2,000, 25,000, etc.). Some embodiments also determine for which layers the weights are not settling on one of their allowed values as quickly, identify which layers as trained by floating-point values are likely to cause the most error as a result of quantization, or identify which layers are likely to have the most difficulty sparsifying. This identification may be performed by an automated process using the loss matrix described below, or a user specifying layers for which to increase the complexity.

In a convolutional neural network, often the initial layer and/or 1×1 convolutional layers will have fewer weight values than the other layers. The initial layer of a convolutional network that takes images as inputs often only has fewer weights because there are only three channels of input. A typical intermediate convolutional layer will have a number of input channels based on the number of filters in the previous layer (typically much larger than three), and thus have more weight values. As an example, a 3×3 filter for three input channels (and 0 padding) will have 27 weight values, but a 3×3 filter for 72 input channels will have 648 weight values. 1×1 convolutional layers are used to modify the channel dimension of the filters for the subsequent layer. Because the filters in such a layer are 1×1 filters, they will have far fewer weight values per filter (and thus per layer).

To ensure that these layers do not result in a loss of accuracy for the network, especially when imposing sparsity requirements, some embodiments replicate (e.g. duplicate, triplicate, etc.) the layer but use different (though related) sets of allowed weight for each replica layer, then add together the outputs of the replica layers. This effectively increases the number of possible weight values for the layer, while still (i) ensuring that the requisite percentage of zero values is reached and (ii) enabling the network to be executed by a chip designed for only two or three possible input values per layer.

Figure 4:
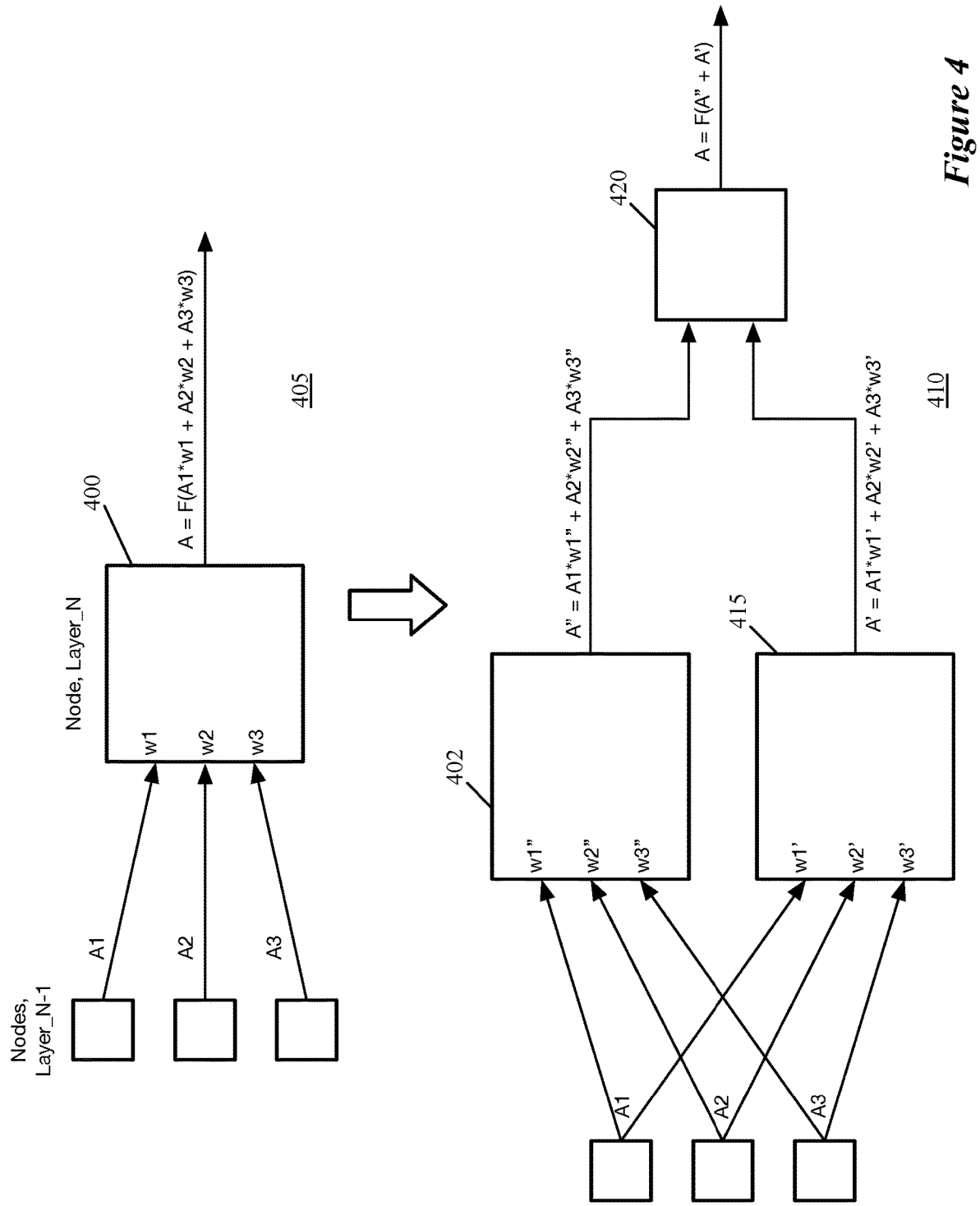
FIG. 4 illustrates how one node of an original layer is modified in a pair of replica network layers and the resulting network portion.

Thus, the process 300 selects (at 315) one of the identified network layers. Different embodiments may select the identified layers in different orders (e.g., from the start of the network to the end, etc.). FIG. 4, as mentioned, illustrates the increase in complexity of a single node of such a layer over two stages 405-410. The first stage 405 illustrates the original node 400. As shown, this node 400 is one of the nodes of Layer N and receives three input values A1, A2, and A3 (from nodes in a previous layer N−1) and has three corresponding weights w1, w2, and w3. Each of the three weights has been assigned a value (through training). The node outputs a value A that is a function F of the linear combination of the inputs A1, A2, and A3 with the weights w1, w2, and w3 (i.e., the dot product of the input vector A with the weight vector W). In this example, F represents a combination of the bias and scale constants for the node as well as the non-linear activation function. It should be understood that a typical convolutional neural network node will have many more input values (and thus many more weight values) than this, but for simplicity the node 400 is shown with only three inputs.

The process 300 then defines (at 320) two or more replica layers for the selected layer and initializes the weight values for each replica. As mentioned, the weights for the original layer at this point were trained with floating-point values. In some embodiments, the use of ternary weights for quantization informs the decomposition of this initial weight vector W into replica weight vectors. For the following description, it is assumed that each replica layer will have allowed quantized values smaller than the previous layer (i.e., $\alpha_k/3$, $\alpha_k/9$, etc.). In this case, each weight W is defined as:

$$W = W_0 + W_1 + \ldots + W_r, \quad (4)$$

where $W_0$ represents the portion of the weight value assigned to the first replica layer, $W_1$ represents the portion of the weight assigned to the second replica, etc., up to r+1 replica layers with progressively smaller weights. That is, $W_0$ expresses $\alpha_k \times \{-1, 0, 1\}$ of the weight, $W_1$ expresses $$\frac{a_k}{3} \times \{-1, 0, 1\},$$

etc. with $W_x$ generically expressing $$\frac{a_k}{3^x} \times \{-1, 0, 1\}.$$

As a simple example, if W=0.4 and there are only two replica layers (as shown in FIG. 4), then $W_0$=0.3 and $W_1$=0.1. That is, in some embodiments with two replicas, $W_0$=3 W/4, while $W_1$=W/4. For three replicas, using this decomposition, $W_0$=9W/13, $W_1$=3W/13, and $W_2$=W/13.

Other embodiments, rather than initializing the weight values using such a decomposition, simply assign the entirety of the trained weight value to the first replica (the replica with the largest scaling factor), also referred to as the replica with the most-significant ternary digit. In such embodiments, any bias values are also kept the same for this first replica layer as well. For all additional replicas, the weights and biases are initialized to zero. This keeps the network loss and accuracy the same as for the pre-replication network at this point, and these weights and biases will become nonzero during quantization and subsequent training, which are described further below.

The process 300 also defines (at 325) a layer (i.e., a set of nodes) adding together the outputs of the replica layers and applying an activation function. Each node in the original layer has a corresponding node in each of the replica layers (i.e., the structure of each of the replica layers is the same as the structure of the original layer). This additional layer includes a node for each of the groups of corresponding replica nodes that adds together the outputs of each of its corresponding nodes in the replica layers. The activation function can then be applied to this value. The effective result in the case of ternary weights is that each node has an effective set of 9 possible weight values if the layer is duplicated, 27 possible weight values if the layer is triplicated, etc. Similarly, in the case of binary weights, each node effectively has 4 possible weight values if the layer is duplicated and 8 possible weight values if the layer is triplicated.

The second stage 410 of FIG. 4 illustrates the duplication of the node 400 into two replica nodes. As shown in this stage, the node 402 (the node in the first replica layer) receives the three inputs A1, A2, and A3, and has weight values w1", w2", and w3". A second node 415 (the corresponding node in the second replica layer) receives the same three inputs A1, A2, and A3, and has weight values w1', w2', and w3'. In some embodiments, the weight vectors W' and W" are assigned as described above, with w1"=0.75*w1 and w1'=0.25*w1, etc., while in other embodiments w1"=w1 while w1'=0. After quantization, in some embodiments, each of the weights W" can have values in the set $\{0, \alpha_k, -\alpha_k\}$, while each of the weights W' can have values in the set $\{0, \alpha_k/3, -\alpha_k/3\}$. The node 402 in the first replica layer only compute an output value A" that is a dot product of the three inputs A1, A2, and A3 with the three weights w1", w2", and w3", and the node 415 in the second replica layer also outputs the dot product A' of these three inputs with weights w1', w2', and w3'. In some embodiments, these nodes no longer apply the non-linear activation function, but may also apply a bias and/or scale factor.

Instead, an additional node 420 receives both A" and A' (the outputs of the original node 400 and the duplicate node 415), adds these values together, and applies the non-linear activation function F to this sum to compute the new output value A. In addition, as described further below, because the neural network inference circuit of some embodiments requires quantization (e.g., to a 4-bit value) of the output values of each effective layer (i.e., of A' and A", as well as the eventual output value A), some embodiments introduce additional scaling and/or de-scaling for the replica layers to ensure that these intermediate values are added together correctly during inference while minimizing the loss of precision.

After defining replica layers for the currently selected layer, the process 300 determines (at 330) whether there are any additional layers for which to increase the complexity. If additional layers remain, the process 300 returns to 315 to select the next layer. Otherwise, the process performs (at 335) the training process to train the parameters of the modified network. The process 300 then ends. As described in detail below, different embodiments may use different approaches to training the weight values. Some embodiments allow the weight values to be modified on a spectrum (i.e., using a floating-point value) rather than constrained to a set of allowed candidate values during the course of initial training, then use additional constraint terms to force the weight values towards the allowed candidate values during subsequent training. In addition, some embodiments perform sparsification of the network (to ensure that the network includes a threshold number of zero weights), including sparsification of the various replica layers. Additional details regarding the training of some embodiments is provided below.

In addition to enabling certain layers (e.g., layers with a lower number of weight values) to include more complexity and therefore avoid losing network accuracy, the use of replica layers also allows for an increase in the percentage of weight values set to 0 in some embodiments. Because the non-zero weight values can provide more fine-grained analysis, more of the weight values can equal 0 in some embodiments. In addition, at a conceptual level, by replicating these layers, the data flow through the network becomes more laminar, rather than having the data compress down and expand.

II. Quantization and Training of Network with Replica Layers

Figure 5:
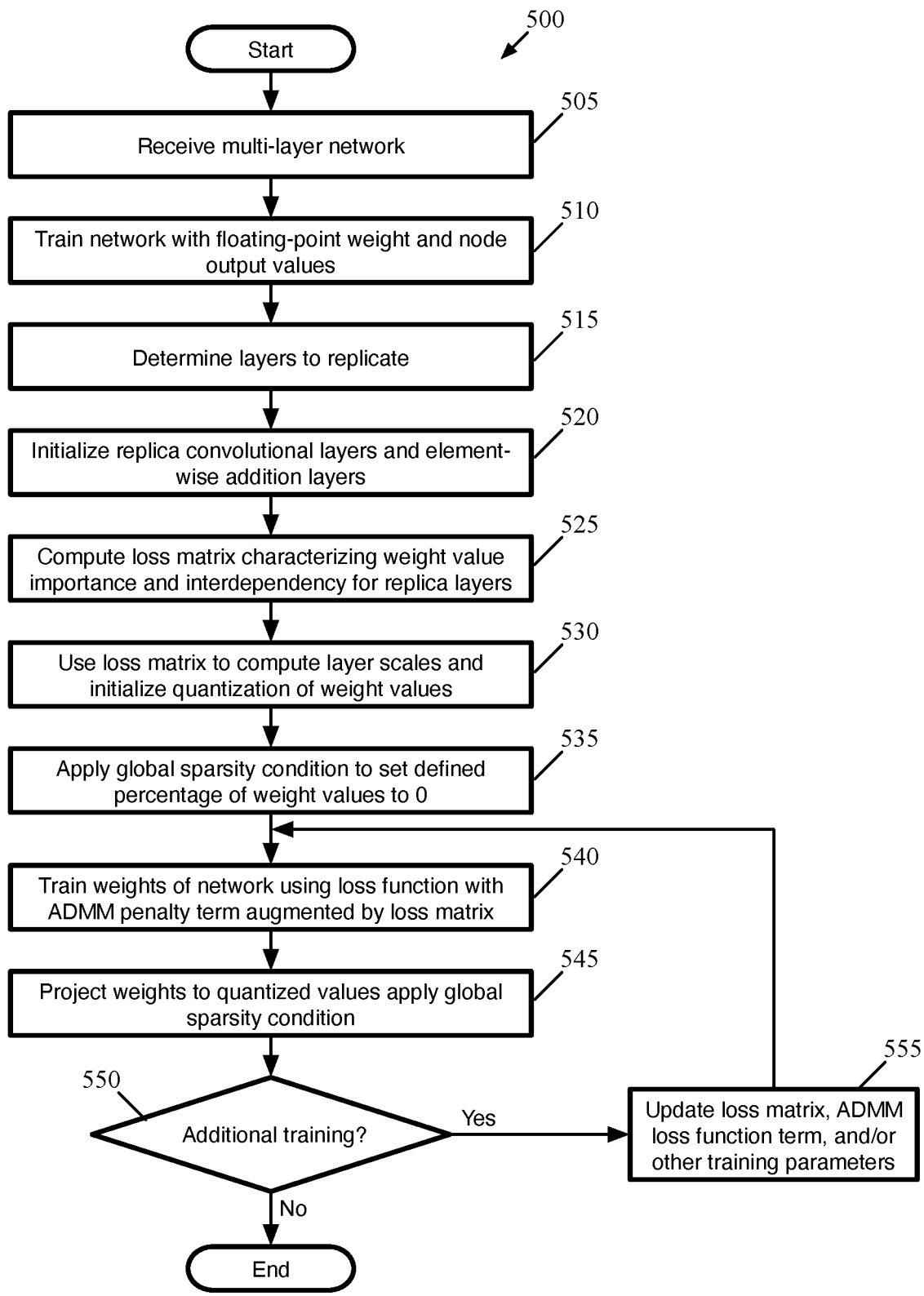
FIG. 5 conceptually illustrates a process of some embodiments for training a quantized multi-layer network (e.g., with ternary weights).

FIG. 5 conceptually illustrates a process 500 of some embodiments for training a quantized multi-layer network (e.g., with ternary weights). The process, in some embodiments, is performed by a network optimization application, which may be a program executing on a single device (e.g., a single laptop or desktop, a mobile device, a physical or virtual server, etc.) or a distributed application that operates on multiple machines (e.g., on multiple physical computers, multiple virtual machines or containers within a datacenter or multiple datacenters, etc.). In some embodiments, the process 500 is an amalgamation of several processes that can be performed by multiple different machines or groups of machines (e.g., a floating-point training process, a quantization process, etc.).

As shown, the process 500 begins by receiving (at 505) a multi-layer network (e.g., a neural network) for training with initialized floating-point weights. The network of some embodiments is made up of numerous computation nodes, organized in layers, that produce output values based on one or more input values. These layers may include convolutional layers, pooling layers, element-wise operation layers, fully-connected layers, etc. In at least a subset of the hidden and output layers (e.g., the nodes of the convolutional and fully-connected layers), each node includes a linear component that uses a set of weight values to linearly combine the input values of the node, as well as a non-linear component that uses the output of the node's linear component to compute the output value for the node. FIG. 1, described above, illustrates an example of such a multi-layer network and the operation of at least a subset of its nodes.

The process trains (at 510) the network with floating-point values for the weights and node output values. Specifically, in some embodiments, this training involves defining a loss function for the network that measures the error (i.e., loss) of the actual output of the network for a particular input compared to a pre-defined expected (or ground truth) output for that particular input. During one training iteration (also referred to as a training epoch), an input data set is first forward-propagated through the network nodes to compute the actual network output for each input in the data set. Then, the loss function is back-propagated through the network to adjust the weight values in order to minimize the error (e.g., using first-order partial derivatives of the loss function with respect to the weights, referred to as the gradients of the loss function). This optimization method for minimizing the output loss function, iteratively repeated over multiple epochs, is referred to as stochastic gradient descent (SGD). During the training, the average sum squares of the gradients are accumulated and stored for later use.

Next, the process 500 determines (at 515) layers of the network to replicate. That is, the process determines which individual layers will be substituted with groups of replica layers and element-wise addition layers (as well as how many replica layers to use). As noted above, different embodiments may identify the layers to replicate as layers that have less than a threshold number of weight values or layers for which the weights are more difficult to train. In addition, some embodiments compute the loss matrix for the network (described below) prior to identifying which layers to replicate, and use this to identify which layers as trained by floating-point values are likely to cause the most error as a result of quantization. Furthermore, some embodiments allow for layers to be replicated after some of the quantized training, and use the updated loss matrix and/or results of the quantized training to determine layers that would be best served by replication (e.g., layers for which the weights are not settling onto their quantized values).

For each layer to be replicated, the process 500 initializes (at 520) the replica convolutional layers as well as the element-wise addition layer. As described above, initialization of the replica layers includes assigning initial floating-point weight values to the replica layers, which can be done by decomposing the original layer weight value based on the number of replicas or by assigning the entirety of the original layer weight value to the first replica (with the most significant ternary digit) and setting the weight values of the other replicas to zero.

Having trained a floating-point network, the process 500 computes (at 525) a loss matrix to characterize the dependence of the accuracy of the network on the floating-point weight values and the interdependency between corresponding weights of replica layers. In some embodiments, the accuracy of the network is represented by the loss function used for floating-point training of the network. In that case, as described in greater detail below, the loss matrix is the Hessian matrix of the loss function, where the diagonal values of the Hessian matrix are second-order partial derivatives of the loss function with respect to each weight in the network. The dependence of the loss increase of the network for a particular weight is proportional to a corresponding diagonal term of the Hessian matrix. Off-diagonal terms of this matrix are mixed derivatives that are single-order derivatives with respect to two of the weights. In some embodiments, for any non-replica layer weights, these terms are zero. However, for groups of corresponding replica weights, the matrix includes non-zero off-diagonal terms that represent interdependency between the weights. For a group of R replicas, some embodiments include R×R blocks of non-zero weights along the diagonal of the Hessian matrix.

To minimize the computational burden of calculating the Hessian terms, some embodiments of the invention approximate the terms of the Hessian matrix using an empirical Fisher approximation method that estimates the Hessian using the first-order partial derivatives (e.g., the gradient) of the loss function that were used during the prior floating-point training iterations of the network. In this case, at initialization of the loss matrix, the R×R blocks for a particular group of R replicas would all have the same value (based on the gradients computed during training of the corresponding floating-point weight).

Other embodiments estimate the loss matrix terms separately from the weight training data, by propagating a set of training inputs through the network (including the replica weights) and sampling from a predicted output probability distribution. These sample probability distributions are in place of ground truth outputs to compare to the actual output distribution (i.e., to compute the loss function), and back-propagation (e.g., the same back-propagation algorithm as used for actual network training) is performed in order to determine the gradients of all of the weights (including the replica weights). These gradients are not used to modify the weights, but instead to compute the loss matrix values. For instance, in some embodiments, the diagonal terms (each corresponding to a single weight) are computed as the outer product of each weight's gradient with itself, while the off-diagonal terms for pairs of related replica weights are computed as the outer product of the gradients of the two relevant replica weights.

The process 500 then uses (at 530) the loss matrix to compute the layer scales and initialize the weights of the network to an initial set of quantized weight values. In some embodiments, the quantized values for the i-th weight $w_i$ is a ternary value $q_i \in \{-1, 0, +1\}$, multiplied by a scaling factor $\alpha_k$ that varies by the layer (i.e., $\alpha_k$ is the scaling factor for layer k). In some embodiments, the scaling factor $\alpha_k$ and the ternary value weight assignments $q_i$ are iteratively calculated based on the floating-point trained weight values and the terms of the loss matrix (e.g., the empirical Fisher approximation to the Hessian matrix of the loss function) calculated at 515. This initialization operation is described in greater detail below.

The process also applies (at 535) a global sparsity condition to the initialized weight values in order to set at least a defined percentage (e.g., 75%, 90%) of the weight values to zero. In some embodiments, a penalty value is calculated for each weight for setting that weight to zero (as compared to setting the weight to a more optimal allowed value, if that is not zero). This penalty, in some embodiments, is based at least in part on the loss matrix, which assigns a relative importance to the weights, as well as the distance of the trained floating-point weights from their allowed quantized values. Without the replica layers, the training process orders these weights based on their calculated penalty values, and the weights with the smallest penalty values are set to zero. For example, if a threshold of 80% is applied, then 80% of the weights are set to zero, and the remaining 20% of the weights are those with the highest importance (e.g., most contribution to the loss).

For groups of corresponding replica weights, the penalty for one weight is dependent on to which allowed value the other weights in the group are set, and thus the interdependency of these weights should be accounted for. Some embodiments compute the penalties for each possible combination of zero and non-zero values for a group of corresponding replicas. For each possible number of weights in the group that can be set to zero, the weight configuration with the minimum penalty is then identified. These minimum penalty options are then used to determine which weights should be set to zero, a process that is described in greater detail below.

After initializing the weights, in some embodiments, the process 500 performs alternating stages to further train the network with quantized weights. After weight initialization, the process 500 retrains (at 540) the (now-quantized) weights of the network using the loss matrix to minimize the loss due to quantization. This retraining begins with the initialized and sparsified weight values and is discussed in further detail below. In this stage, the process 500 performs forward propagation to run a set of inputs through the quantized network (i.e., with the initialized weight values and layer scaling factors), then calculates the value of an updated loss function (that incorporates the loss matrix) based on these inputs and the resulting outputs. This calculated loss function value is used to again perform back-propagation to train the weight values of the network to new values (e.g., new floating-point values). This updated loss function, in some embodiments, starts with the loss function used during the initial floating-point training of the network, with an additional ADMM constraint term that includes a factor based on the loss matrix. The ADMM (Lagrange multiplier) term places a constraint that tends to push the weights towards their allowed values, while the loss matrix factor is a loss-aware term that accounts for the increase in loss when quantizing any individual weight as well as the interdependencies between the groups of replica weights. Due to the presence of this term, this stage does not result in the same floating-point weight values as the initial training from operation 510, which was described above.

The process 500 then projects (at 545) the trained weight values to the allowed quantized values and re-imposes the sparsity condition. This projection stage is an iterative process in some embodiments, that alternates between optimizing the layer scaling factors with the ternary value assignments fixed and optimizing the ternary value assignments with the layer scaling factors fixed. The global sparsity condition is imposed in some embodiments after the iterations for the projection stage have converged. In other embodiments, the sparsity condition is imposed as part of the projection operation.

After the proximal (floating-point training) and projection/sparsity training stages, the process determines (at 550) whether more training is required. Some embodiments use a minimization process (e.g., a stochastic gradient descent minimizer) to determine when to stop training the network. Training is no longer necessary when the MT network has fully quantized weights with minimized loss from the quantization. If the process 500 determines that more training is not required, then the process ends with the quantized network weights defined.

If the process 500 determines that further training is required, then in some embodiments the process updates (at 555) the loss matrix (e.g. by recalculating the Hessian matrix or the Fisher approximation thereof using the retrained weight values), the ADMM loss function term, and/or other training parameters (e.g., layer scales, etc.). The process then returns to 530 to continue training the network.

Figure 6A:
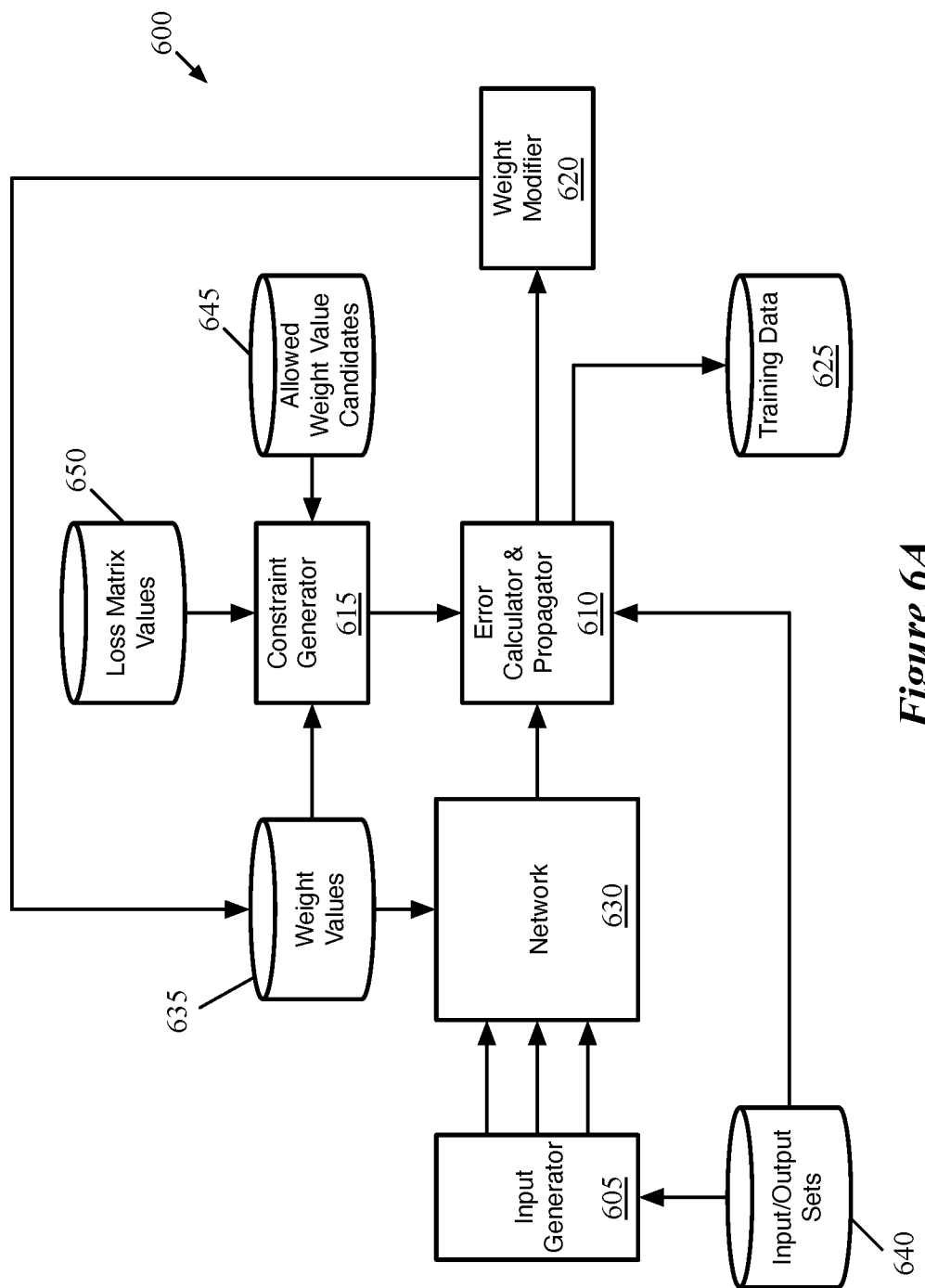
FIGS. 6A-B conceptually illustrate a training system of some embodiments that trains the weight values (and other parameters) of a network so as to ensure that (i) each weight is assigned a value that belongs to a set of allowed weight values for that weight and (ii) at least a threshold percentage of the trained weight values are equal to zero.
Figure 6B:
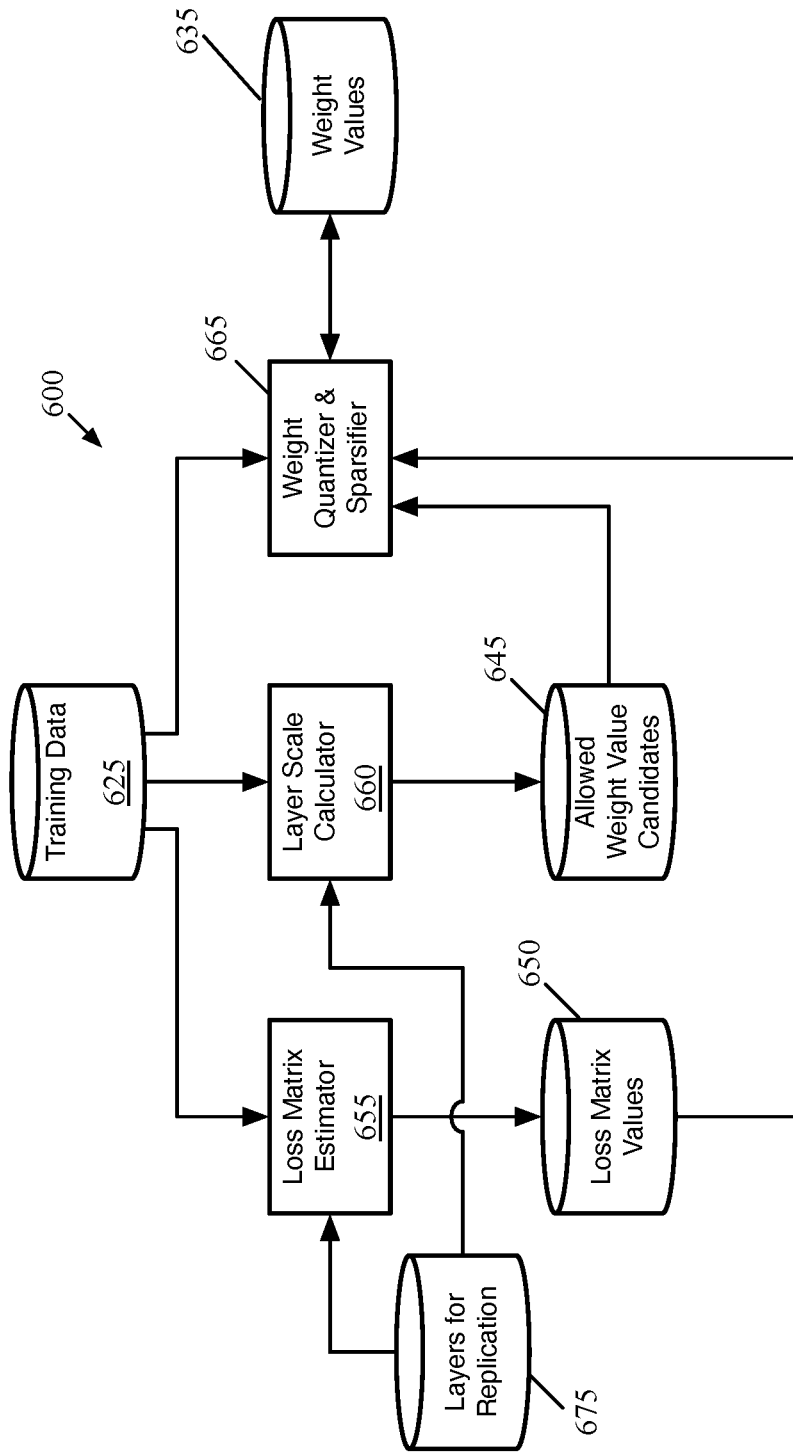

FIGS. 6A-B conceptually illustrate a training system 600 of some embodiments that trains the weight values (and other parameters) of a network so as to ensure that (i) each weight is assigned a value that belongs to a set of allowed weight values (including zero) for that weight and (ii) at least a threshold percentage of the trained weight values are equal to zero. In some embodiments, the training system 600 uses the sets of allowed weight values to generate additional constraint terms for the loss function that are used in the training, in order to constrain the trained weight values to those allowed values. The allowed values may be the same for all nodes in a network being trained, different for each layer of nodes, or different for each node in the network. The resulting weight values are used for the multi-layer machine-trained network when embedded in a device.

As described above, some embodiments initially train the network with floating-point weight values, then use these initially trained weight values to initialize each weight to a quantized value in the set of allowed weight values for that weight. Using the loss function augmented with a constraint term, the Alternating Direction Method of Multipliers (ADMM) technique is used for subsequent training of the quantized values while forcing as many of the weight values as possible to zero. The ADMM technique is described in the paper "Extremely Low Bit Neural Network: Squeeze the Last Bit Out with ADMM" by Leng, Cong, et al., 32nd AAAI Conference on Artificial Intelligence, pp. 3466-3473 (2018), which is incorporated herein by reference. In some embodiments, the training is iterative, and alternately optimizes (i) the portion of the loss function that measures the difference between expected and actual outputs and (ii) the constraint term that forces the weight values to their sets of allowed values.

FIG. 6A illustrates the portion of the training system that (i) performs training on a floating-point (pre-quantization) network and (ii) performs the proximal steps of ADMM training (post-quantization). As shown, the training system 600 has a number of modules, including an input generator 605, an error calculator and propagator 610, a constraint generator 615, and a weight modifier 620, all of which will be described in further detail below. In some embodiments, all of these modules execute on a single device, such as a server, a desktop or laptop computer, a mobile device (e.g., a smartphone, tablet, etc.), a virtual machine, etc. In other embodiments, these modules may execute across multiple interconnected devices (or virtual machines), or separate instances may execute on multiple devices (or virtual machines) for additional computing power.

The network 630 of some embodiments is a multi-layer machine-trained network (e.g., a feed-forward neural network), such as that shown in FIG. 1. This network 630 includes multiple layers of nodes, including a layer of input nodes, at least one layer of hidden nodes, and a layer of output nodes (a typical network will include many layers of hidden nodes, including various different types of layers). Each of at least a subset of the hidden nodes and output nodes includes a linear component (that uses the weight values 635) and a non-linear activation function (i.e., the nodes of convolutional and fully-connected layers). The network 630 receives an input and computes a corresponding output.

The weight values 635 are used to parametrize the network and are trained by the system 600 for the network to perform a particular task. In some embodiments, during the initial training (e.g., before quantizing the weights and training with ADMM), the weights are represented by floating-point values. In some embodiments, the possible candidate weight values (i.e., the set of allowed values) for each weight in the network are the ternary set $\{-1, 0, +1\}$. In other embodiments, the candidate values are different for each layer of the network, with the candidate set being $\{-\alpha_k, 0, +\alpha_k\}$ for the k-th layer. In this case, however, the weights can be normalized to the scale of $\{-1, 0, +1\}$.

During the initial (floating-point) training process of some embodiments, floating-point weight values ranging from $-1$ to 1 are used. During this training, the input generator 605 prepares inputs from the input/output sets 640, which are forward propagated through the network to generate output values. The error calculator and propagator 610 compares these generated output values to expected (ground truth) output values using a loss function. The error calculator and propagator 610 also back-propagates the computed error for a set of inputs (referred to as a minibatch) to determine the rate of change of the loss function with respect to a change in the weight at the current value of the loss function. The weight modifier 620 uses these gradients to modify the weight values for the next training iteration. This process is repeated for multiple minibatches of inputs until the weight values 635 have converged to optimized floating-point values. In some embodiments, the results of this training (e.g., the optimized floating-point weight values, the gradients of the loss function with respect to each weight for one or more iterations of training, individual node outputs used to compute batch normalization parameters) are stored as floating-point training data 625, which is used by other modules of the training system (i.e., those shown in FIG. 6B).

The input/output sets 640 include various inputs to the network as well as the corresponding expected (ground truth) outputs for each of the inputs. For the inputs, some embodiments perform training with a large number of different inputs, as this can help train the weight values for an average input. Each input in an input set may be an image, a voice snippet, etc. that is to be propagated through the network, depending on the specific purpose for which the network is being trained. For example, if a network is being trained to identify faces, the set of inputs will include numerous images of several different people's faces, probably including various types of edge cases (e.g., images where the face is distorted, where objects partially appear in front of the face, etc.). Each input also has a corresponding expected (ground truth) output that is what the network should generate as its output when presented with that input.

For subsequent training to quantize the weight values (e.g., using ADMM), each of the weights is initialized to one of its respective allowed values (as described by reference to the modules shown in FIG. 6B), and these values are used during forward propagation. This initialization is in some embodiments as simple as projecting the floating-point value to the nearest allowed value. In other embodiments, the initialization is an iterative process using the loss matrix, as will be described in further detail below. During subsequent training iterations, the weights may be pushed between the values in their respective sets of allowed values.

As mentioned, in some embodiments, each layer of nodes is assigned a set of allowed weight values during training. That is, after training, each weight value for each node in the layer will have an assigned weight value that is one of the possible weight values for the layer. In some such embodiments, the set of allowed weight values has two possible values (binary) of $\{0, \alpha_k\}$ or three possible values (ternary) of $\{-\alpha_k, 0, +\alpha_k\}$. The $\alpha_k$ for each layer varies between layers in some embodiments. During training, the various techniques described herein are used to constrain the weights to these two or three values and, in some embodiments, to ensure that at least a threshold percentage of the values come out to 0. The allowed weight value candidates storage 645 stores this information (i.e., the $\alpha_k$ for each layer) for use during initialization as well as to generate the constraints used in optimization.

Training of the quantized network during the proximal step of ADMM operates similarly to the floating-point training, but with initially quantized weight values and with additional constraint terms in the loss function. The input generator 605 selects a set of inputs (and corresponding expected outputs) from the input/output sets 640. The network 630 processes these inputs (using the now-quantized weight values 635) to generate computed outputs. The error calculator and propagator 610 uses a loss function that computes the difference between the computed and expected outputs (e.g., the loss function used to train the floating-point weight values) in addition to including other terms specific to training with quantized weight values.

In some embodiments, this loss function includes (i) a first term that measures the difference between the actual output of the network and the expected output of the network, given a training input data set (i.e., a standard loss term) and (ii) a second term that constrains the weights to the sets of allowed values. This constraint term also accounts for the increase in loss when quantizing any individual weight (i.e., due to constraining the weights to the sets of allowed values), as well as the relationship between corresponding weights of replica layers (which make a difference due to quantization of the output values of the layers, as described further below). This constraint term can be referred to as a loss-aware penalty term.

To provide the error calculator and propagator 610 with the correct loss function constraint terms, the constraint generator 615 uses the allowed weight value candidates 645 and the loss matrix values 650. The allowed weight value candidates are the layer scales determined for each weight, a process that is also described below. Both of these sets of values (as well as the current weight values 635, in some embodiments), are used to compute the ADMM penalty term that includes the loss-aware term.

The derivation of such a loss-aware penalty term will now be described. Starting with a floating-point network that converges to a (local) minimum in error, for any change $\delta(w)$ in the neural network parameters, the corresponding change in loss is approximated in some embodiments using a $2^{nd}$ order approximation around the floating-point weight values as follows by Equation (5):

$$\mathcal{L}(w + \delta w) - \mathcal{L}(w) \cong g^T \delta w + \frac{1}{2} \delta w^T H \delta w, \quad (5)$$

where $g = \nabla \mathcal{L}(w)$ is the gradient of the loss function, and $H = \nabla^2 \mathcal{L}(w)$ is the Hessian matrix of the loss function. In other embodiments, a different loss matrix can be used instead of the Hessian to estimate the corresponding change in loss. The loss matrix is assumed to be the Hessian for the purposes of discussion below, but not limited to the Hessian of the loss function in other embodiments.

Using Equation (5), the impact of quantizing a single floating-point weight $w_i$ to a quantized value $q_i$ can be considered. The change in parameter can be written as $\delta(w) = (q_i - w_i) e_i$, where $e_i$ is the unit vector with value of zero everywhere except the i-th position where the value is 1. With this in mind, before accounting for replica layers and considering that that gradient averages to 0 over the training samples (since the floating-point network started from a local minimum), the change in loss from quantizing the i-th weight $w_i$ to a quantized value $q_i$ can be represented by Equation (6) as follows:

$$\mathcal{L}(w + (q_i - w_i) e_i) - \mathcal{L}(w) \cong \frac{1}{2}(q_i - w_i)^2 H_{ii}, \quad (6)$$

where $H_{ii}$ are the diagonal elements of the Hessian matrix H, corresponding to second-order partial derivatives of the loss function with respect to each weight in the MT network.

Referring to FIG. 6B, the loss matrix estimator 655 computes the loss matrix terms using prior training data 625 in some embodiments (e.g., from the floating-point training or, if updating the loss matrix, from recent quantized training). In other embodiments, the loss matrix estimator 655 uses gradient data generated by separately propagating inputs through the network and using predicted probability distribution output samples for loss calculation and back-propagation (e.g., generated by the error calculator and propagator 610). In some embodiments, the loss matrix estimator 655 also uses data 675 indicating which layers are replicated, in order to compute the correct off-diagonal terms for the replica layer weights.

To minimize the computational burden of calculating the Hessian terms, in some embodiments the loss matrix estimator 655 approximates the terms of the Hessian matrix using a Fisher approximation method, as described in further detail below. The Fisher approximation method may be a standard Fisher approximation method or an empirical Fisher approximation method (e.g., an empirical estimate of the Fisher information of $w_i$) in different embodiments. The standard Fisher approximation method of some embodiments uses the predicted probability distribution output samples of inputs separately run through the network to calculate gradient data (e.g., using Monte Carlo estimates). The empirical Fisher approximation method estimates the Hessian by computing first-order derivatives (e.g., gradients) of the loss function (with respect to the weights) during multiple prior training iterations of the MT network, which are part of the stored training data 625. See Theis, Lucas, Korshunova, Iryna, Tejani, Alykhan, Huszár, Ferenc, "Faster Gaze Prediction with Dense Networks and Fisher Pruning," arXiv preprint arXiv:1801.05787, 2018, which is incorporated herein by reference.

As mentioned, in some embodiments the constraint generator 615 uses the loss matrix terms to generate the loss-aware penalty term for use by the error calculator and propagator 610. The standard ADMM penalty term (without the additional loss-aware term) for the loss function is given by:

$$\mathcal{L}_{ADMM} = \frac{\rho}{2}\sum_k \|\hat{W}_k + \lambda_k - Q_k\|^2, \qquad (7)$$

where $\hat{W}_k \equiv W_k/\alpha_k$ and $\lambda_k$ is the Lagrange multiplier for the k-th layer. The penalty assumes that quantization-constraint violations are of equal importance for all weights in a layer, while violations in a layer with a small weight scale ($\alpha_k$) are more expensive than violations in a layer with large weight scale.

Given knowledge of the Hessian (assumed diagonal), it can be used in some embodiments to measure the cost of the constraint violation for any weight. The Hessian (or in this case, the Fisher approximation H) functions as a metric on the space of network weights. The loss-aware ADMM penalty term becomes:

$$\mathcal{L}_{ADMM} = \frac{\rho}{2}(W + \lambda - \alpha Q)^T H(W + \lambda - \alpha Q), \qquad (8)$$

where W is the vector of all the (floating-point) weights $w_i$ and Q is the vector of all the quantized values $q_i \in \{-1, 0, +1\}$. The parameter $\rho$ controls the regularization forces, dictating how fast the quantization will take place. If $\rho$ is too large, the penalty loss will be given a too big importance, the weights will be strongly pulled towards their projected counterparts, and the network will be quickly quantized, but with a large loss in precision. If $\rho$ is too small, the penalty loss will not matter, and the weights will never get pulled closer to a quantized version. In some embodiments, the algorithm uses individual values $\rho_k$ per layer. In other embodiments, a global value of $\rho$ is used for all layers.

Equation (8) can also be written as:

$$\mathcal{L}_{ADMM} = \mu^T(W - \alpha Q) + \frac{\rho}{2}(W - \alpha Q)^T H(W - \alpha Q). \qquad (9)$$

Here, $\mu$ is a vector of Lagrange multipliers (for the sparse quantization constraints) and $\alpha$ is a diagonal matrix that operates on the weight space that provides the per-layer weight scale. It should be noted that $\lambda$ is usually used (as in Equation (8)) to denote the Lagrange multipliers divided by $\rho$ and for a modified constraint, expressed in terms of the normalized weights: $W_k/\alpha_k - Q_k = 0$. During loss-aware ADMM, the loss matrix sets the scale for the curvature, not $\alpha^2$, so working with normalized weights is no longer helpful. As such, some embodiments work with the unscaled Lagrange multipliers for a constraint on the unnormalized weights; to avoid confusion, this document refers to the vector of these multipliers as $\mu$ rather than $\lambda$. Because $\mu$ is unscaled and constrains the unnormalized weights, it does not need to be updated when the value of $\rho$ or $\alpha_k$ is changed, unlike $\lambda$.

For further discussion of these details, the results are expressed in terms of tensor components. Specifically, the weight tensor is indexed as $W_{kra}$, where k is the index of the original layer, r is the replica index, and a represents all the other indices (e.g., in the case of a convolution layer a would represent output channel, input channel, x and y), which can be referred to as the weight index. By assumption, the FIM only includes off-diagonal entries that couple weights representing corresponding weights within a group of replica layers (i.e., weights that have the same original layer index and weight index, but different replica indices). Let $H_{kra,lsb}$ be the FIM element connecting weights $W_{kra}$ and $W_{lsb}$. By assumption, this FIM element is zero unless the weights are in the same (original) layer, i.e., k=l, and correspond to the same weight in the original layer, so a=b, but otherwise the replica indices can differ, i.e., r≠s. Therefore, $$H_{kra,lsb} = \delta_{kl}\delta_{ab}H_{kra,lsa}, \qquad (10)$$

where $\delta_{ij}$ is Kronecker delta. Hence the ADMM penalty term, accounting for replica layers, is expressed in terms of tensor components as:

$$\mathcal{L}_{ADMM} = \sum_{k,r,a}\mu_{kra}(W_{kra} - \alpha_{kr}Q_{kra}) + \qquad (11)$$
$$\frac{\rho}{2}\sum_{k,r,s,a}(W_{kra} - \alpha_{kr}Q_{kra})H_{kra,ksa}(W_{ksa} - \alpha_{ks}Q_{ksa})$$

Assuming the replica scales are related by powers of 3, then $$\alpha_{kr} = \frac{\alpha_{k0}}{3^r}.$$

The above Equation (11) can then be used to compute the ADMM penalty terms for the proximal step (as part of the loss function used for adjusting the weights through back-propagation) and the projection step (to determine which weights to set to zero and non-zero quantized values).

The training system 600, as shown in FIG. 6B, also includes a layer scale calculator 660 and a weight quantizer and sparsifier 665. In some embodiments, the layer scale calculator 660 initializes the weight scales for each layer of the network by calculating the variance (or standard deviation) of the floating-point weight values of the weights in the selected layer. The positive and negative values of variance (or, alternatively, the standard deviation) are then defined as the scaling factors for that layer. For example, if the scaling factor for the k-th layer calculated in this manner is represented by $\alpha_k$, the ternary discrete values that are allowed for weights are $\{-\alpha_k, 0, +\alpha_k\}$. For replica layers, in some embodiments the weight scale for the most significant layer (i.e., index r=0) is calculated in this same way, and the other replica layer scales are computed as $$\alpha_{kr} = \frac{a_{k0}}{3^r}.$$

In some embodiments, the layer scale calculator 660 can adjust the layer scales during training, as well as during initialization based on the assigned quantized weight tensor Q. Specifically, minimizing the ADMM penalty loss over for a given Q, and using the relationship between the replica scales, $\alpha_{kr}=\alpha_{k0}/3^r$, the weight scale for the most significant replica for layer k is given as:

$$\alpha_{k0} = \frac{\sum_{rsa} 3^{-r} Q_{kra}\left(H_{kra,ksa} W_{ksa} + \frac{1}{\rho}\delta_{rs}\mu_{ksa}\right)}{\sum_{rsa} 3^{-(r+s)} Q_{kra} H_{kra,ksa} Q_{ksa}} \quad (12)$$

So long as there is one replica weight with Q and diagonal FIM element both nonzero, the denominator of Equation (12) will be non-zero (and is always non-negative).

The weight quantizer and sparsifier 665 performs the initial weight assignment (and sparsification) as well as the projection step of ADMM training. In some embodiments, the weights are simply snapped to their nearest candidate from their layer in the allowed weight values 645. For a group of corresponding replica weights (i.e., a group of weights with the same original layer index and weight index), some embodiments identify the configuration of the allowed weight values that adds up to the closest value to the floating-point value for the weight.

In addition, as mentioned, some embodiments require a certain threshold of sparsification (i.e., a particular percentage of the weights in the network to be set to zero). In order to minimize the impact on the loss that arises from imposing the sparsity condition, some embodiments compute the ADMM penalty for the quantization of each weight, and attempt to minimize this penalty while (i) assigning all of the weights to one of their respective allowed values and (ii) imposing the sparsity condition so that at least a minimum number of the weights are set to zero. Without the use of replica layers, each of the weights can be treated independently, and the training system sets to zero the weights with the smallest penalties for doing so. This penalty can be measured in different embodiments based on distance of the initially-trained value from zero or a more complex calculation involving multiple factors. In some embodiments, this calculation identifies an importance of the weight as indicated by the gradient terms used to calculate the loss matrix.

For replica layers, setting one of a group of corresponding weights to zero has an effect on the other weights, and therefore the initialization and sparsification is more complex. For a set of R replica layers, there are numerous groups of R corresponding weights. Some embodiments identify, for each such group, the minimum penalty for each possible number of parameters (i.e., 0, 1, 2 . . . R) being set to zero, and use these penalties to determine the optimal number of weights to set to zero for each group (and which of the weights in the group to set to zero). Specifically, some embodiments identify the biggest decrease in the penalty for changing weights from zero to non-zero and use this number of non-zero weights (allowing for the possibility of increasing the number of non-zero weights if possible). It should be noted that this algorithm for setting the weights of the replica layers does not rely on the use of the loss matrix to compute the penalties (i.e., the algorithm can be used even when other techniques are used to compute the penalties for the groups of replica weights).

As described in detail above, some embodiments calculate the loss-aware penalty term of the loss function using the Hessian matrix of the first term of the loss function (that measures the difference between actual output and expected output). In some embodiments, the loss increase for a particular weight is linearly related to a corresponding diagonal term of the Hessian matrix. To minimize the computational burden of calculating the Hessian terms, some embodiments approximate the diagonal terms of the Hessian matrix using an empirical or Monte Carlo Fisher approximation method. These Fisher approximation methods estimate the Hessian by computing first-order derivatives (e.g., gradients) of the loss function (with respect to the weights). For the empirical Fisher approximation method, these gradients are those calculated during multiple prior training iterations of the MT network. For the Monte Carlo Fisher approximation method, the gradients are separately computed by propagating a set of training inputs through the network (including the replica weights) and sampling from a predicted output probability distribution. These sample probability distributions are in place of ground truth outputs to compare to the actual output distribution (i.e., to compute the loss function), and back-propagation (e.g., the same back-propagation algorithm as used for actual network training) is performed in order to determine the gradients of all of the weights (including the replica weights).

Figure 7:
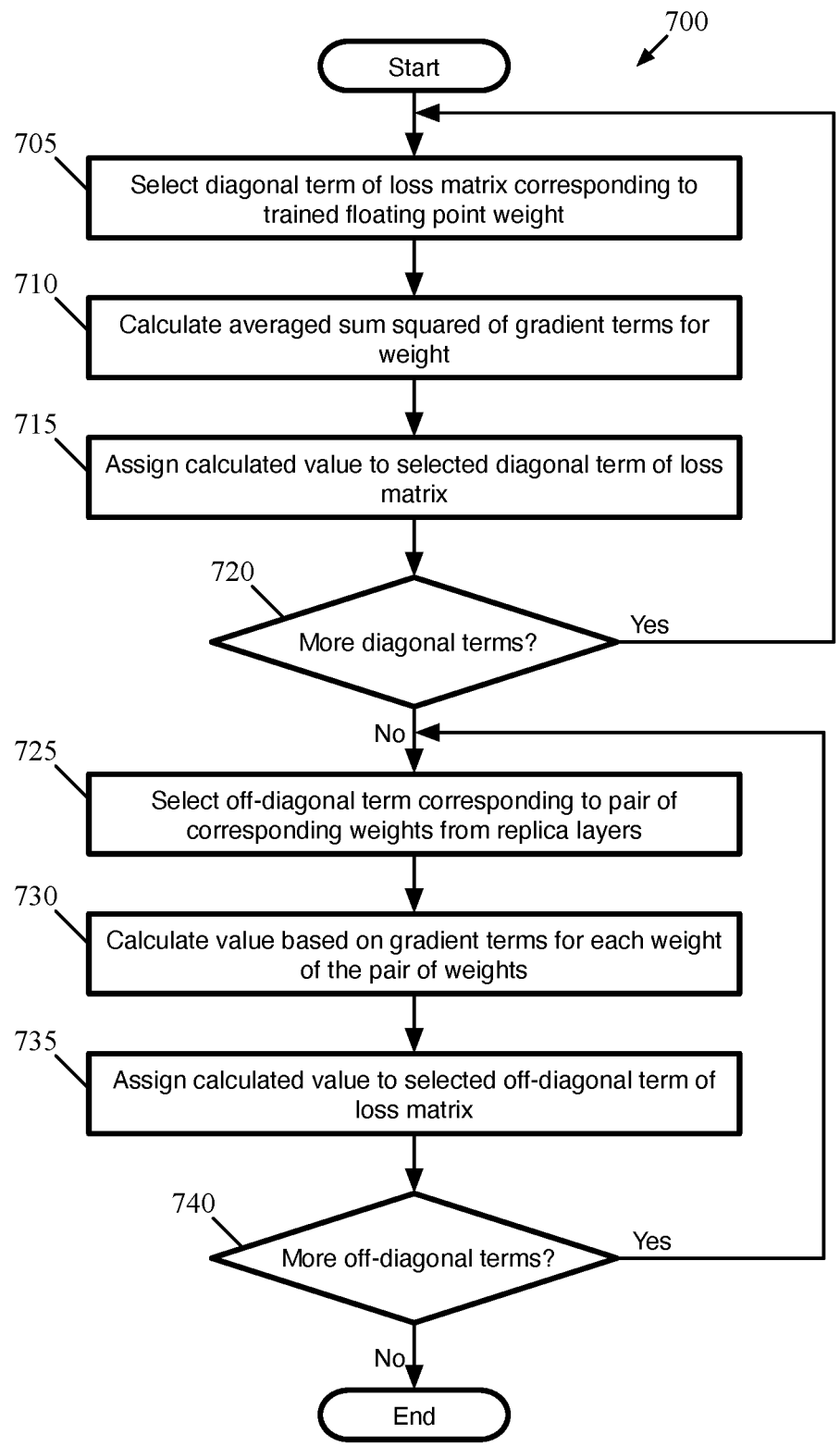
FIG. 7 conceptually illustrates a process of some embodiments for calculating the terms of this loss matrix.

FIG. 7 conceptually illustrates a process 700 of some embodiments for calculating the terms of the loss matrix. This process 700, or a different process similar to the illustrated process, may be performed by the loss matrix estimator 655 or a similar module in some embodiments. The process 700 will be discussed by reference to FIGS. 8-12, which conceptually illustrate different stages of the Fisher approximation method of some embodiments.

As shown, the process 700 begins by selecting (at 705) a diagonal term of the loss matrix corresponding to a trained floating-point weight value. FIG. 8 illustrates an example Hessian matrix 800 which is a square matrix of size M×M, where M is the total number of weights. The off-diagonal terms of the Hessian matrix are second-order partial derivatives of the loss function with respect to two different weights, while the diagonal terms are second-order partial derivatives with respect to a single weight. Accordingly, the first diagonal term corresponds to a first weight of the matrix, the second diagonal term corresponds to a second weight of the matrix, etc.

The process 700 then calculates (at 710) the averaged sum squared of the gradient terms for the weight. As mentioned, in some embodiments, these are gradients calculated for the weight during multiple prior training epochs (i.e., when using an empirical Fisher approximation method). FIG. 9 illustrates an example of these gradients 900 as a matrix of N columns (corresponding to each of the previous training epochs) and M rows (for M weights of the network). In this example, $g_{ni}$ is the gradient of the loss function with respect to the n-th prior floating-point training iteration, for the i-th weight. As noted, the training system 600 of some embodiments stores these gradient terms during the floating-point training of the network (as these terms are computed for backpropagation), so no extra computation is involved (though storage is required for multiple training epochs worth of gradients). The averaged sum squared $\beta_i$ of the N gradient terms for the selected (i-th) weight is given by:

$$\beta_i = \frac{1}{2N}\sum_{n=1}^{N} g_{ni}^2. \quad (13)$$

FIG. 10 illustrates the average sum squared gradients 1000 as a vector of length M (the number of weights in the network). These terms are independent of the quantized value chosen for the weight in some embodiments.

In other embodiments, the gradients are calculated by propagating a set of training inputs through the network and sampling from a predicted output probability distribution for each input. These sample probability distributions are used in place of ground truth outputs to compare to the actual output distribution (i.e., to compute the loss function), and back-propagation (e.g., the same back-propagation algorithm as used for actual network training) is performed in order to determine the gradients of all of the weights (including the replica weights). Some embodiments use this method when possible (rather than the empirical Fisher approximation method) as it provides more accurate results despite the additional computation required. However, this technique requires a loss function that takes the form of a negative log-likelihood (i.e., that measures surprise). For instance, if the network output is a one-hot classifier (e.g., classifying objects in images between different possible categories), then such a loss function is typical. However, for multiple object detection or other complicated network outputs, formulating the loss function as a negative log-likelihood may be more difficult (in which case the empirical Fisher approximation method is used). Rather than computing an average sum-squared of the gradients, some embodiments compute the outer product of the gradient identified in this manner for the weight corresponding to the currently-selected diagonal term with itself.

Once the square of the gradient $\beta_i$ has been calculated, the process 700 assigns (at 715) this value to the selected diagonal term of the Hessian matrix. The value $\beta_i$ is actually the Fisher approximation $H_{ii}$ to the corresponding i-th diagonal term of the Hessian matrix. FIG. 11 illustrates an example of portions of a Fisher matrix 1100 for non-replica weights, with only diagonal terms non-zero. Some embodiments also introduce a scaling factor between the averaged sum squared gradient $\beta_i$ and the corresponding diagonal Fisher matrix entry.

The process 700 then determines (at 720) whether additional diagonal terms remain. So long as additional diagonal terms remain, the process 700 returns to 705 to select the next diagonal term for the next weight. Once all of the diagonal terms are computed, the process selects (at 725) an off-diagonal term corresponding to a pair of corresponding weights from replica layers. As shown, the off-diagonal terms of the Hessian matrix are second-order partial derivatives of the loss function with respect to two different weights. Some embodiments organize the weight terms in this matrix such that corresponding weights of replica layers are grouped together, and thus for a set of R replicas, the diagonal and off-diagonal terms of interest (i.e., the partial derivative of the loss term with respect to two different corresponding weights from two replica layers) form R×R blocks along the diagonal of the Hessian matrix.

The process 700 then calculates (at 730) the value based on the gradient terms for each weight of the pair of weights. As mentioned, in some embodiments, these are gradients calculated for the weight during multiple prior training epochs (i.e., when using an empirical Fisher approximation method). In some embodiments, prior to quantization, the replica weights will not have been trained independently. In some such embodiments, all of the diagonal and off-diagonal Hessian matrix terms for a group of replica weights are the same, equal to the averaged sum squared of the corresponding original layer weights. When the loss matrix is recalculated after training with quantization, the gradients of the weights may differ somewhat within a group of corresponding replica weights due to quantization of the node outputs, although there will typically be a high amount of correlation.

Some embodiments modify Equation (13) above, for two weights with index x and y, to use $g_{nx}g_{ny}$ rather than $g_{ni}^2$.

As with the diagonal terms, some embodiments instead use gradients calculated by propagating training inputs through the network and sampling from a predicted output probability distribution for each input. In this case, whether calculating the loss matrix after initialization of replica layers or after subsequent ADMM training, some embodiments compute the outer product of the gradients of the two relevant replica weights for the selected off-diagonal term.

The process 700 assigns (at 735) the calculated value to the selected off-diagonal term of the Hessian matrix. FIG. 12 illustrates an example of portions of a Fisher matrix 1200 for replica weights. In this example, there are two replica layers, with weights 1 and 2 corresponding weights within a first group and weights 3 and 4 corresponding weights within a second group. As such, the portion of the Fisher matrix 1200 includes 2×2 blocks of non-zero values, with the other off-diagonal values set to zero. In some embodiments, $H_{xy}=H_{yx}$, so only one of these values needs to be computed and stored (and is used for both of these off-diagonal terms of the matrix).

Lastly, the process 700 determines (at 740) whether additional off-diagonal terms remain. So long as additional terms remain to be computed, the process 700 returns to 725 to select the next off-diagonal term for the next pair of weights. Once all of the non-zero terms of the loss matrix have been computed, the process 700 ends. It should be understood that the illustrated process 700 is a conceptual process, and different embodiments may use variations on this process. For instance, while the process 700 computes all of the diagonal terms and then subsequently computes all of the off-diagonal terms, some embodiments compute many of the Fisher matrix terms in parallel or in a different order (e.g., computing all of the diagonal and off-diagonal terms for a group of replica weights together).

After initial pre-quantization training, and with the loss matrix terms computed, some embodiments initialize the quantization process by determining the allowed values (i.e. the scaling factor, or $\alpha_k$) for each layer and assigning each of the weights one of their respective allowed values (e.g., one of $\{-\alpha_k, 0, \alpha_k\}$, in the case of ternary weights). For replicated layers, prior to initializing quantization, the floating-point (or otherwise non-quantized) values of the various replica layers are set. As described above, some embodiments decompose the trained non-quantized value for the initial layer (e.g., 0.8) into a set of values for the replica layers based on analysis that involves the relative scales of the replica layers (e.g., if a weight trained to 0.8 is decomposed into three weights in three layers, these could be 1.0, −0.3, 0.1). Other embodiments instead assign the entirety of the initially-trained weight value to a first one of the replica layers, and set the others to 0 (e.g., in the previous example, the weight trained to 0.8 would be decomposed into 0.8, 0.0, 0.0).

Initializing the quantization of the weight values in order to train the quantized network requires determining the scaling factor for each layer (including replica layers) and initializing each weight to one of the scaled ternary values. In some embodiments, the scaling factor for each layer of the network is first calculated by taking the variance of the floating-point weight values of the weights in that layer. The weight values in the k-th layer are initialized to the quantized values in some such embodiments by assigning each weight value to the nearest scaled ternary value, e.g. $\{-\alpha_k, 0, +\alpha_k\}$. In other embodiments, the scaling factor and the initial weight value assignments are iteratively calculated based on the floating-point weight values of the network and the gradient terms from the prior training iterations of the MT network that were used to calculate the Fisher approximation to the Hessian matrix.

In some embodiments, to introduce quantization for replica layers without using the loss matrix and assuming layer scales have been calculated, groups of corresponding replica weights $W_i$ are quantized to values $Q_0, Q_1, \ldots Q_x \cdots \in \{-1, 0, 1\}$, with $W_0$ expressed using $\alpha_k Q_0$, $W_1$ expressed using $$\frac{\alpha_k}{3} Q_0,$$

etc. This gives Q defined as:

$$Q = Q_0 + \frac{Q_1}{3} + \frac{Q_2}{9} + \ldots + \frac{Q_x}{3^x} + \ldots + \frac{Q_r}{3^r}. \quad (14)$$

The goal in assigning the initial quantized weight values Q is to minimize $$\left\| \frac{W}{\alpha} - Q \right\|,$$

which results in the function $$J = \min_{W_0, W_1, \ldots, W_r} \left\{ \left( \frac{W_0}{\alpha} - Q_0 \right)^2 + \left( \frac{3 W_1}{\alpha} - Q_1 \right)^2 \ldots + \left( \frac{3^r W_r}{\alpha} - Q_r \right)^2 \right\} \quad (15)$$

subject to the previous two equations for W and Q.

By zeroing the first derivatives, this equation leads to the following solutions, which can serve as initialization conditions:

$$\frac{W_0}{\alpha} - Q_0 = \frac{9^r}{1 + 9^r R} \left( \frac{W}{\alpha} - Q \right) \quad (16)$$

and, in the general case, for x=0, 1 ... r−1 (where r is the number of replica layers):

$$\frac{W_x}{\alpha_k} - \frac{Q_x}{3^x} = \frac{1}{9^x} \frac{9^r}{1 + 9^r R} \left( \frac{W}{\alpha} - Q \right), \quad (17)$$

where $$R = \frac{1 - \frac{1}{9^r}}{1 - \frac{1}{9}}.$$

This gives a generic initialization relation for a replica x as:

$$W_x = \frac{1}{9^x} \left( 1 - \frac{1}{9} \right) \left( 1 + \frac{1}{9^{r+1} - 1} \right) (W - \alpha_k Q) + \alpha_k \frac{Q_x}{3^x}, \quad (18)$$

with each $Q_x \in \{-1, 0, +1\}$. Additional discussion regarding quantization of replica layers without the use of the loss matrix is found in U.S. patent application Ser. No. 16/684,128, filed Nov. 14, 2019, which is incorporated herein by reference. This discussion also describes the computation of the penalty terms used for quantization and sparsification in some embodiments, without the use of the loss matrix.

Figure 13:
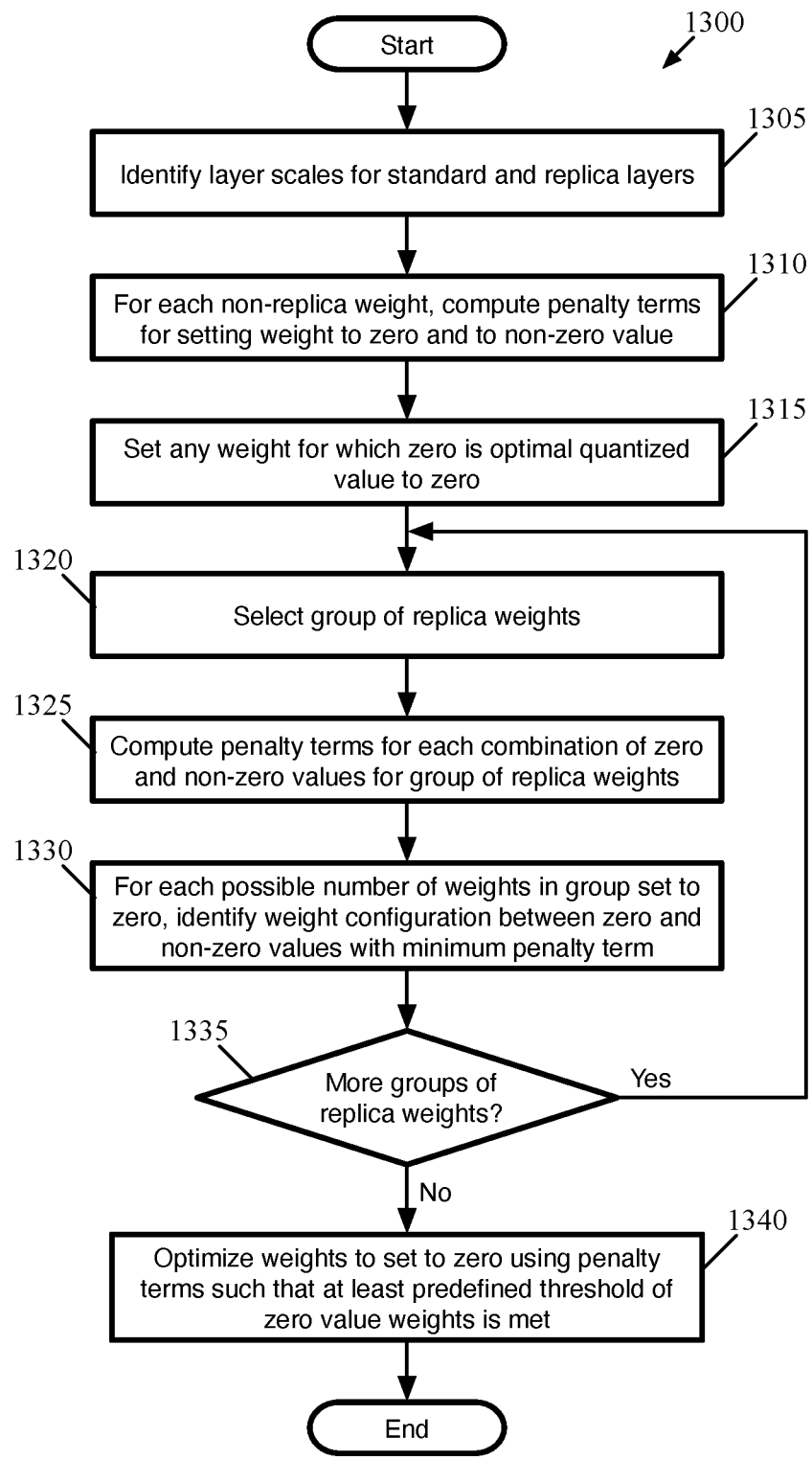
FIG. 13 conceptually illustrates a process of some embodiments for quantizing the weight values of a network with replica layers while meeting a required sparsification threshold.

As an alternative to the discussion in the above-mentioned patent application, FIG. 13 conceptually illustrates a process 1300 of some embodiments for quantizing the weight values of a network with replica layers while meeting a required sparsification threshold. This process 1300 of some embodiments also does not require the use of the loss matrix to calculate penalty values, but can accommodate its use. In some embodiments, various portions of the process 1300 are performed by the layer scale calculator 660 and/or weight quantizer and sparsifier 665 shown in FIG. 6B, or a similar set of modules.

As shown, the process 1300 begins by identifying (at 1305) layer scales for the standard (non-replicated) and replica layers of the network. In some embodiments, the scaling factor for each layer of the network is calculated by taking the variance of the floating-point weight values of the weights in that layer (i.e., as trained by the floating-point training). Other embodiments iteratively calculate these layer scales based on the floating-point weight values of the network and the gradient terms from the prior training iterations of the MT network that were used to calculate the Fisher approximation to the Hessian matrix. Specifically, some embodiments consider the loss increase $\Delta_1$ due to quantization of any individual weight $w_i$ to a quantized value $q_i$. As noted above, in some embodiments the diagonal loss matrix terms are the averaged sum square of the gradient terms $\beta_i$, which are an empirical Fisher approximation to the diagonal terms of the Hessian matrix. This loss increase $\Delta_1$ is represented in such embodiments by Equation (19) as follows, which is derived from substitution of Equation (13) into Equation (6) as follows:

$$\Delta_i = \mathcal{L}(w + (q_i - w_i) e_i) - \mathcal{L}(w) = (q_i - w_i)^2 \beta_i \quad (19)$$

In this equation, the loss increase $\Delta_1$ is linearly dependent on the loss matrix terms. One simplifying assumption of some embodiments is that the total increase in loss from quantization of the weight values equals the sum of the individual losses. In that case, for the k-th layer with M filters in the MT network, the loss increase is written as:

$$\Delta_i = (\alpha_k q_i - w_i)^2 \beta_i, i \in [1 \ldots M], \quad (20)$$

where $\alpha_k$ is the scaling factor for the k-th layer while $q_i \in \{-1, 0, +1\}$. In order to minimize the total loss, the sum of these errors should be minimized as follows:

$$\min \sum_{i=1}^{M} \Delta_i \equiv \min \sum_{i=1}^{M} \beta_i (\alpha_k q_i - w_i)^2. \quad (21)$$

Equation (21) can be solved in some embodiments by applying an iterative strategy, as described in "Extremely Low Bit Neural Network: Squeeze the Last Bit Out with ADMM" by Leng, Cong, et al. (incorporated by reference above). In some embodiments, this iterative strategy is applied on a layer-by-layer basis. First, for the k-th layer with M filters, the process computes the layer scaling factor $\alpha_k$ from Equation (12):

$$\alpha_k = \frac{\sum_{i=1}^{M} w_i \beta_i q_i}{\sum_{i=1}^{M} \beta_i q_i^2}. \quad (22)$$

Here, $q_i$ is actually $q_{ki}$ since the strategy is applied on a layer-by-layer basis. The vector of all quantized values for the k-th layer can be accordingly represented as $Q_k$. However, this need not be the case, as will be discussed in further detail below. The initial value of $q_i$ used to calculate $\alpha_k$ according to Equation (22) is randomly assigned in some embodiments. In other embodiments, the initial value of $q_i$ is chosen to minimize the term $(\alpha_k q_i - w_i)$, though after the iterative process has converged, the final values of $q_i$ may not satisfy that condition for all weights, since Equation (21) is a minimization over the sum of all the residual quantization errors.

Such a method uses the layer scaling factors to compute $q_i$ for each weight in the k-th layer as a projection of $$q_i = \prod_{\{-1,0,+1\}} \frac{w_i}{\alpha_k}. \tag{23}$$

on the ternary set $\{-1, 0, +1\}$:

$$\frac{w_i}{\alpha_k}$$

With the computed values of $\alpha_k$ for each layer and $q_i$ for each weight in that layer, this method of some embodiments determines whether the minimization of Equation (21) has converged. If the minimization has not converged, then the method continues updating the layer scaling factors and projecting the floating-point weights onto the updated ternary sets.

The interdependence of the replica layers, however, complicates the projection of the weights onto their allowed candidate values (i.e., the setting of the quantized weight tensor Q), and other embodiments do not use such an iterative process that alternatively modifies the weight tensor Q and the layer scales $\alpha_k$. Instead, some embodiments use a fixed set of $\alpha_k$ for the standard and most significant replica layers. In much of the discussion above and below, the replica layer scales are assumed to be set by $$\alpha_{kr} = \frac{\alpha_{k0}}{3^r}.$$

However, other embodiments do not set this strict requirement, and allow the scales of the replica layers to vary based on the trained floating-point weights. As a simple example, if the trained weights were clustered around +/−0.75 and +/−0.25, then a set of two replica layers could have $\alpha_{k0}=1$ and $\alpha_{k1}=0.25$. If a third layer was used, the scale $\alpha_{k2}$ for that third layer might be a very small number to account for minor variations of the weights around +/−0.75 and +/−0.25.

Returning to FIG. 13, the process 1300 next computes (at 1310), for each non-replica weight, the penalty terms for setting the weight to zero and to an optimal non-zero value. For a given non-replica weight, the penalty term for setting that weight to a particular quantized value is not linked to the quantized value for any other weights (as opposed to the replica weights). In some embodiments, the penalty term for each non-replica weight is given by Equation (9) above, which is simpler in the case of non-replica weights as the FIM does not include any relevant non-zero off-diagonal entries. In general, the optimal candidate value for a given weight (ignoring sparsification) is the value to which the trained floating-point value is closest. However, due to sparsification thresholds, for each weight, the penalty term is computed for (i) setting the weight to zero and (ii) setting the weight to the optimal candidate value.

For some of these weights, zero is the optimal candidate value. The process 1300 sets (at 1315) any such weight for which zero is the optimal quantized value to the value zero. Because the goal of sparsification is to set at least a threshold percentage of the weights to zero, any non-replica weight for which zero is the optimal value will be set to that value, before performing additional sparsification.

Next, the process 1300 selects (at 1320) a group of replica weights. As described above, a group of replica weights refers to all weights with the same original layer index and same weight index, but with varying replica layer indices. In the context of the network, each of these weights is multiplied by the same input activation, and modifications to the value of one of the weights can affect the optimal settings for the other weights. As such, the penalty terms for the weights within a group are interrelated.

The process 1300 computes (at 1325) penalty terms for each combination of zero and non-zero values for the selected group of replica weights. Temporarily ignoring the sparsity constraint, the ternary weight values $Q_{kra}$ can be optimized independently for each group of $R_k$ replica weights with the same weight index a, and thus correspond to the same weight in the original network), by minimizing Equation (11), with k and a constant:

$$\mathcal{L}_{ADMM}^{ka} = \sum_{k,r,a} \mu_{kra}(W_{kra} - \alpha_{kr} Q_{kra}) + \frac{\rho}{2} \sum_{r,s}(W_{kra} - \alpha_{kr} Q_{kra}) H_{kra,ksa}(W_{ksa} - \alpha_{ks} Q_{ksa}) \tag{24}$$

Using these computed penalty terms, the process 1300 identifies (at 1330), for each possible number of weights in the group set to zero, the weight configuration (i.e., assignment of the weights to quantized values) with the minimum penalty term. That is, for a set of $R_k$ replicas, a group of weights can have anywhere from 0 to $R_k$ zero-value weights. There is only one configuration with $R_k$ zero-value weights (where all of the weights are zero), and there are a total of $3^{R_k}$ possible weight configurations that are computed at 1325. By computing the penalty term for each possible weight configuration, the optimal configuration for each number of zero-value weights can be determined.

The process 1300 determines (at 1335) whether additional groups of replica weights remain. So long as additional groups remain, the process returns to 1320 to compute the combined penalty terms for the various possible configurations of each group of replica weights. The process 1300 cycles through all of the groups of replica weights for each set of replica layers based on different original layers of the network.

Once the penalty terms have been computed for all of the groups of replica weights (for each of the replicated layers), the process 1300 optimizes (at 1340) the weights to be set to zero using the penalty terms such that at least a predefined global sparsity threshold of zero value weights is met. The process 1300 then ends. Without accounting for replica weights, this process would simply order the weights based on the change in penalty terms for setting the weights to zero, and move those weights to zero that have the lowest addition to the penalty term for doing so until the threshold percentage of zero-value weights is reached.

However, due to the inter-relatedness of the groups of replica weights, some embodiments use a more complicated process for networks with replica layers. Some such embodiments start from a state in which all of the weights are set to zero in all layers, and then greedily award non-zero values to the groups of weights (or individual weights for non-replica layers) that provide the largest penalty reduction per nonzero weight, repeating this process until we reach the limit on the number of nonzero weights specified by the sparsity threshold.

Some embodiments use a heap data structure for this sparsification/optimization process. As described, for each group of replica weights (and each individual non-replica weight), the penalty term is identified for the optimal weight configuration for each number of non-zero weight values. The process then populates a heap with candidates for nonzero digits. Each group of replica weights adds entries to the heap for using $1, 2 \ldots, R_k$ non-zero weight values. Each heap entry has its key based on the reduction in the penalty due to using non-zero weight values. The key is equal to the reduction in the penalty per non-zero weight value used. Candidates that increase the penalty are not pushed. Candidates that are dominated, by options with fewer zeros and same or better cost, are not pushed.

After initializing the heap, the process awards nonzero weight values using the heap, picking the candidate that enables the largest penalty reduction, until the maximum allowed number of nonzero digits is reached based on the specified global-sparsity target (or until the heap is empty, in which case the network will have more non-zero weight values than is required by the sparsity condition). If a candidate is popped and the new group of replica weight values still includes zeros, new candidates for the weight are pushed that would convert 1, 2, etc. of the remaining zero values to nonzero values, again with the heap key equal to the penalty reduction per nonzero weight value. It should be noted that the heap may include stale entries that propose to convert ternary weight values from zero to nonzero that have already been converted by a previous pop. The process can detect a stale heap entry when it is popped if both the initial and final number of nonzero digits is stored in the heap entry and compared to the initial number with the current number for that group of replica weights. Non-replica weights are popped (and converted to non-zero weights) when their penalty reduction for doing so is larger than any penalty reduction per weight for a group of replica weights.

Figure 14:
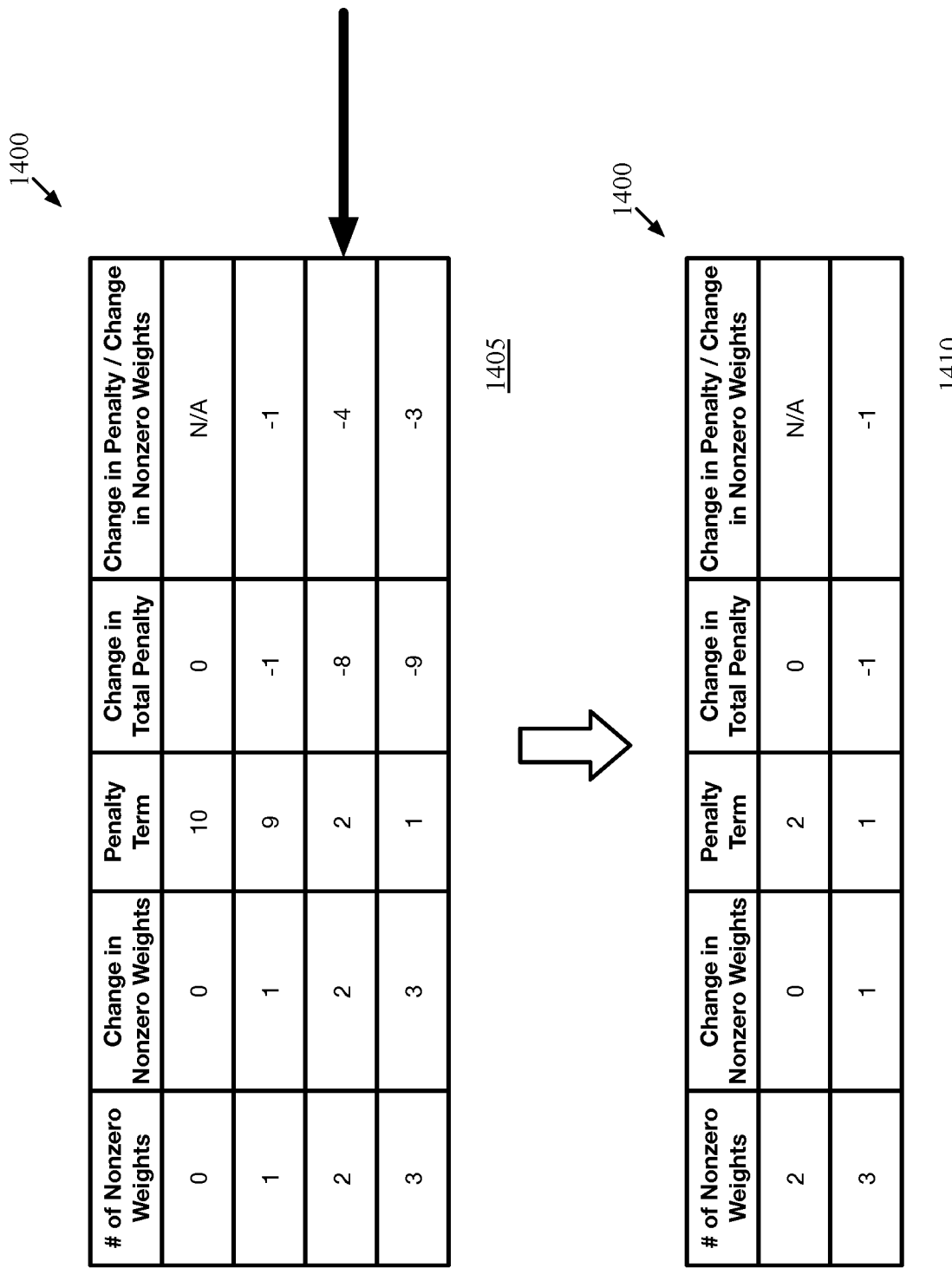
FIG. 14 illustrates a table showing a simple example of penalty (and penalty reduction) calculations for a group of three replica weights, with the data used for optimizing the number of non-zero weights.

FIG. 14 illustrates a table 1400 showing a simple example of penalty (and penalty reduction) calculations for a group of three replica weights, with the data used for optimizing the number of non-zero weights. As shown, at a first stage 1405, the table 1400 includes, for each configuration, (i) the number of non-zero weights, (ii) the change in non-zero weights (which at this point is the same as the number of non-zero weights), (iii) the computed total penalty term, (iv) the change in the total penalty term, and (v) the change in the total penalty term divided by the change in the number of non-zero weights.

The change in total penalty is calculated from the starting position with all of the weights set to zero. In this example, having all of the weights set to zero is the least optimal (has the highest penalty), and the penalty term continuously decreases for each non-zero weight value allowed. It should be noted that this will often not be the case: even the most optimal group of weights with multiple non-zero weights might be less optimal than having all zero-value weights for some groups of replica weights, or it might be best to have two non-zero weights rather than three non-zero weights.

In this example, the best change in total penalty term per change in non-zero weight is −4, when using the optimal configuration with two non-zero weights (and one zero-value weight). Once all of the individual weights with a greater penalty reduction (i.e., difference between the penalty term for setting the weight to zero and the penalty term for setting the weight to its optimal non-zero value) have been set to their non-zero weights, this configuration identified by the large arrow in table 1400 would be pushed from the heap.

The second stage 1410 illustrates the table 1400 after the option with two non-zero weights has been pushed. Here, the starting point is this option with two non-zero weights, and the only other remaining option is to set all three weights to non-zero values. This option has a total change in penalty of −1, which is also a −1 change in total penalty per non-zero weight. As such, this option would only be pushed once −1 was the best change in penalty per weight available (and thus might not be pushed at all).

Once the weights are initialized to quantized values, some embodiments train the network in iterations of stages as per ADMM, while using the loss matrix to inform the training. This training, in some embodiments, involves a first type of stage (the training stage) in which inputs are processed through the quantized network and values are computed for the loss function (including the loss-aware penalty term using the loss matrix with off-diagonal entries for the replica layers). These values for the loss function are back-propagated to train the weight values of the MT network (which allows the weight values to be temporarily moved off of their quantized values). After one or more such stages, a second type of stage (the projection stage) projects all of the weight values to one of their allowed values again (and re-imposes the sparsity condition to ensure that enough of the weights are set to zero). In some embodiments, the process 1300 is used for each projection stage, in some embodiments, with the penalty terms now calculated using the newly-trained weight values.

Figure 15:
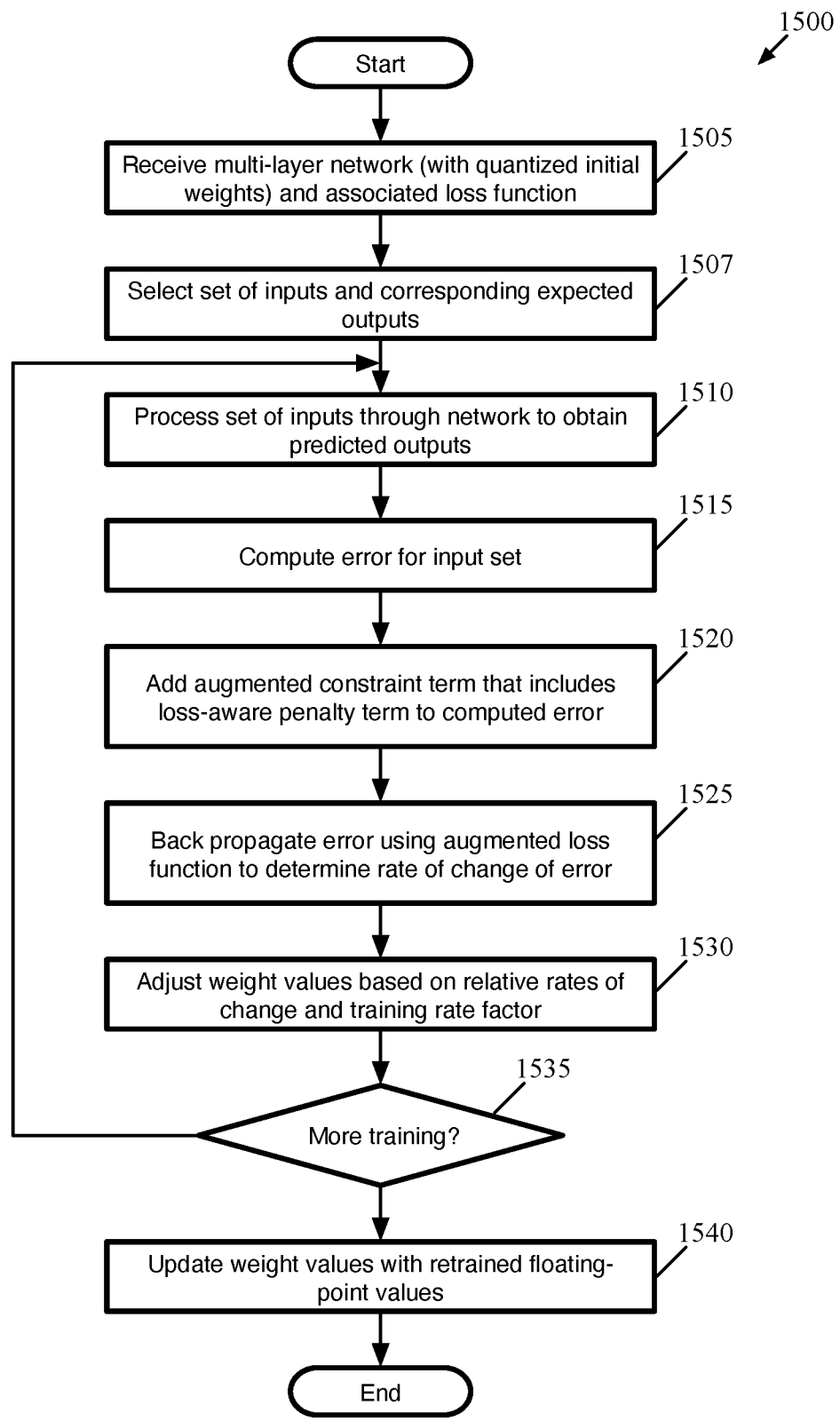
FIG. 15 conceptually illustrates a training process of some embodiments to perform the proximal step of retraining the MT network using the loss-aware penalty term.

FIG. 15 conceptually illustrates a training process 1500 of some embodiments to perform the proximal step of retraining the MT network using the loss-aware penalty term. In some embodiments, this process 1500 is performed by several modules of the training system 600 (or a similar system). In some embodiments, at the beginning of the run, when $\lambda=0$, the initial weight projection used to compute Q is informed by H, as described above. This same loss-aware penalty term is used in stochastic gradient descent (SGD) optimization to update W. Weights with larger Hessian entries are generally subject to greater constraint forces.

As shown, the process 1500 begins by receiving (at 1505) a multi-layer network (with quantized initial weights) and the associated loss function that was used to train the floating-point values. The weight values, at this point, have been quantized via a process such as that shown in FIG. 13. The network 630 of some embodiments is a multi-layer machine-trained network (e.g., a feed-forward neural network), such as that shown in FIG. 1. The network includes multiple layers of nodes, including a layer of input nodes, at least one layer of hidden nodes, and a layer of output nodes. At least a subset of the layers have been replicated into two or more replica layers, as described above. Each hidden node and output node includes a linear component (that uses the weight values 635) and a non-linear activation function. For each input the network 630 receives, it generates a corresponding output.

The process 1500 selects (at 1507) a set of inputs and corresponding expected (ground-truth) outputs. In some embodiments, the input generator 605 (or a similar module) breaks up the inputs into constituent values to be fed into the input layer of the network. For instance, for a network being trained for face recognition, the input generator might simply divide the pixels into several sections, or might perform computations based on the pixel values and feed these to the input layer (e.g., the percentage of red pixels in the image, the average red value of each pixel, or other statistics). In other embodiments, the inputs are provided to the network without any prior processing.

The process 1500 processes (at 1510) the selected set of inputs through the network 630 to obtain predicted outputs (i.e., outputs predicted according to the current state of the network). Each input propagates through the processing nodes of the network, with each layer of nodes receiving their one or more inputs and generating an output to pass to the next layer of nodes. In the final output layer, one or more nodes receives the outputs from the previous layer and generates the outputs of the network. In some embodiments, this processing entails, for each node of a convolutional or fully-connected layer, the linear component first computing a weighted sum of its input values (according to the quantized initial weight values), and then the non-linear activation function computing an output based on this weighted sum.

Next, the process 1500 computes (at 1515) the error of the predicted outputs versus the expected outputs for the selected inputs (i.e., the standard loss function term). In some embodiments, the error is computed for each individual input as the network generates its output. The loss function quantifies the difference between the predicted output and the actual output for each input in some embodiments. Some embodiments compute this as a simple difference, or absolute value of the difference, between the two values; other embodiments compute the square of the differences, or other such measure. In addition, some embodiments sum or average the loss function value for each input in a set of inputs.

The process 1500 also adds (at 1520) the augmented constraint term that includes the loss-aware penalty term to the computed error (so that the loss function includes both the standard loss term and the augmented constraint term). The constraint term, as described above, penalizes weights for not having values in the allowed set of discrete values. As described above, the loss-aware penalty term, in some embodiments, is given by Equation (9). The total loss function in some embodiments is then a typical loss function, a constraint term, and the loss-aware penalty term.

Next, the process 1500 uses the augmented loss function to back-propagate (at 1525) the error to determine the rate of change of the error with respect to a change of each weight value. The back-propagation using the augmented loss function determines, for each weight, the rate of change of the loss function with respect to a change in the weight at the current value of the loss function. The back-propagation process uses the chain rule for partial derivatives to isolate the partial derivative of the augmented loss function with respect to each individual weight used in the multi-layer network, and assign a value to this partial derivative for the current value of the augmented loss function (i.e., the gradient, which is also used to recompute the FIM). Thus, this process identifies the relative effect on the augmented loss function of changes to the many different weights used to generate the outputs of the network.

Specifically, if L is the augmented loss function (including the loss-aware penalty term), then the backpropagation computes, for each weight $w_{ik}$, the partial derivative $\partial L/\partial_{w_{ik}}$.

Because the weights are isolated in a node's output computation as well as (typically) in any constraint terms, computing these partial derivatives is not difficult via application of the chain rule. In this sense, the augmented loss function is a function in many-dimensional space (i.e., with the various weight coefficient values being the many dimensions), and the nature of the function means that the effect of each weight value can be easily isolated for a given loss function value.

The process 1500 adjusts (at 1530) the weight values based on the relative rates of change and a training rate factor. The gradients computed at 1525 are used to update the weight values by moving the weight values in the direction opposite the gradient (to attempt to reduce the loss function value) by a particular amount, with a larger partial derivative for a particular weight (i.e., a component of the gradient) resulting in a greater change to that weight. Some embodiments use a training rate factor (a hyperparameter) to determine how much to change the weight values based on the instantaneous gradient components. That is, the gradient component for a particular weight provides an amount to move (in the direction opposite to the gradient component, as the goal is to minimize the loss function) that weight value relative to the other weight values, while the training rate specifies the distance of that move.

After the weights (and any other network parameters, such as biases) are updated, the process 1500 determines (at 1535) whether to perform additional training. Some embodiments use a minimization process (e.g., a stochastic gradient descent minimizer) to determine when to stop training the network. In some embodiments, the training system only stops training the network once the weights have changed by less than a threshold for a particular number of training iterations. In other embodiments, because the trained weights will again be projected onto their quantized values and sparsified, only a certain number of training iterations are performed before performing the projection/sparsification process (and, then, again performing additional training). If further training is required, the process returns to 1510, which was described above. Otherwise, the process 1500 updates (at 1540) the weight values with the retrained weight values, and the process ends (i.e., quantization can again be performed).

As noted, after performing the training stage of ADMM through one or more iterations, some embodiments then compute the ADMM penalty terms for each weight and perform the projection/sparsification (e.g., as described above by reference to FIG. 13). In addition, after projection, some embodiments perform the dual update step, which updates the Lagrange multipliers (and may also update the Hessian matrix at this time as well).

To update the Lagrange multipliers, the following equality constraints should be satisfied:

$$h_{kra}(W) = W_{kra} - \alpha_{kra} Q_{kra} = 0 \qquad (25)$$

The ADMM penalty loss can be expressed in terms of these equality-constraint functions as:

$$\mathcal{L}_{ADMM} = \sum_{k,r,a} \mu_{kra} h_{kra}(W) + \frac{\rho}{2} \sum_{k,r,s,a} h_{kra}(W) H_{kra,ksa} h_{ksa}(W) \qquad (26)$$

The gradient of the penalty loss with respect to W is therefore:

$$\nabla_W \mathcal{L}_{ADMM} = \sum_{k,r,a} \left[ \mu_{kra} + \rho \sum_s H_{kra,ksa} h_{ksa}(W) \right] \nabla_W h_{kra}(W) \quad (27)$$

The coefficient of $\nabla_W h_{kra}$ is the next iterate for the Lagrange multiplier, and therefore the rule for updating the Lagrange multiplier is:

$$\mu_{kra}^{(n+1)} = \quad (28)$$
$$\mu_{kra}^{(n)} + \rho \sum_s H_{kra,ksa} h_{ksa}^{(n)}(W) = \mu_{kra}^{(n)} + \rho \sum_s H_{kra,ksa}(W_{ksa}^{(n)} - \alpha_{ks} Q_{ksa}^{(n)})$$

The usual update rule for the unscaled Lagrange multiplier in non-loss-aware ADMM is given as $\mu+=\rho(W-\alpha Q)$. In loss-aware ADMM, $\rho$ is replaced with $\rho H$, and therefore it makes sense that the update rule is now of the form $\mu+=\rho H(W-\alpha Q)$.

Some embodiments use a Cholesky decomposition of the Hessian matrix, $H=F^TF$. This enables the penalty term to be expressed as the square of a vector containing a constraint violation and a Lagrange multiplier, which makes the multiplier update rule and identification of the residuals easier. As noted, H is block diagonal, with a symmetric block $H^{ka}$ for layer k and weight index a. On the assumption that H is positive definite (and not merely positive semidefinite), then the block $H^{ka}$ is symmetric and positive definite, and therefore has a Cholesky decomposition given by:

$$H^{ka} = (F^{ka})^T F^{ka}, \quad (29)$$

where $F^{ka}$ is an upper-triangular, $R_k \times R_k$ matrix with positive entries on its diagonal.

Because the rows of F are linearly independent, the constraint $W-\alpha Q=0$ is equivalent to the transformed constraint $F(W-\alpha Q)=0$. If the Lagrange multiplier $\lambda$ is defined for this constraint via $\mu=\rho F^T \lambda$, then the linear term in the ADMM penalty can be rewritten as:

$$\mu^T(W-\alpha Q) = \rho \lambda^T F(W-\alpha Q). \quad (30)$$

Combining Equation (30) with the Cholesky decomposition of the FIM ($H=F^TF$), the ADMM penalty loss can be rewritten as:

$$\mathcal{L}_{ADMM} = \mu^T(W - \alpha Q) + \frac{\rho}{2}(W - \alpha Q)^T H(W - \alpha Q) \quad (31)$$
$$= \frac{\rho}{2}[F(W - \alpha Q) + \lambda]^T[F(W - \alpha Q) + \lambda] - \frac{\rho}{2}\lambda^T \lambda$$
$$= \frac{\rho}{2}\|F(W - \alpha Q) + \lambda\|_2^2 - \frac{\rho}{2}\lambda^T \lambda$$

Thus, the Cholesky decomposition of the FIM enables casting the ADMM penalty in the form of a square of a vector that is the sum of a constraint violation, $F(W-\alpha Q)$, and a Lagrange multiplier, $\lambda$.

From this form, the rule for updating the Lagrange multiplier can be written as:

$$\lambda^{(n+1)} = \lambda^{(n)} + F(W^{(n)} - \alpha Q^{(n)}). \quad (32)$$

This implies that the update to $\mu$, $$\mu^{(n+1)} = \rho F^T \lambda^{(n+1)} = \rho F^T \lambda^{(n)} + \rho F^T F(W^{(n)} - \alpha Q^{(n)}) = \mu^{(n+1)} + \rho H(W^{(n)} - \alpha Q^{(n)}), \quad (33)$$

is in line with the update rule for $\mu$ described above.

It should be noted that $\mu$ determines the constraint-gradient force that appears in the Karush-Kuhn-Tucker (KKT) optimality conditions. If the quadratic-penalty coefficient $\rho$ or the FIM H is updated, then $\lambda$ should be recalculated such that $\mu$ remains constant. Thus, if $\rho$ is updated to $\rho'$ and F is updated to F', then $\lambda$ should be simultaneously updated to $\lambda'$ such that $$\mu = \rho F^T \lambda = \rho'(F')^T \lambda'. \quad (34)$$

This implies that the revised multiplier $\lambda'$ is given by $$\lambda' = \frac{\rho}{\rho'}\left[(F')^T\right]^{-1} F^T \lambda. \quad (35)$$

F' is block diagonal, and therefore trivial to invert, where each block is upper triangular with positive entries on the diagonal, and small ($R_k \times R_k$).

The primal residual is the coefficient of $\lambda$:

$$r = F(W - \alpha Q). \quad (36)$$

The dual residual is derived from feasibility conditions on the ADMM problem. The dual residual at iteration k+1 is computed as:

$$s^{k+1} = \rho H^{k+1}(\alpha^{k+1} Q^{k+1} - \alpha^k Q^k) \quad (37)$$

III. Batch Normalization with Replica Layers

In addition to training the weights, some embodiments also compute and train batch normalization parameters during the training process. For typical (non-replica) layers, batch normalization training computes statistics (e.g., the mean and variance) for pre-activations (i.e., the dot product of weight values and inputs for a computation node, before the activation function is applied), and uses these statistics to apply shift and scale values to the pre-activations (e.g., shifting based on the mean and scaling based on the variance). However, for sets of replica layers, performing the scaling on the individual layers based on the variance removes the relative scale of the layers, while applying the shift to the sums of the layers results in a loss of precision due to value quantization after each individual layer. As such, some embodiments compute the mean for each individual replica layer (and apply the shift at the individual replica node level) while computing the variance after the nodes have been added together.

Figure 16:
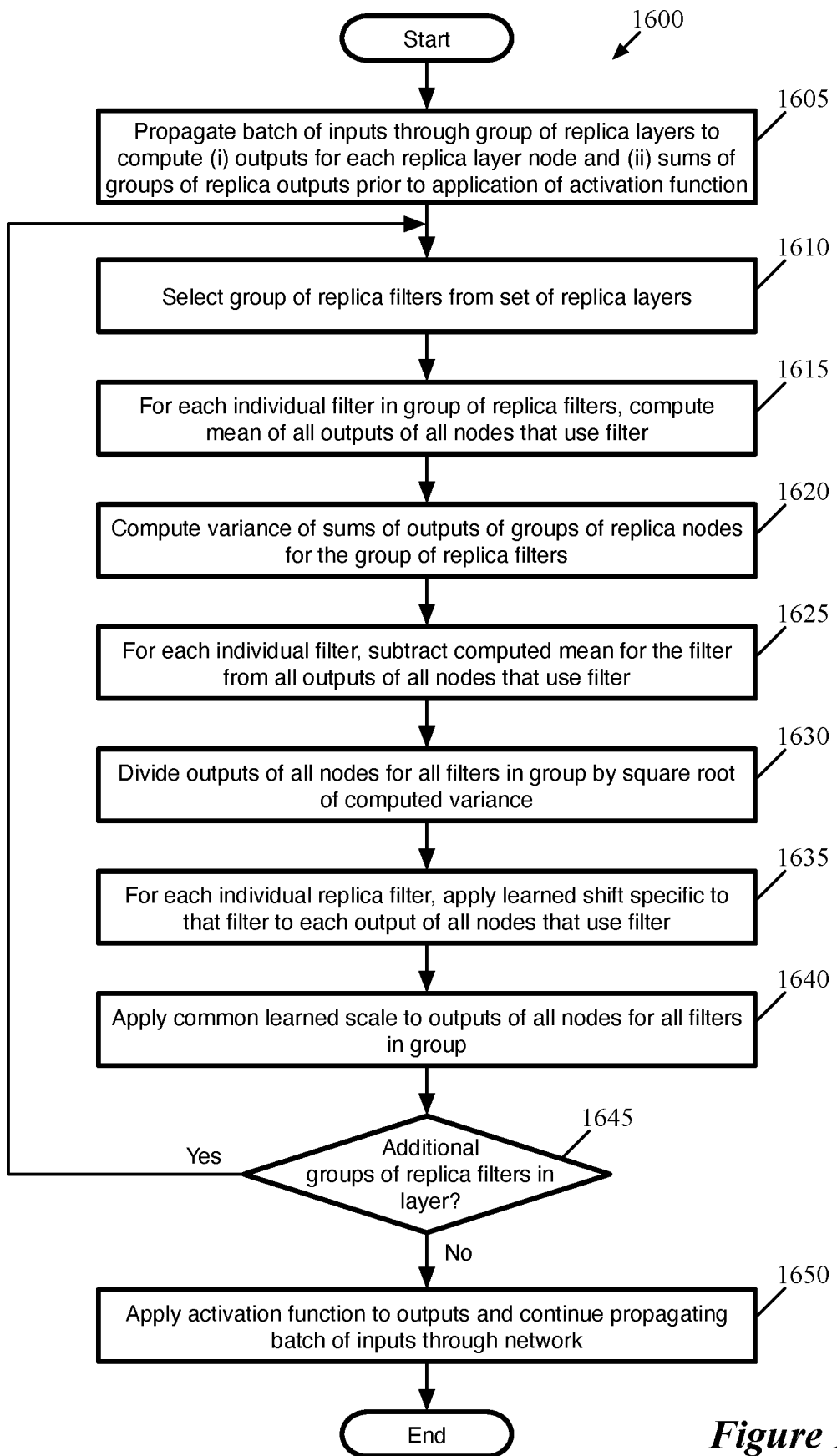
FIG. 16 conceptually illustrates a process of some embodiments for training batch normalization parameters for a set of replica nodes.

FIG. 16 conceptually illustrates a process 1600 of some embodiments for training batch normalization parameters for a set of replica nodes. The process 1600 is performed, in some embodiments, by a training system such as that shown in FIGS. 6A-B (e.g., by a batch normalization module not shown in those figures). It should be noted that the process 1600 describes the use of batch normalization parameters for a single training iteration with a batch of inputs (referred to as a minibatch). In some embodiments, this process is performed during each training iteration (i.e., each minibatch) so as to normalize the intermediate outputs during that minibatch (and to update the learned shift and scale values).

As shown, the process 1600 begins by propagating (at 1605) a batch of inputs through a group of replica layers to compute, for each input, (i) outputs for each replica layer and (ii) sums of groups of replica outputs prior to application of the activation function. As described above in Section I, each replica layer node computes a dot product of a filter with a set of input values and has a scaling factor (and potentially adds a bias value), but does not apply an activation function. All of the outputs of the replica layers are provided (after value quantization, in some cases) to an element-wise addition layer that adds together the outputs of corresponding nodes and applies an activation function in some embodiments. In some embodiments, the training system propagates batches of inputs through the network in parallel, performing batch normalization across the batch of inputs at each layer. Thus, for a given minibatch in some embodiments, the process 1600 is performed for each group of replica layers in the network, and a standard batch normalization process is performed for each non-replica layer in the network.

The process 1600 selects (at 1610) a group of replica filters from the set of replica layers. As described above, in some embodiments each layer of the network includes numerous filters or kernels (e.g., sets of weights that are convolved over the input activation grids). For a group of replica layers, each of the filters is decomposed into a group of replica filters (in this manner the nodes are decomposed into groups of replica nodes). For each input to the network, each of the replica filters is used to compute outputs of a set of nodes (i.e., the nodes for one output channel or output activation grid). If the original layer is decomposed into three replica layers, then each filter in the layer is decomposed into a group of three replica filters (in the manner described above).

For each individual filter in the group of replica filters, the process 1600 computes (at 1615) the mean of all outputs of all nodes that use the filter (across all inputs of the minibatch). The nodes that use each filter generate, for a given input, an output activation grid. The process computes the mean of these output activations across the entire output activation grid. Thus, for a simple example, if the output activation grid for a replica filter is 5×5 and the minibatch includes 100 inputs, the calculated mean is the mean of all 2500 computed output values.

In addition, the process 1600 computes (at 1620) the variance of the sums of the outputs of groups of replica nodes for the group of replica filters. In the course of the operation of the network, as described, the outputs of groups of corresponding replica nodes are added together (after value quantization, in some embodiments) before application of the activation function for the layer. Because the replica filters have different scales (e.g., related by powers of ⅓), it is not useful to separately compute the variance of the outputs for each replica filter separately, as dividing by the resulting standard deviations would put all of the layers on the same relative scale. As such, the computed variance is based on the sums of the outputs computed by the element-wise addition layer that adds together the outputs of the individual nodes in a group of replica nodes. As with the mean, the process computes the variance across the entire output activation grid (but prior to application of the activation function).

For each individual filter in the group of replica filters, the process subtracts (at 1625) the computed mean for the filter from all outputs of all nodes that use the filter (across all inputs of the minibatch). As in typical batch normalization, this subtraction centers the values output by each filter in the minibatch around zero. As mentioned, performing this subtraction prior to adding the outputs of groups of replica nodes together avoids the effects introduced by value quantization.

In addition, the process divides (at 1630) the outputs of all of the nodes for all filters in the group of replica filters by the square root of the computed variance (i.e., the standard deviation). As mentioned, a single variance/standard deviation is computed for each group of filters in a group of replica layers so that the scale (e.g., powers of ⅓) is preserved between the replica layers. As such, the standard deviation by which to divide the replica node outputs for the selected group of replica filters is based on the sums of the outputs. However, due to value quantization, applying this standard deviation after the summation could sometimes result in not using all available bits of the output of this addition node. Thus, each individual node output (across the entire minibatch) is divided by the calculated standard deviation.

The process 1600 also applies (at 1635), for each individual filter, a learned shift specific to that filter to each output of all nodes that use the filter. In addition, the process 1600 applies (at 1640) a common learned scale to the outputs of all of the nodes for all filters in the group of replica filters. The learned shift is specific to the nodes of each replica filter for the reasons described above for the mean computation, and the learned scale is common to the nodes of all of the replica layers for the reasons described above for the standard deviation computation.

After modifying the outputs for the group of replica filters, the process 1600 determines (at 1645) whether additional groups of replica filters remain in the group of replica layers, for which to perform batch normalization. If additional groups of replica filters remain, the process 1600 returns to 1610 to select another group of replica filters. It should be understood that the process 1600 is a conceptual process, and other embodiments may perform the operations differently. For instance, rather than performing batch normalization for one group of replica filters at a time, some embodiments perform the operations 1615-1640 in parallel for numerous groups of replica filters.

Once batch normalization is performed for all of the replica layers, the process 1600 applies (at 1650) the activation function for the layer to the normalized, shifted, and scaled outputs and continues propagating the batch of inputs through the network (i.e., while performing batch normalization at each convolutional layer or group of replica convolutional layers). In addition, in some embodiments, the training system tracks a running mean for each replica filter and running variance/standard deviation for each group of replica filters. This running mean and variance is used by the trained network at inference in some embodiments.

Figure 17:
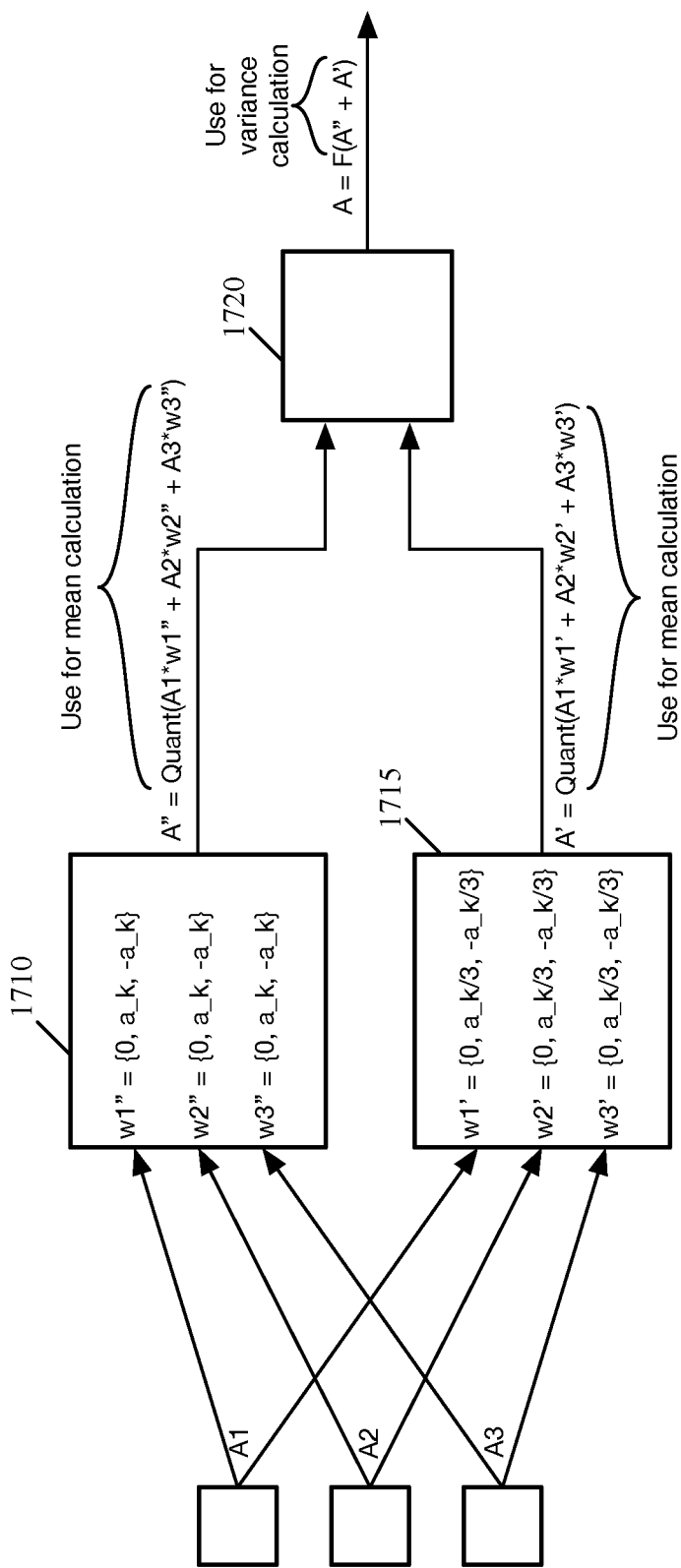
FIG. 17 conceptually illustrates how the mean and variances are computed for some embodiments in a quantized network (that employs both weight and output quantization).

FIG. 17 conceptually illustrates how the mean and variances are computed for some embodiments in a quantized network (that employs both weight and output quantization). FIG. 17 illustrates a pair of corresponding replica nodes 1710 and 1715 as well as the element-wise addition node 1720 that adds their outputs. The first replica node 1710 receives three inputs A1, A2, and A3, and has weight values w1", w2", and w3".

The corresponding second replica node 1715 (the corresponding node in the second replica layer) receives the same three inputs A1, A2, and A3, and has weight values w1', w2', and w3'. The first replica node 1710 computes a dot product of the three inputs A1, A2, and A3 with the three weights w1", w2", and w3", and the second replica node 1715 also computes the dot product of these three inputs with weights w1', w2', and w3'. These dot products are also quantized (e.g., to 4-bit values) prior to being output as A" and A' by nodes 1710 and 1715 respectively. As shown, these quantized outputs are used for the mean calculations for each of the respective replica layers. In addition, node 1720 adds A"
and A' together, and applies an activation function F. The
sum of the two values A"+A' is used for the variance
calculation in some embodiments, prior to the application of
the activation function.

The computation of the batch normalization parameters
will now be described in additional detail, using as an
example a set of R replicas for a single fully-connected
layer. The output of the linear operation for replica r for
training item i and output channel c is (ignoring the layer
index k which is common to the replica layers):

$$Y_{irc} = W_{rc} * X_i. \quad (38)$$

The individual channel (filter) means for replica r are:

$$\overline{Y}_{rc} = \frac{1}{m} \sum_{i=0}^{m-1} Y_{irc}, \quad (39)$$

where m is the size of the minibatch. Here, $\overline{Y}$ is used to
denote the mean because μ is being used for the Lagrange
multipliers.

For the sum of replicas as a whole, the sum of the linear
outputs is:

$$Y_{ic} = \sum_{r=0}^{R-1} Y_{irc}. \quad (40)$$

The mean and variance of the sum of linear outputs are
given as $$\overline{Y}_c = \sum_{r=0}^{R-1} \overline{Y}_{rc} = \frac{1}{m} \sum_{i=0}^{m-1} Y_{ic} \quad (41)$$

and $$\sigma_c^2 = \frac{1}{m} \sum_{i=0}^{m-1} (Y_{ic} - \overline{Y}_c)^2 \quad (42)$$

The result of batch normalization applied to each replica
is therefore:

$$\hat{Y}_{irc} = \frac{Y_{irc} - \overline{Y}_{rc}}{\sqrt{\sigma_c^2 + \epsilon}}. \quad (43)$$

After applying the learned affine transform, the replica
output is $$Z_{irc} = \gamma_c \hat{Y}_{irc} + \beta_{rc}, \quad (44)$$

and the value-quantized outputs (assuming of each replica
are given in U2.2 notation) are:

$$V_{irc} = \text{Quant}(Z_{irc}, U2.2). \quad (45)$$

Finally, the replica outputs are summed in the element-wise
addition layer. In the case of two replicas, this is given by $$A_{ic} = V_{i0c} + V_{i1c}. \quad (46)$$

It should be noted that, for inference, batch normalization
reduces to a single affine transformation that is the product
of the standardization transform (using the exponentially-smoothed mean and variance) and the learned affine transform. As such, the specialized form of batch normalization described here differs from ordinary batch normalization during training but places no additional demands on the inference circuit (e.g., the circuit described in the section below).

IV. Neural Network Inference Circuit

The above discussion focuses primarily on training of the various replica layers of weights, while ensuring that the weight values are quantized (to ternary weight values) and sparsified (enough weight values set to zero). This enables execution of the network by a neural network inference circuit of some embodiments with ternarization and sparsity requirements. When implemented on such a neural network inference circuit of some embodiments, each replica layer is treated as a separate layer, though the same set of input values are stored for use in each of the multiple copies of the layer. Each of the individual copies of the layer are computed separately, and then the chip combines the outputs of the corresponding sets of nodes using an element-wise operation to compute the output values that are stored as inputs for the next layer.

Such a neural network inference circuit is part of an integrated circuit (IC) in some embodiments. The ICs of some embodiments are configurable to implement different networks trained to perform a particular function, and such networks may include replicated layers (trained with quantization). For instance, the ICs may implement networks for object or facial recognition in images, voice recognition in audio samples, etc. The IC of some embodiments includes a set of input processing circuits, a neural network computation fabric that can be configured to apply a neural network to an input, and a microprocessor (e.g., for controlling the input processing circuits and configuring the neural network computation fabric).

Figure 18:
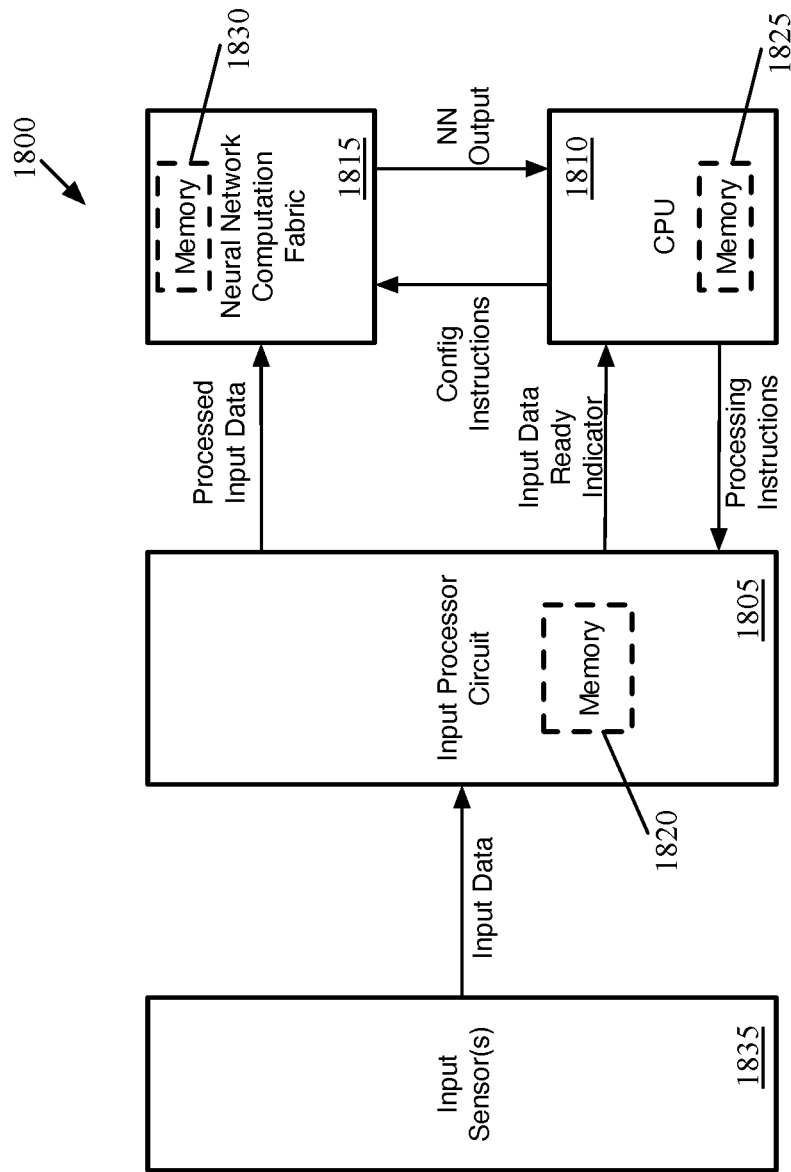
FIG. 18 conceptually illustrates an integrated circuit of some embodiments.

FIG. 18 conceptually illustrates such an IC 1800 of some embodiments. As shown, the IC includes an input processor circuit 1805, a microprocessor (CPU) 1810, and a neural network computation fabric 1815. Each of these components 1805-1815 also has corresponding memory (e.g., random access memory (RAM)) 1820-1830. In addition, in some embodiments, the IC is integrated into a device (such as an Internet of Things (IoT) device) with one or more input sensors 1835. These input sensors can include cameras (e.g., for capturing video images on which the neural network computation fabric 1815 performs face or object recognition, etc.), microphones (e.g., for capturing audio on which the neural network computation fabric 1815 performs voice recognition, speech processing, etc.), or other types of input sensors. In other embodiments, the input sensors 1835 are located on a separate device that is linked with the IC 1800.

In some embodiments, at bootup of the IC 1800, the CPU 1810 loads neural network configuration data (e.g., weight values, scale and bias parameters, lookup table masks for each layer, memory locations for the weight and input values to use for computing each layer of the network, etc.) from off-chip storage and generates instructions for the neural network computation fabric 1815 to write the weight values and other data to its memory 1830. In addition, the CPU 1810 loads the neural network program instructions for the computation fabric to its own memory 1825. These instructions are applied by the computation fabric 1815 to input data in order to execute the neural network. These runtime instructions include, e.g., indications as to which pre-loaded sets of instructions to use for each set of calculations, etc.

The input processor circuit 1805 receives input data (e.g., still images or video frames, sounds, etc.) from the input sensor(s) 1835, and processes these according to processing instructions received from the CPU 1810. The CPU 1810 stores in its memory instructions for the input processor circuit to prepare input data for the computation fabric 1815 as well as the neural network program instructions. These instructions identify, in some embodiments, any sort of initial processing to apply to the raw data (e.g., decompression of compressed data, etc.) as well as how to arrange the data to be provided to the computation fabric 1815. For an image, e.g., these instructions might specify the order in which the pixels should be arranged and streamed to the computation fabric 1815, so that the computation fabric stores this data in the appropriate locations of its memory 1830 for subsequent operations. The input processor circuit 1805 also sends signals to the CPU 1810 to indicate when it has fully buffered an input (e.g., a frame of video) and when the input is prepared to be sent to the computation fabric 1815.

In addition to instructing the input processor circuit 1805 how and when to provide input data to the computation fabric 1815, the CPU 1810 provides the neural network program instructions to the computation fabric. In some embodiments the CPU 1810 provides these instructions in stages (e.g., one layer or portion of a layer at a time). Once the final output of the neural network is computed, the fabric 1815 provides this output back to the CPU, so that the CPU (or other circuitry on the device) can evaluate this output and perform any actions based on the output.

The computation fabric of some embodiments provides a set of circuits for performing the various computations required for neural networks (e.g., dot product computations, scaler and bias operations, activation functions, etc.), with the network parameters (weight values, bias values, node arrangement, filter size, etc.) configurable. In some embodiments, the computation fabric imposes certain requirements on the networks, such as a maximum size of the network (i.e., a maximum size of the dot product computations), that the weight values be ternary (e.g., 0, $\alpha$, and $-\alpha$ for each layer of the network), and/or that at least a particular percentage of the weight values be equal to zero.

Figure 19:
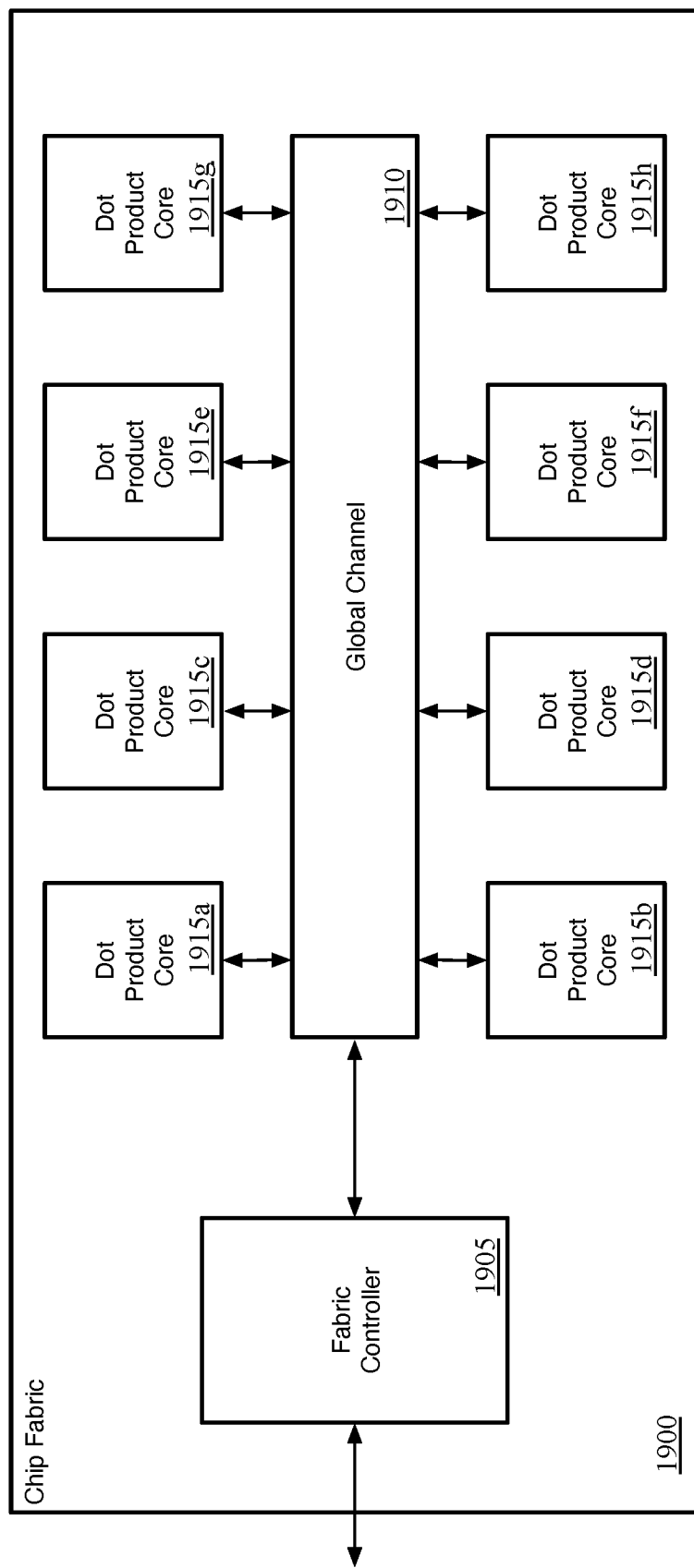
FIG. 19 conceptually illustrates the neural network computation fabric of some embodiments.

FIG. 19 conceptually illustrates the neural network computation fabric 1900 (also referred to as the chip fabric) of some embodiments. The chip fabric 1900 of some embodiments includes a fabric controller 1905, a global channel 1910, and a set of dot product cores 1915a-h. The connections between the various components 1905-1915 represent the flow of both control data (e.g., configuration data for a particular neural network layer) and computation data at runtime in some embodiments.

The fabric controller 1905 is responsible for managing the operation of the rest of the chip fabric 1900 (e.g., the dot product cores 1915) in some embodiments. The fabric controller 1905 loads instruction arguments (e.g., weight and activation value locations, which cores to use for a particular computation, etc.) from local memory (not shown) on the chip, maps instructions into a sequence of memory-mapped register writes, synchronizes the downstream controllers (e.g., controllers for the various cores 1915), etc. The instructions managed by the fabric controller 1905 are configured at compile time, in some embodiments, based on the parameters of the network being implemented by the chip fabric 1900. In some embodiments, the fabric controller 1905 interacts with the microprocessor of the IC as well (i.e., the fabric controller 1905 handles the communication with the CPU 1810 shown in FIG. 18).

The chip fabric also includes numerous dot product cores 1915 as well as a global channel 1910 that connects the cores, with these data processing circuits configured by the fabric controller (and a set of hierarchical control circuits, in some embodiments). These data processing circuits 1910 and 1915 operate to compute neural network operations in an efficient, low-power manner, according to the configuration data provided by the control circuits.

The dot product cores 1915a-h include circuitry for computing partial dot products in some embodiments, which is described in further details below. In some embodiments, this circuitry includes memory and/or buffers for storing weights and activations, controllers for reading these values out of memory, and adder trees for computing the partial dot products based on the weight and activation inputs.

The global channel 1910 is responsible for providing a communications bus for control and computation data between the fabric controller 1905 and the cores 1915, as well as from one core to another. The global channel 1910, among other operations, accumulates partial dot products from multiple cores when computing dot products that require more computations than can be performed in a single core, and performs post-processing on these dot products. In addition, the global channel 1910 carries activations (i.e., computation node outputs) after post-processing for storage (and for use as inputs to subsequent computation nodes) in other cores 1915. In some embodiments, the global channel 1910 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 1910, as described further below.

The chip fabric 1900 of some embodiments computes numerous neural network computation nodes simultaneously, with the computation for one node often spread across multiple cores (and subsequently the global channel). In some cases, if a neural network layer is small enough, then computation for that layer may be confined to a single core 1915. However, if multiple cores are used for a given layer (any number of cores may be used in some embodiments), then each dot product computed for that layer is spread across all of the cores 1915 in use.

That is, for a dot product computed across more than one core 1915, each of these cores computes a partial dot product from a subset of the input values and weight values for the node, then provides these partial dot products to the global channel 1910. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

In the simplest case, all of the partial dot products are computed in the same clock cycle and provided at the same time to the global channel 1910. In some cases, however (e.g., for dot products with a very large number of terms or using larger than standard activation values, or when filters have too many nonzero weight values), each core 1915 computes more than one partial dot product for a single computation node, requiring multiple clock cycles (also referred to as time-multiplexing of the dot products). Based on configuration data specifying which outputs from the cores are to be added together (and whether multiple partial dot products are required from the same core), the global channel 1910 aggregates these partial dot products to compute the complete dot product for each node, then applies various post-processing functions (e.g., the bias, scale, and non-linear activation functions) to compute the output of each node.

In some embodiments, the dot product cores are grouped into clusters, and the global channel includes separate segments for each such cluster. Each of these channel segments includes the same circuitry in some embodiments, with the exception that buses in the first and last channel segments only connect to corresponding buses in one other channel segment while the buses in the intermediate channel segments connect to corresponding buses in two neighboring channel segments.

The data processing circuitry of each of the channel segments includes a dot product bus, a set of post-processing circuits, and an output bus in some embodiments. The dot product bus receives partial dot products from the cores, aggregates these dot products together, and provides the aggregated dot products to the post-processing circuits. The post-processing circuits perform the non-dot product computations of the neural network computation nodes, which may include a bias (addition) factor, a scaling (multiplication) factor, and a non-linear activation function (e.g., for a node in a convolutional or fully-connected layer). The output of the post-processing circuits is the computation node outputs (activations). The output bus, or activation write bus, carries the outputs of the post-processing circuits to the cores to be stored as inputs for the next computation layer.

Figure 20:
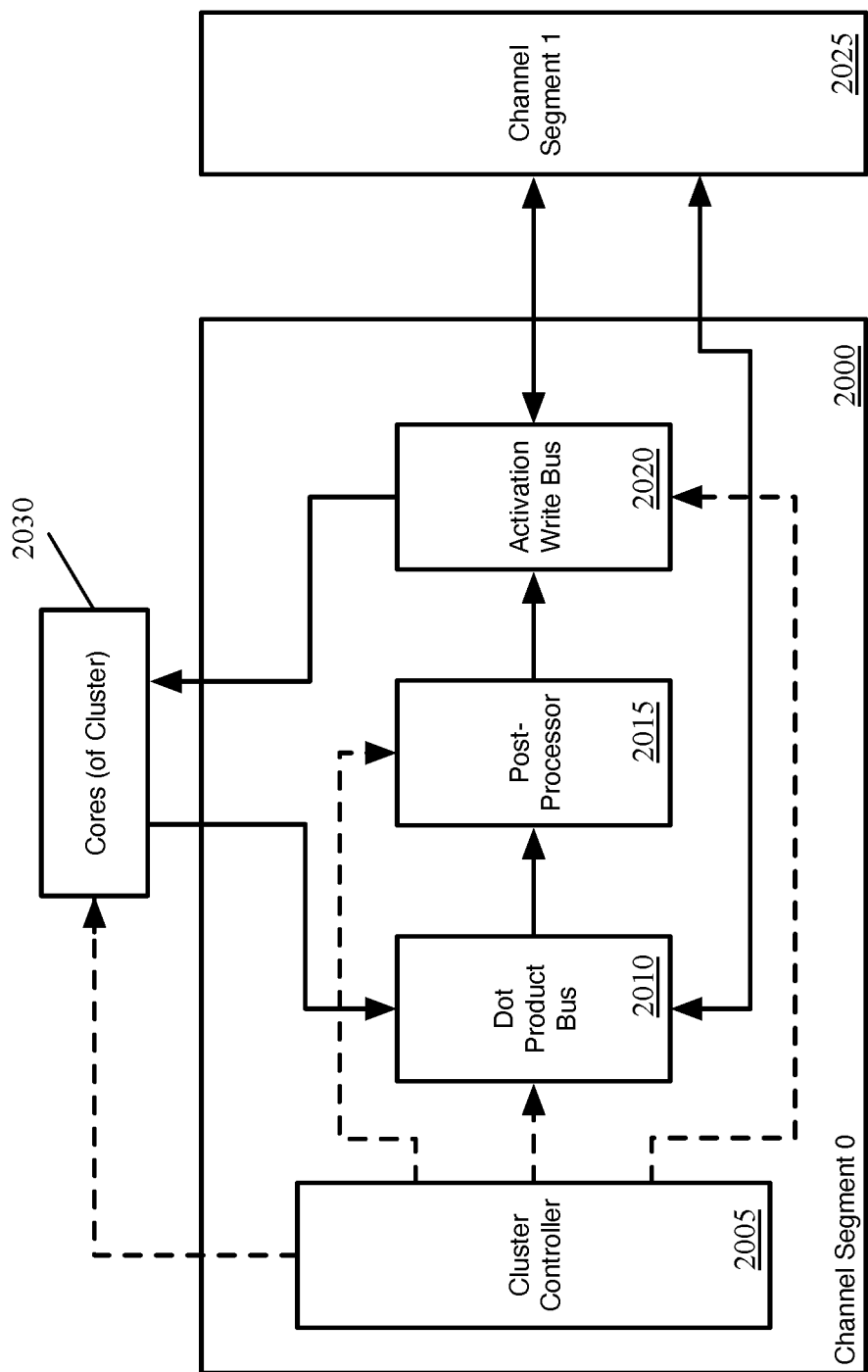
FIG. 20 conceptually illustrates the circuit blocks of a channel segment of some embodiments.

FIG. 20 conceptually illustrates the circuit blocks of a channel segment 2000 of some embodiments. The channel segment 2000 includes a cluster controller 2005, a dot product bus 2010, a post-processor 2015, and an activation write bus 2020 (also referred to as an output bus). In addition to the channel segment 2000, the figure also illustrates an additional channel segment 2025 and the cores 2030 of the local cluster for the channel segment 2000, as the circuit blocks of the channel segment 2000 exchange dot product and configuration data with these other circuits. In this diagram, the dashed lines represent the flow of configuration data while the solid lines represent the flow of neural network computation node data for convolution or fully-connected layer nodes (i.e., nodes that use a dot product based linear function). Additional neural network computation data, such as that flowing directly from the cores 2030 to the post-processor 2015 for pooling nodes or element-wise operators, is not shown.

The cluster controller 2005 configures the dot product bus 2010, post-processor 2015, and activation write bus 2020 as per the configuration instructions received from the fabric controller in some embodiments. For the dot product bus 2010, this configuration data specifies, in some embodiments, (i) which partial dot products are to be added together as part of the same neural network computation node and (ii) to which post-processing unit each aggregated dot product is sent (the post-processor 2015 of some embodiments includes numerous post-processing units with the same circuitry). In other embodiments, the post-processing unit that receives each aggregated dot product is not specified as configuration data because there are an equal number of dot product bus lanes and post-processing units, so that the data from each lane is provided as the primary input to a different post-processing unit.

For the post-processor 2015, the configuration data of some embodiments indicates (for each of the post-processing units) whether a dot product computation node or other computation node (e.g., pooling, element-wise operator) is being executed, the scaler and bias factors for a linear computation, the activation function to use (which may be specified, e.g., as a lookup table), as well as other data. For the activation write bus 2020, the configuration data indicates to which cores each output value is to be delivered, in some embodiments.

As mentioned, the solid lines indicate the flow of neural network computation data, for a node in a convolutional or fully-connected layer. The cores 2030 (as well as, in some cases, cores of other clusters) compute partial dot products. For a given computation node, these partial dot products may be computed across multiple cores. In some embodiments, if more than one core is used to compute the dot products for a neural network layer, then the partial dot products for each node are computed across all of these active cores.

These partial dot products are output to the dot product bus 2010, which aggregates the partial dot products from the cores 2030 of the local cluster. The dot product bus 2010, in some embodiments, includes a number of independent dot product bus lanes that each receives partial dot products from the cores, aggregates these together, and provides the aggregated dot products to the post-processing circuits. In some embodiments, each lane of the dot product bus corresponds to (i) one of the adder trees in each of the cores (i.e., dot product bus lane N receives the partial dot products from each of the adder trees of index N in the cores), (ii) one of the post-processing units in each of the clusters (i.e., dot product bus lane N provides its aggregated output to the post-processing unit N in one of the clusters, as specified by the configuration data), and (iii) one lane of the activation write bus.

Each lane of the dot product bus 2010 spans all of the channel segments, and the dot product bus lanes in each channel segment aggregate the partial dot products from the cores of its local cluster. The dot product bus 2010 in the channel segment 2000 also exchanges locally-aggregated dot products with its neighboring segments for further aggregation if needed (i.e., if the source cores for the dot product computation span multiple clusters). In this case, the channel segment 2000 only has one neighboring segment, but internal channel segments will have two such neighboring segments. The configuration data from the cluster controller 2005 specifies whether to send these dot products in one direction or the other along the global channel for each dot product bus lane, or to aggregate the dot products from the neighboring channels locally, depending on where post-processing will occur for each dot product.

The post-processor 2015 includes numerous post-processing units that receive the dot products from their corresponding dot product bus lane and perform the non-dot product functions of the neural network computation nodes. For a typical computation node of a convolutional (or fully-connected) layer, these functions include an addition operation to account for the bias factor, a multiplication operation to account for the scaling factor, and a non-linear activation function. In some embodiments, the outputs of the linear function are quantized or truncated to a particular number of bits (e.g., 4 bits, 5 bits, 8 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design. The non-linear activation function, in some embodiments, is implemented as a lookup table rather than a hardwired function. This enables the IC to execute different neural networks that use different activation functions and, in some embodiments, allows for different activation functions to be used in different layers of the neural network.

The activation write bus 2020 receives the computation node activation outputs from the post-processing units and carries these outputs back to the cores 2030, to be stored in the memory of the core and used as inputs for the computation nodes of the next layer of the neural network. The activation write bus connects to the cores 2030 in the local cluster as well as the activation write bus in the neighboring channel segment 2025. As with the dot product bus 2010, the activation write bus 2020 of some embodiments includes lanes, with each post-processing unit of the post-processor 2015 sending its output to a different one of these lanes.

In some embodiments, the output values may be computed by the post-processor 2015 in one cluster but carried by the activation write bus 2020 to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value. The activation write bus 2020 also includes a right shift circuit for each core that is used to align the output values for the core, in order for the values to be stored in contiguous blocks within the core RAM.

Figure 21:
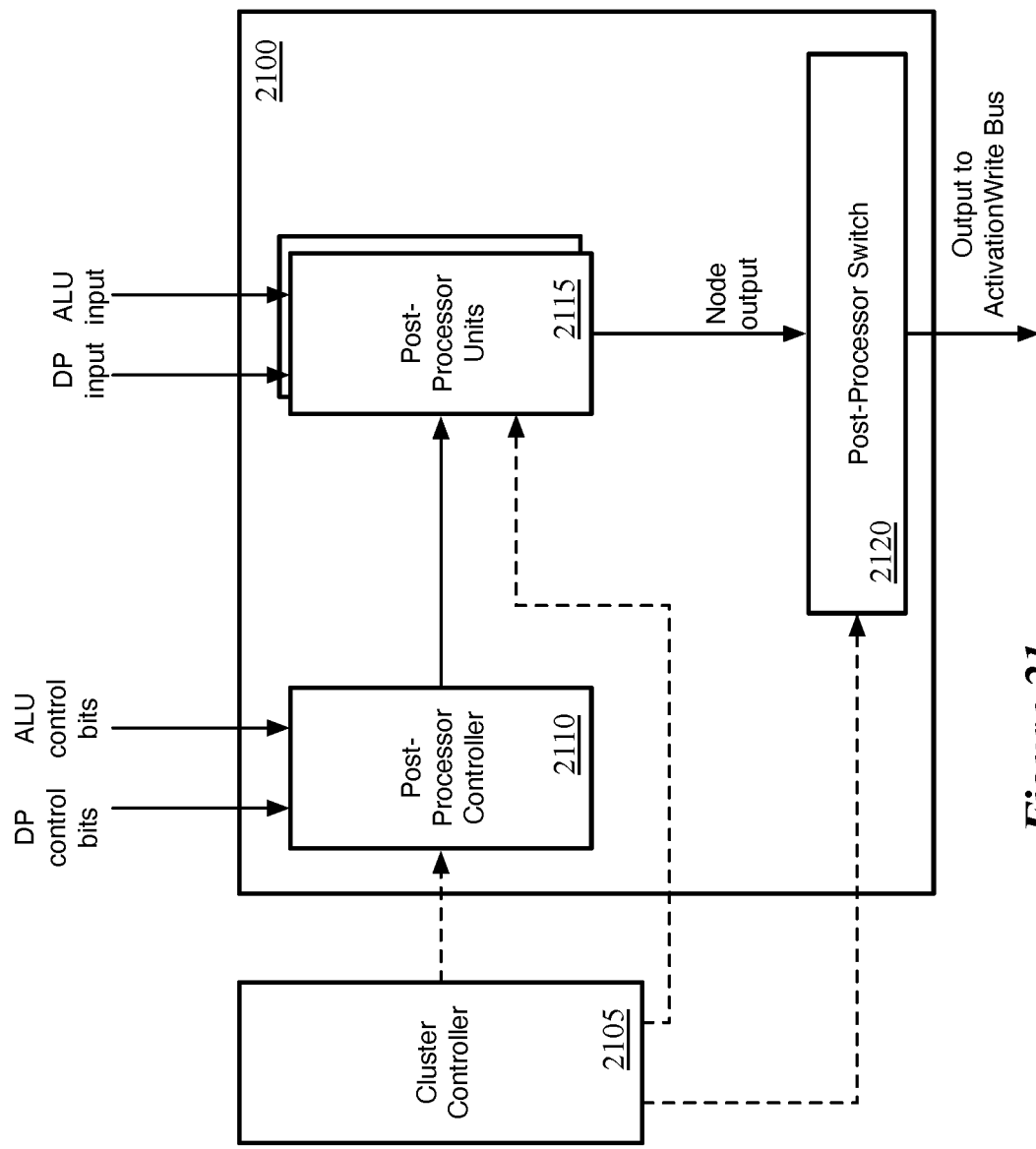
FIG. 21 conceptually illustrates the post-processing circuit block for a channel segment of some embodiments, along with the local cluster controller that provides configuration data to this post-processor.

Now that the primary circuit blocks of the global channel have been introduced, some of these circuits of some embodiments will be explained in greater detail. FIG. 21 conceptually illustrates the post-processing circuit block 2100 for a channel segment of some embodiments, along with the local cluster controller 2105 that provides configuration data to this post-processor 2100. As shown, the post-processing circuit block 2100 includes as sub-blocks a post-processor controller 2110, a set of post-processing units 2115, and a post-processor switch 2120. The cluster controller 2105 provides configuration data to each of these sub-blocks in order to synchronize operations, and to configure the post-processing units 2115 with the correct bias and scale factors as well as the activation function.

The post-processor controller block 2110 aggregates control signals from the dot product bus (for convolution and fully-connected operations) as well as the ALU bus from the cores (for pooling, copy, and element-wise operations). These control bits include accumulate and valid signals for the dot product bus (which indicate to the post-processor whether the incoming data is a final dot product, as dot products are not sent every clock cycle) as well as accumulate, valid, and end of row signals for the ALU bus. The ALU bus carries activation values directly from the cores without having dot products performed, to be used for pooling and element-wise operation layers. The accumulate and valid signals indicate to the post-processor whether the incoming ALU data is to be used, while the end of row signals indicate that different configuration data should be used for certain post-processing operations when the end of a row of input values is reached (e.g., on account of padding, etc.). The post-processor controller block 2110 aggregates these signals, as mentioned, and outputs signals to the post-processing units 2115 to indicate when the post-processing units are receiving valid dot product or ALU data.

The post-processor 2100 includes numerous post-processing units 2115 that handle the non-dot product computation of the neural network nodes. In some embodiments, the post-processor block within a segment includes the same number of post-processing units 2115 as there are dot product bus lanes and activation write bus lanes (which is also the number of adder trees in each core for computing partial dot products). Each post-processing unit 2115 receives two types of data inputs: (1) dot products from the dot product bus for convolution and fully-connected neural network nodes and (2) activation inputs (ALU inputs) from the core RAM for pooling nodes and element-wise operator nodes. In some embodiments, both types of inputs are used to execute a replicated layer (e.g., by first executing multiple convolutional layers and subsequently by combining the layers as an element-wise layer).

In some embodiments, each post-processing unit receives a single dot product input, from its corresponding segment in the dot product bus. However, to accommodate certain situations in which one or more filter slices assigned to a core is not sparse enough (i.e., too many of the weight values of a portion of the filter used to compute a partial dot product are nonzero), the post-processing units of some embodiments each receive two dot product inputs. Specifically, some of the dot product bus lane outputs are sent to two or more of the post-processing units (in some such embodiments, different dot product bus lane outputs are sent to different numbers of post-processing units, with each post-processing unit receiving two such outputs). Some of the details of the post-processing units are described further below by reference to FIGS. 22-24.

The post-processing switch 2120 of some embodiments compresses the post-processing unit outputs (i.e., the activation outputs) to be sent to the activation write bus. In some embodiments, the chip fabric can be configured for different size activation outputs (e.g., 4-bit, 8-bit, or 16-bit), but the activation write bus requires the outputs to be in contiguous blocks. As such, for output sizes smaller than the maximum, the post-processing switch compresses these together to eliminate the meaningless bits (e.g., compressing two 4-bit activation outputs onto the wires for one 8-bit activation output).

Figure 22:
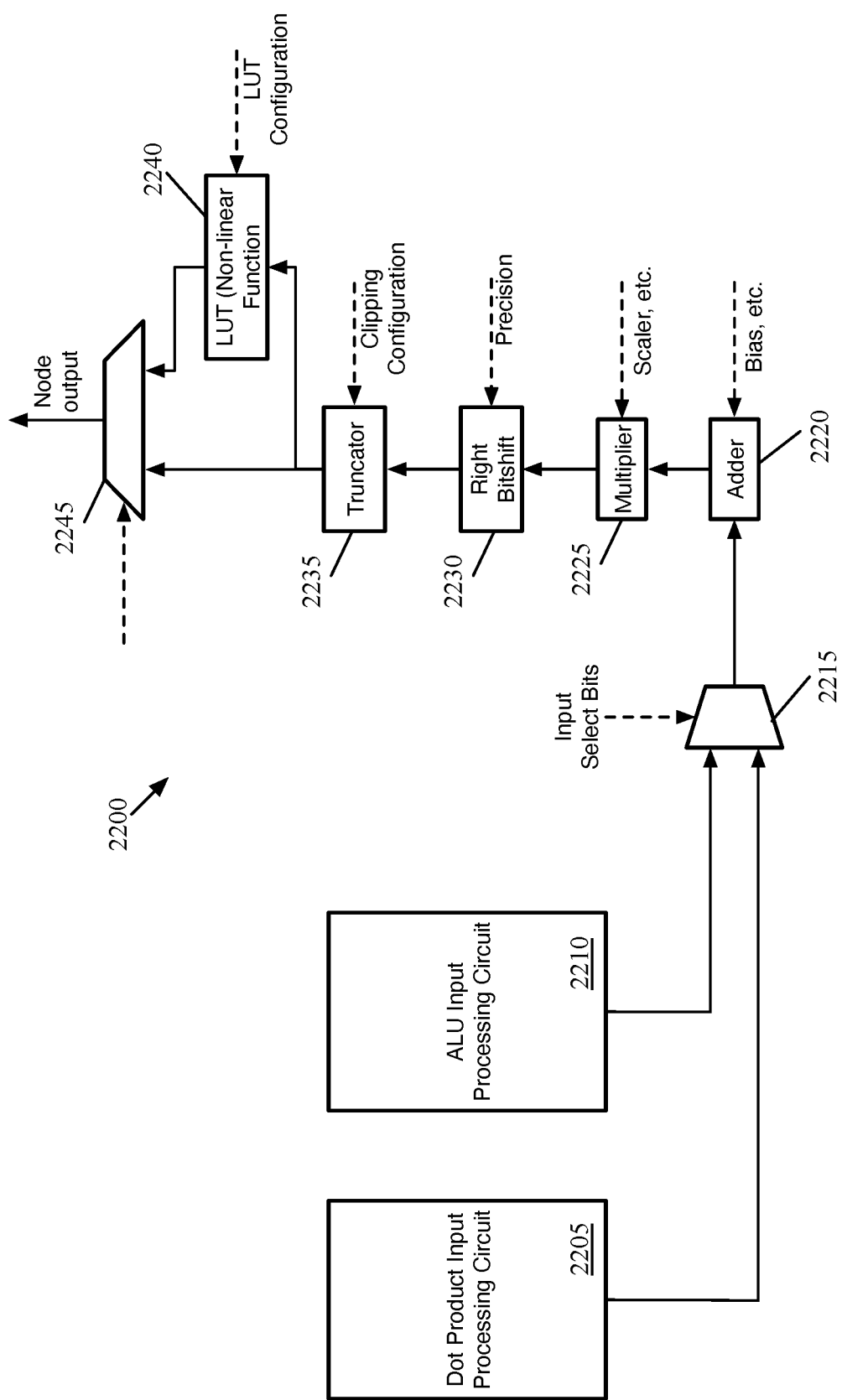
FIG. 22 conceptually illustrates the structure of a post-processing unit of some embodiments.
Figure 23:
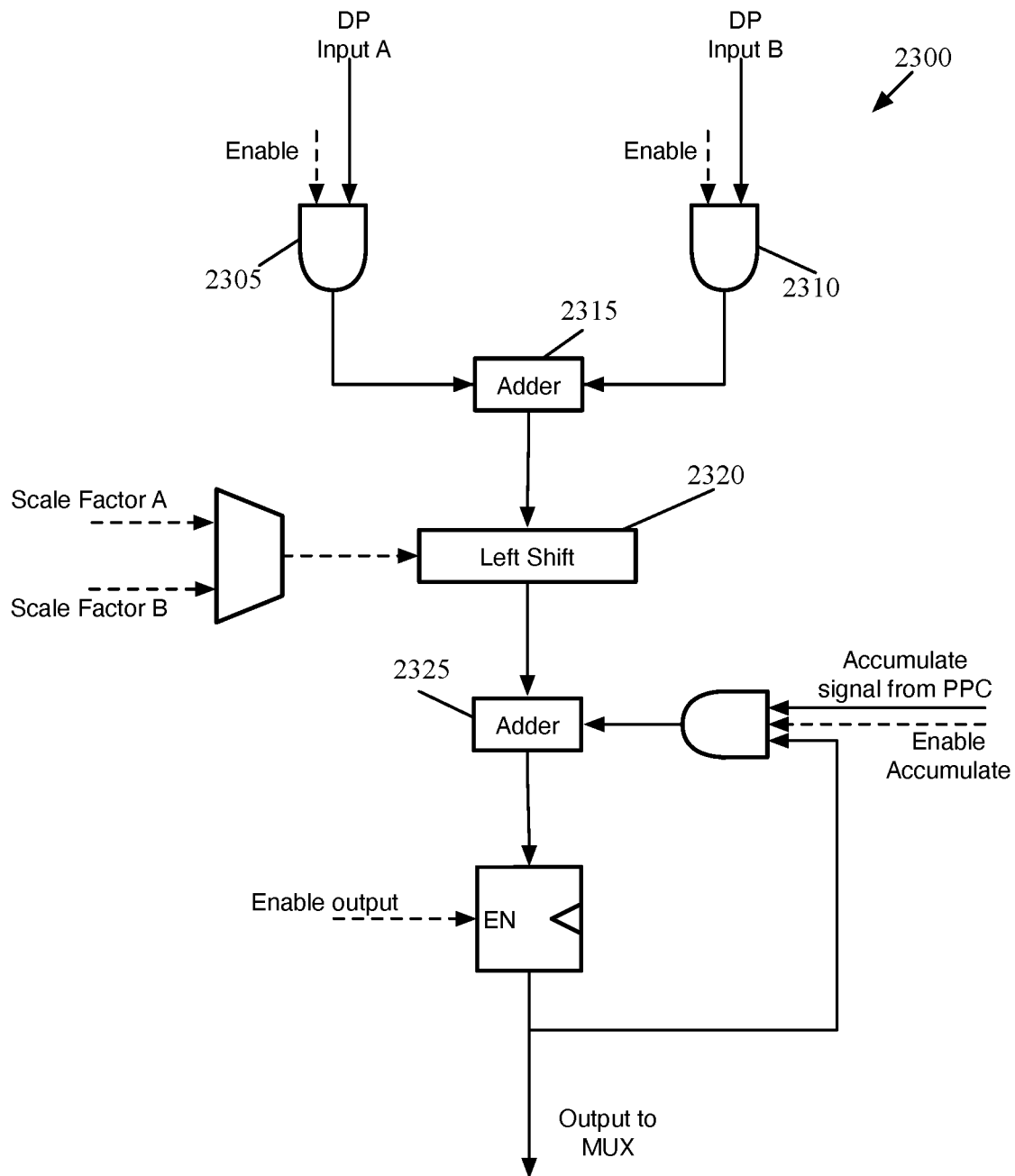
FIG. 23 conceptually illustrates a dot product input processing circuit of some embodiments.
Figure 24:
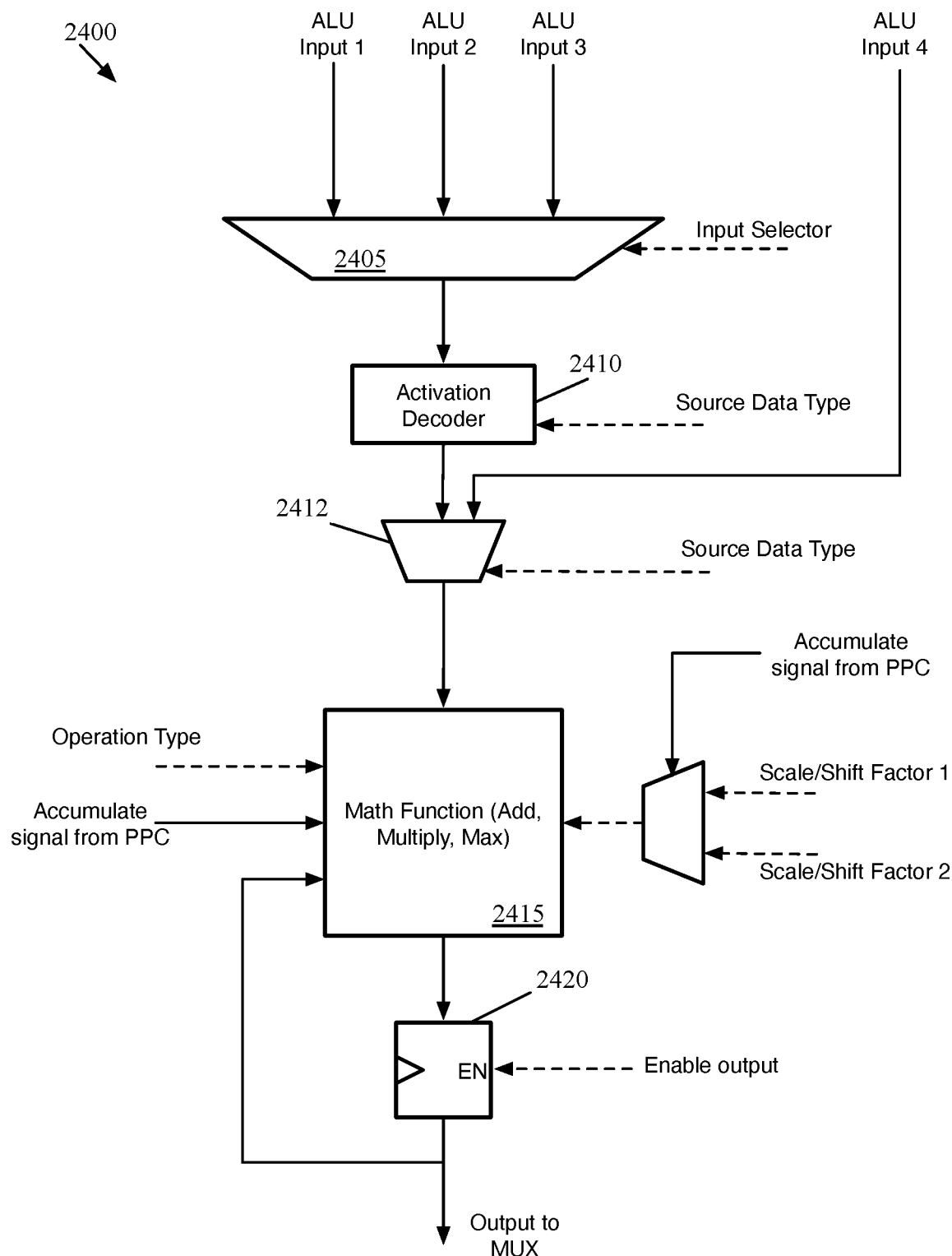
FIG. 24 conceptually illustrates an ALU input processing circuit of some embodiments.

As mentioned, FIGS. 22-24 illustrate the post-processing units in more detail. FIG. 22 conceptually illustrates the structure of a post-processing unit 2200 of some embodiments. As shown, the post-processing unit 2200 includes a dot product input processing circuit 2205, an ALU input processing circuit 2210, a multiplexer 2215 that selects between the outputs of these two circuits, and a set of post-processing operation circuits.

The dot product input processing circuit 2205, described in further detail by reference to FIG. 23, is used to combine dot products from two separate cycles if a dot product is too large to be computed in a single cycle across the cores of the computation fabric. In addition, if a particular filter slice needs to be split across multiple cores (because of too many non-zero weight values), the dot product input processing circuit is configured to account for that by using inputs from multiple dot product buses. Furthermore, some embodiments enable dot products to be double the size of the standard quantized output (e.g., 8-bit rather than 4-bit) by using dot products from multiple cycles and bitshifting the first set of input data.

The ALU input processing circuit 2210, described in further detail by reference to FIG. 24, is used to perform operations for neural network nodes that do not use dot products (i.e., that are not part of convolutional or fully-connected layers). Neural network computation nodes that do not use dot products include, for example, pooling layers of convolutional networks (e.g., average pooling and max pooling layers) as well as nodes that perform element-wise operations (e.g., for the element-wise addition operation used to combine multiple replica layers). In some of these embodiments, the cores provide input values directly to the post-processing units without computing dot products, and the post-processing units are configured to perform the appropriate operations on these inputs.

The output of each of these circuits 2205 and 2210 is sent to a multiplexer 2215, and a set of configuration bits is used to select between these two possible inputs. This input value is sent to an adder 2220 and then to a multiplier 2225. For dot product outputs, the adder 2220 adds the bias of the linear function for the node and the multiplier 2225 multiplies this by the scaling factor for the linear function (these bias and scale factors may include batch normalization affine transform parameters, in some embodiments). The value sent to the multiplier 2225, in some embodiments, is a combination of (i) the scaler value computed during the training of the neural network (which is often 1) and (ii) the positive value of the ternary weight (which was removed in order to scale the weight values used in the dot product to 1 and −1). As described below, some embodiments use this scaling factor at the multiplier 2225 to handle complications arising from quantization of replica layers.

In some embodiments, a multiplexer is used to select between a bias value specific to the post-processing unit (i.e., allowing for different bias values for different computation nodes in a layer) and a bias value shared across all of the post-processing units in a layer. In general, convolution and fully-connected nodes will use a node-specific bias value (especially when accounting for the number of negative weights), but pooling and typical element-wise operator layers may use the same value for all of the nodes (often zero). However, the element-wise operation used to combine multiple replica layers may use individual node-specific bias values in some embodiments, as this layer applies post-processing operations as for a convolutional layer.

For the scaling factor, a set of multiplexers is used in some embodiments to select between a node-specific scaling value and two possible shared scaling values. In some embodiments, pooling layers will use the same shared scaling value for each node (e.g., to divide by the number of nodes over which average pooling is performed), but at the end of a row will need a different scaling value to account for padding.

The right bit shift operator 2230 ensures that, post-multiplication, the value has the desired precision (i.e., shifting the binary point). As an example, a number with three bits before the binary point and two bits after multiplied by a similar such number would result in a number with six bits before the binary point and four bits after. However, if a number with only two bits after the binary point is desired, the right bit shift removes the last two bits. In some embodiments, the right bit shift receives a set of configuration bits that map to different allowed precisions. This bit shift circuit 2230 can be used to modify the precision of replica layers in some embodiments, as described below.

The truncator 2235 performs a clipping operation in some embodiments to truncate the output value of the linear operator down to the desired number of bits. In some embodiments, this can be a 4-bit value, a 5-bit value (a 4-bit signed value), an 8-bit value, or a 16-bit value. In such embodiments, the output has 16 wires, and values of less than 16-bits have 0s for the appropriate number of most significant bits. In other embodiments, the maximum output is 8 bits, in which case 4-bit, 5-bit, and 8-bit values are possible outputs. Different clipping operations that may be used, in different embodiments, can include a modulo operation (that effectively zeroes out a particular number of the most significant bits), clipping values above a maximum down to that maximum (e.g., if outputting a 5-bit value, all values above 15 are clipped down to 15 (1111), etc.). In some embodiments, the truncator 2235 receives (as output from the right bit shifter 2230) more bits than it outputs (e.g., receiving 32 bits but outputting a maximum of 16 bits).

Finally, the LUT 2240 implements the non-linear activation function. The full (e.g., 16-bit, 8-bit) output of the truncator 2235 is passed to the multiplexer 2245, while a subset of the output bits (e.g., 5 bits) are also split off to the LUT 2245. This LUT effectively implements a mapping table representing the activation function for the neural network computation node, and the multiplexer 2245 selects between the truncator output and the LUT output. The LUT configuration, in some embodiments, is the same for all nodes in a layer, which only requires one set of mapping table values to be sent as part of the neural network instructions. The multiplexer output is the neural network node output, which is gated by a valid signal (not shown) to indicate when the post-processing unit is outputting a completed activation value to be carried by the activation write bus to the appropriate core and stored in the activation memory of that core.

The use of a LUT rather than a hardwired non-linear function enables the use of different non-linear activation functions for different layers of a neural network as well as for different networks. For instance, in addition to common activation functions such as the Rectified Linear Unit (RELU), periodic activation functions, etc. are possible. In some embodiments, the lookup table circuit receives a truth-table (e.g., a 4-bit to 4-bit or 5-bit to 4-bit mapping) as configuration data in order to implement the non-linear activation function. In some embodiments, periodic functions with can be implemented using the modulus function of the truncator 2235. In this case, the period of the period function is the full truth table provided to the lookup table 2240, with the modulus function meaning that only the 5 least significant bits of the output from the right bit shifter 2230 will affect the value output by the lookup table 2240.

FIG. 23, as mentioned, conceptually illustrates a dot product input processing circuit 2300 of some embodiments. As shown, the circuit 2300 receives the output of two dot product bus lanes (dot product input A and dot product input B). These inputs are each gated by AND gates 2305 and 2310, which use enable bits from the cluster controller to specify which dot product to use as input (or both), in certain cases. In some embodiments each post-processing unit receives the output of a different corresponding dot product bus lane as its first dot product input (i.e., DP input A). That is, if there are N dot product bus lanes and N post-processing units in a cluster, then the nth post-processing unit receives its first dot product from the nth dot product bus lane. The second dot product input (i.e., DP input B) for each post-processing unit is from a different lane in some embodiments.

In this example, the activation size has the option of being either a first size (e.g., 4-bit) or twice that size (e.g., 8-bit). In the simplest case, in which (i) the dot product for a node has few enough input/weight values to be performed in one cycle, (ii) the activation size is the smaller size, and (iii)

there are no sparsity violations with the filter slices assigned to each core, then the remainder of the circuit 2300 effectively acts as a pass-through for the first dot product input. The AND gate 2305 enables this first dot product input, while the AND gate 2310 gates the second dot product to 0. However, in other situations, the adder 2315, left-shift operator 2320, and adder 2325 enable the dot product calculation for a neural network node to be completed and provided to the other post-processing operations. In addition, the left shift circuit 2320 can also be used to align a dot product to ensure that the binary point is in the correct location for the input value.

In addition to these dot product operations, in some embodiments the post-processing units include additional circuitry for performing operations for neural network computation nodes that do not use dot products. The nodes of some neural network layers use computations that do not include dot products. For example, a convolutional neural network will typically include pooling layers that reduce the number of activations by performing a computation on spatially-proximate groups of activations (i.e., the outputs of spatially-proximate nodes). Typical pooling operations include average pooling (reducing a group of activations to a single activation value by computing the average of the activations) and max pooling (reducing a group of activations to a single activation value by selecting the maximum value of the activations). Element-wise operations, in some embodiments, use inputs from multiple layers that are the same shape (i.e., that have the same size and number of activation grids), and add or multiply the corresponding elements from those layers (e.g., to combine multiple replica convolutional layers).

FIG. 24, as mentioned, conceptually illustrates an ALU input processing circuit 2400 of some embodiments. As shown, the ALU input processing circuit 2400 receives a set of ALU inputs (in this case 4) from an ALU bus that carries activation values directly from the cores. The ALU inputs for each post-processing unit are selected from more than one core in some embodiments (e.g., the multiple cores of the cluster to which the post-processing units belong). A multiplexer 2405 selects one of these inputs (based on configuration data from the local cluster controller).

The selected input is sent to the activation decoder 2410, which sign-extends the input value (e.g., by adding an extra bit to this value). For instance, a 4-bit input activation would be sign-extended into a 5-bit value. A fourth ALU input is also provided in some embodiments, that carries an input activation of a different (e.g., larger) size. For example, if the first three ALU inputs carry 4-bit inputs (sign-extended to 5-bits each), the larger fourth ALU input of some embodiments carries an 8-bit input activation (e.g., stored in a portion of the core RAM that could hold two adjacent 4-bit activation values). A multiplexer 2412 selects either the sign-extended smaller input activation from the activation decoder 2410 or the larger input activation, depending on configuration data from the local cluster controller (e.g., based on the size of the current input activations).

The math circuit 2415 is a set of circuit blocks that performs operations on a pair of operands. In some embodiments, the first operand is the decoded ALU input from the activation decoder 2410 (or the larger fourth ALU input) and the second operand is either a preset value or the previous output of the math circuit 2415. Some embodiments also subject the first input to a reverse shift and scale, if needed, to put this input in the same number system as the second operand. The shift and scale values are determined by configuration data from the cluster controller, which also provides data to the math circuit 2415 to indicate which of a set of possible operations the math circuit 2415 performs in a given cycle.

In some embodiments, the math circuit 2415 can be configured to perform addition (e.g., for both element-wise addition and average pooling), multiplication (e.g., for element-wise multiplication) and comparison (for maximum pooling). In some embodiments, for average pooling and addition, an 18-bit adder is used. For maximum pooling, an 8-bit comparator is used. For multiplication, an 8-bit×8-bit multiplier is used, with the lowest two bits of precision of the result rounded off to keep the binary place in the same position. Other embodiments use different circuits to enable these computations.

Each of these mathematical operations requires multiple clock cycles in the circuit of some embodiments, as only a single input can be received each cycle. The register 2420 holds the previous output of the math circuit 2415 until that output is required as an operand for the next operation of the math circuit 2415, or the operation is complete and the value is sent to the other post-processing operations (as shown in FIG. 22).

Figure 25:
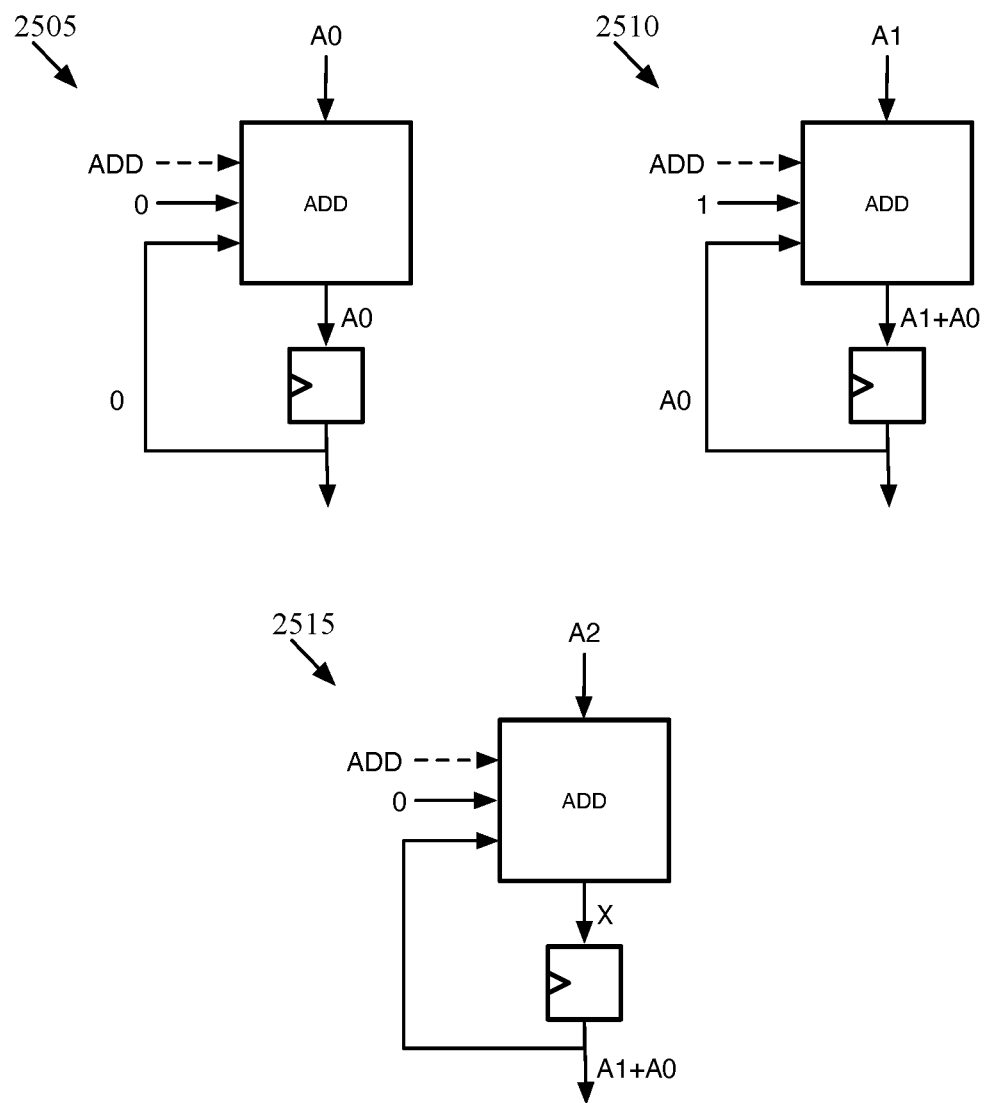
FIG. 25 conceptually illustrates an example of the math circuit performing element-wise addition.

FIG. 25 conceptually illustrates an example of the math circuit 2415 performing element-wise addition, which is used in some embodiments to combine the intermediate outputs of replicated layers. As discussed above, the math circuit takes as its first input operand the decoded ALU input, shifted and scaled as necessary, and as the second input operand either a preset value or the previous output of the math circuit. In some embodiments, the math circuit selects the second operand based on an accumulate signal from the controller. The circuit selects from the available math operations using an operation type input from the controller. In some embodiments, the operation type input is a 6-bit opcode that specifies whether the operation is a pooling, addition, or multiplication operation.

FIG. 25 specifically illustrates the math circuit performing an element-wise addition operation for activation inputs from two layers (e.g., two replica layers). The two inputs (A0, A1) are received one at a time (e.g., in subsequent clock cycles) as primary input, and added using the adder sub-block of the math circuit block. In this example, the configuration data specifying the operation type specifies an addition operation.

In the first (initial) cycle 2505, the activation input A0 is received at the first operand input. The accumulate signal input is off, indicating that the secondary operand input should be a preset value (0, in this case defined as the preset based on the operation type because 0 is the additive identity). Accordingly, the math circuit 2415 receives input value A0 and outputs value A0 to the register. In the second cycle 2510, the circuit receives the next input A1 as the first operand. The accumulate signal input is on, so the second operand is read from the register 2420, currently storing the result of the previous output, A0. The math circuit therefore outputs value A1+A0 to the register.

Finally, in the third cycle 2515, the accumulate signal is off, so the math circuit either begins a new calculation (if the input data is available at this time) or does not perform an operation. The accumulated result of the previous calculation is not used as the second operand input. In this example, the first operand input to the math circuit is the next activation A2 for the next calculation, in this case a new addition operation. However, the math circuit 2415 could be configured to perform any different operation now that the accumulation is reset. The final output of the example calculation, namely A1+A0, is selected by the multiplexer

2215 and used for additional post-processing operations as described above with reference to FIG. 22 (e.g., in the case of a replicated layer, the application of bias and scale values for the combined layer). It should be understood that, if additional replica layers are used, then the output A1+A0 can be stored in the register and fed back into the math circuit 2415 to be combined with corresponding values from additional replica layers. The math circuit 2415 and its operations are further described in U.S. patent application Ser. No. 16/547,506, filed Aug. 21, 2019, now issued as U.S. Pat. No. 11,222,257, which is incorporated herein by reference.

Figure 26:
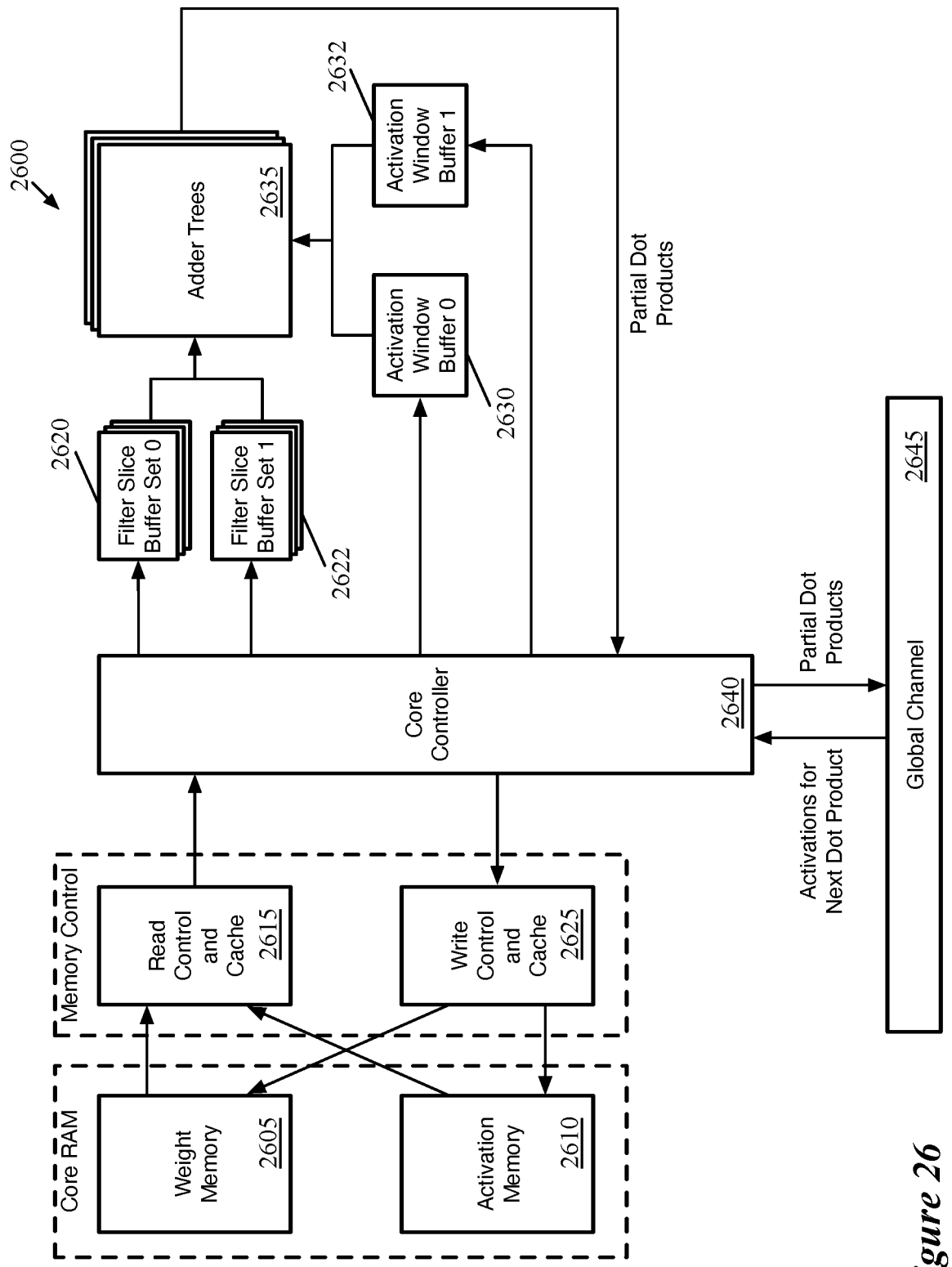
FIG. 26 conceptually illustrates the data flow within one of the cores of some embodiments for a dot product computation.

As mentioned, the dot product cores perform the majority of the dot product computation of the chip fabric of some embodiments. FIG. 26 conceptually illustrates the data flow 2600 within one of the cores of some embodiments for a dot product computation. This data flow will be described with certain specifics (e.g., weight and activation data sizes, number of separate adder trees simultaneously computing partial dot products, etc.) as examples, but it should be understood that different embodiments may use different sizes for weight data and/or activation values, different numbers of adder trees within a core, etc.

In some embodiments, the dot product cores store weight data values (e.g., weights for multiple nodes in multiple layers) in the weight memory 2605 and activation values in the activation memory 2610. In some embodiments, as shown, these memories 2605 and 2610 are part of a single block of memory for the core (e.g., banks of random access memories such as SRAMs). In addition to storing weight and activation values, in some embodiments the microprocessor of the IC can use the memories in the cores as overflow memory (e.g., to store an image before the image is processed and provided as input to the neural network fabric). The manner in which the weight data and activation values are stored in some embodiments is described in detail below by reference to FIGS. 29-31.

The weight values are part of the network parameters and thus are determined at compile time (and do not change at runtime), while the activation values (the input values to a particular node or set of nodes being computed) are the output values from a previous computation (or, for the first layer, are otherwise based on the network input) and thus are determined at runtime. Thus, the weight memory 2605 is typically larger than the activation memory 2610 (e.g., 512 KB to 64 KB), as the activation memory is at least partly overwritten for each new layer of the neural network while the weight memory 2605 stores the weights for all of the dot product computations performed by the core. In some embodiments, the weights are stored as 1-bit or 2-bit values (e.g., all values stored as 2-bit values, or zeros stored as a single bit and negative/positive values stored as 2-bit 1/−1). In other embodiments, the weights are encoded in such a manner that less than 1 bit of the weight memory 2605 is allocated per weight value (e.g., by encoding the weight values in such a way that many of the zeros are removed, while storing additional data for each non-zero weight value).

The read controller and read cache 2615 reads data from the weight memory 2605 into sets of filter slice buffers 2620 and 2622 that store the weight data to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load data for 36 (or 40) weight values into each filter slice buffer, which are actually used to compute 144 dot product components (with the requirement that at least 75% of the weight values be zero, the actual adder tree only receives 36-40 inputs for each buffer of 144 activation values, as described in detail below).

Some embodiments include both primary filter slice buffers 2620 and secondary filter slice buffers 2622, as shown in this figure. In a given clock cycle, at most one of these sets of filter slice buffers is used to compute dot products (e.g., using multiplexers to select only one of the sets of weight value data). For simpler dot product computations, only the primary filter slice buffer 2620 is needed, so there is no need to load weight values into the secondary filter slice buffers 2622. However, in other cases, both sets of filter slice buffers may be used (e.g., when dot products are too large to be computed in a single clock cycle using only the primary buffers).

The read control and cache 2615 also reads data (input values) from the activation memory 2610 into the activation window buffers 2630 and 2632. In addition, the read controller 2615 arranges the input values within the activation window buffers 2630 and 2632 in some embodiments to match up with the weight values in the filters. In some embodiments, the input values in an activation window read into the buffers 2630 (and 2632) include all of the values (as opposed to the 25% of the values needed for a particular filter), because the activation window is multiplied by numerous filters simultaneously (i.e., some or all of the filters stored in the filter slice buffers). The input values, in some embodiments, are quantized to have a fixed size (e.g., 4 bits), or set of fixed sizes (e.g., 4 bits or 8 bits) for ease and simplicity of computation.

As with the sets of filter slice buffers, some embodiments include both a primary activation window buffer 2630 and a secondary activation window buffer 2632. In a given clock cycle, at most one of these sets of activation window buffers is used to compute dot products (e.g., using multiplexers to select only one of the sets of activation input values). For simpler dot product computations, only the primary activation window buffer 2620 is needed, so there is no need to load activation inputs into the secondary activation window buffer 2622. However, in other cases, both activation window buffers may be used (e.g., when dot products are too large to be computed in a single clock cycle using only the primary buffers). In some embodiments, as shown, the same read controller and cache 2615 is used to read data from both the weight memory partition 2605 and the activation memory partition 2610. In such embodiments, the cache is used to store weight value data when reading the weights from the weight memory 2605. For each pass, this memory control circuit first reads the encoded weight data and provides this data to the core controller 2640 (which decodes weight data and loads the decoded weight data into the filter slice buffers), then reads input values and provides these values to the core controller 2640 (for the core controller to load the input values into the activation window buffer(s) interspersed with the computation of dot products by the adder tree circuits 2635).

The adder trees 2635 compute the dot products between the weight values represented in the filter slice buffers 2620 and the input values in the activation window buffer 2630. The details of these partial dot product computation circuits of some embodiments are described below by reference to FIG. 27. These adder trees 2635 output partial dot products (e.g., 10-bit values) that are provided to the dot product bus, which combines the partial dot products with other partial dot products as described above. In some embodiments, the number of filter slice buffers in each of the sets 2620 and 2622 is equal to the number of adder trees 2635 in the core, as well as the number of dot product bus lanes, post-processing units, and activation write bus lanes in each segment. Thus, for a typical neural network computation node, the partial dot products computed by the adder trees 2635 in multiple cores having a particular index are aggregated by the dot product bus lane with the same index, that aggregated dot product is provided for post-processing to one of the post-processing units with the same index (i.e., the post-processing unit with that index in one of the channel segments), and the output of the post-processing unit is transported by the activation write bus with the same index) to its destination core.

The core controller 2640 configures and coordinates the operation of the read and write controllers 2615 and 2625 in addition to the filter slice buffers 2620, activation window buffer 2630, and adder trees 2635. Furthermore, the core controller 2640 receives the input activations and weights from the read controller 2615 and loads them into the correct slots in the sets of filter slice buffers 2620 and 2622 and the activation window buffers 2630 and 2632 (or directs them to the ALU bus for non-dot product computations). Lastly, when the adder trees 2635 output their partial dot product values, the core controller 2640 sends these values to the dot product bus in the global channel 2645. When the activations for the next layer are output, the activation write bus carries these values to the core controller 2640, which provides them to the write control and cache 2625 to be written to activation memory 2610.

To reduce the circuit area and power required for dot product computations (which use the majority of resources for neural network inference), the partial dot product computation circuits (e.g., the adder trees 2635) of some embodiments map each of a first number of input values to a second number (e.g., 25% of the first number) of dot product inputs, such that each dot product input only receives at most one input value with a non-zero corresponding weight value. Specifically, in some embodiments, the partial dot product computation circuit includes at least two sets of wires for each input (activation) value, with each of the sets of wires for a given input value connected to at least two different dot product inputs (so that each input value can be provided to at least two different inputs). With a guarantee of at least 75% weight sparsity (i.e., at least 75% of the weight values for any set of input values are zero), e.g., due to training using quantization and sparsification techniques described above, the number of dot product inputs is set at 25% (or slightly more than 25%, for redundancy) of the number of input values loaded in an activation window for the dot product computation circuit. In some embodiments, the weight sparsity is guaranteed by the training algorithm used to train the weights to perform a specific purpose, and the IC is adaptable for any set of weights that meets the guarantee.

Figure 27:
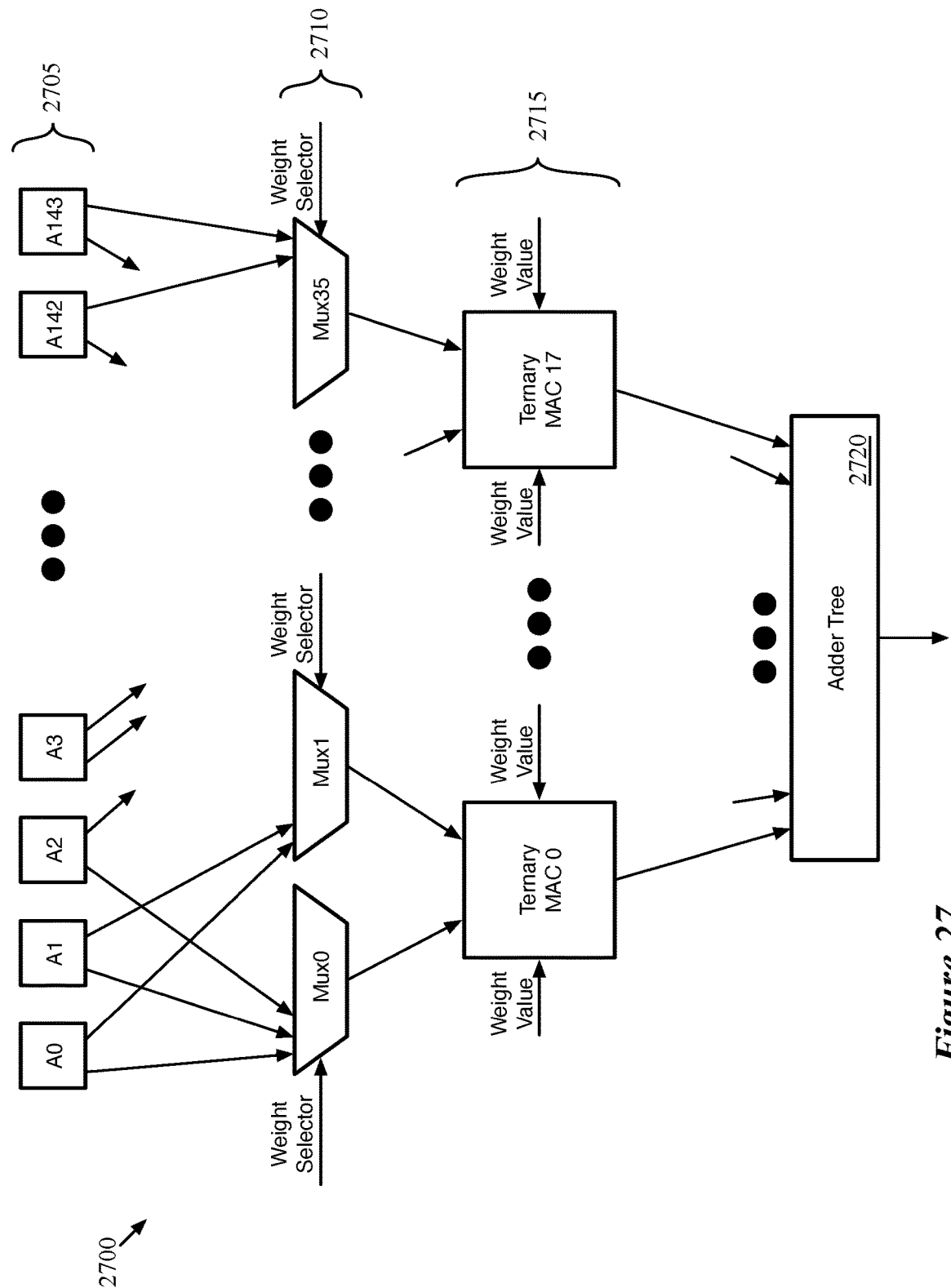
FIG. 27 conceptually illustrates an example of a partial dot product computation circuit for a guaranteed weight sparsity of at least 75%.

FIG. 27 conceptually illustrates an example of such a partial dot product computation circuit 2700 for a guaranteed weight sparsity of at least 75%. The wiring of the input values for this dot product computation circuit is designed to optimize the likelihood that, so long as the weights meet the sparsity requirement, the compiler can ensure that at runtime each input value with a nonzero corresponding weight value is provided to a different dot product input for nearly any arrangement of the nonzero weight values. As shown, the dot product computation circuit 2700 includes a set of activation inputs 2705, a set of multiplexers 2710, a set of ternary multiplier-accumulator (MAC) circuits 2715, and an adder tree 2720.

In this example, the dot product computation circuit 2700 includes 144 input values 2705. In different embodiments, the activation window buffer may have different sizes, which defines the size of the partial dot product computation. Each input value storage (e.g., each location in the activation window buffer) is connected to two of the thirty-six multiplexers 2710. In this example, at least 75% sparsity is assumed for each set of weight values, and thus the 144 activation inputs can be reduced to 36 inputs for the actual dot product computation. This significantly reduces the circuit area required for the dot product computation, as the number of adders is reduced by 75% (the adder tree effectively starts with 36 values rather than 144 values), in addition to reducing the amount of weight data that is stored in memory.

The multiplexers 2710 each have eight inputs and receive a set of select bits (the weight selector input) from the core controller that specifies which of these eight inputs to pass to the dot product computation. In some embodiments the weight selector input is a 3-bit value that is stored as part of the weight data for each non-zero weight. Having thirty-six 8-input multiplexers 2710 allows for 288 sets of wires from the activation inputs 2705 to the multiplexers 2710, which is two wires for each activation input. If the sparsity guarantee was only 50%, then seventy-two 4-input multiplexers could be used with two sets of wires for each activation input 2705 (or seventy-two 8-input multiplexers with four sets of wires for each activation input 2705), with similar proportions for different sparsity guarantees and numbers of wires per activation input.

The wire sets from the activation inputs to the multiplexers are arranged such that the compiler can verify that each input value with a nonzero corresponding weight is provided to a different one of the multiplexers 2710. The weight values are not known at the time of IC manufacture, and thus the wiring design is resilient to different arrangements of the nonzero weight values (that meet the sparsity requirement). Some embodiments use a cuckoo hashing algorithm (or other algorithm) to optimally map the wire sets from the activation inputs 2705 to the multiplexers 2710. In some embodiments, this algorithm computes two hashes (e.g., with two different hash functions) for each of the activation input locations 2705 that map to two different multiplexers 2710 (e.g., by computing the hash modulo 36). Each activation input location 2705 is wired to these two different multiplexers 2710 determined by the hashes. If one of the hash functions maps an activation input to a multiplexer that already has eight inputs, then some embodiments compute a third hash function for either that activation input or one of the activation inputs previously mapped to the multiplexer.

Other embodiments use other techniques to select the multiplexers to which each input value is wired, so long as each input is wired to two different multiplexers (and thus each multiplexer has input wires from eight different activation inputs). Additional constraints may be imposed as well, such as ensuring that no more than a specified maximum number of activation inputs are wired to the same pair of multiplexers. In addition, it should be understood that these techniques can be applied to dot product computation circuits with different numbers of inputs, different numbers of multiplexers, and different numbers of wires per input.

The weight values are known before the network is executed by the IC (i.e., at compile time), and thus the compiler can determine which of the two multiplexers that receive each input value with a non-zero corresponding weight at runtime will select that input value, such that each input value is selected by a different multiplexer (and only one multiplexer). In some embodiments, the compiler uses the same cuckoo hashing or other algorithm as was used for the wires. The select bits for the multiplexers 2710 are determined by which of the inputs to the multiplexer carries an input activation value with a nonzero corresponding weight value, and are received from the filter slice buffer. In some embodiments, these multiplexer select bits are stored for each non-zero weight value (for multiplexers that do not receive any inputs corresponding to non-zero weights, the multiplexer select bits do not matter, and thus do not need to be stored in the encoded weight data). These multiplexers 2710 provide their output to a set of ternary multiply-accumulator (MAC) circuits 2715. The ternary MAC circuits effectively form the leaves of the dot product computation, and the number of such circuits is half the number of multiplexers 2710 (18 ternary MAC circuits 2715 in this example).

In some embodiments, the weight values for a particular dot product computation are all either zero, a positive value, or the negation of the positive value in some embodiments. In this case, the dot product does not require any actual multiplication at the leaves of the computation, as the positive and negative weight values can be treated as 1 and −1, with a single multiplication by the positive value afterwards. Removing the multiplication at the leaves saves significant circuit area for a chip with numerous such computation circuits.

To combine the two input values while accounting for the ternary weight values, the ternary MAC circuits 2715 add the two input values from the multiplexers 2710 while also receiving as inputs the corresponding weight data for these input values. In some embodiments, the ternary MAC receives two bits of weight data for each of its inputs. If both of the weights are positive, then the ternary MAC outputs the sum of the two input values (and outputs the negative of this sum if both of the weights are negative). If only one of the weight values is negative, then its corresponding input value is subtracted from the other input value (with a positive corresponding weight value), and if both of the weight values are zero, then the ternary MAC output is zero. Lastly, if only one of the weight values is zero, then the ternary MAC outputs the input value (or the negative of the input value) with the corresponding nonzero weight value. The negative values are accounted for in the bias computation within the post-processing unit, as described above.

The outputs of the ternary MACs provide the inputs to the adder tree 2720 that computes the output for the partial dot product computation. In some embodiments, this adder tree is a standard adder tree circuit that adds pairs of values over several layers. For example, the adder tree 2720 receives 18 inputs for 9 adders, which in turn provide outputs to 4 adders (with an additional output to be added in later), etc. In some embodiments, the inputs to the ternary MACs 2715 are 4-bit inputs (the length of the quantized activation values), and the ternary MACs 2715 output 6-bit values. The adder tree 2720 receives these 6-bit values and outputs a 10-bit value after several stages of addition. It should be noted that this description refers to handling of signed 4-bit input values. Some embodiments can also handle unsigned input values by converting them to signed input values before performing the addition operations. For example, some embodiments output and store 4-bit outputs, which can be signed or unsigned. Before performing the addition operations, an additional bit is added that either sign-extends (to convert signed 4-bit inputs to signed 5-bit inputs) or 0-pads (to convert unsigned 4-bit inputs to signed 5-bit inputs).

While this diagram shows the wires (or some of the wires) connecting each of the input values 2705 to a single partial dot product computation circuit, in some embodiments each of these input values 2705 in the activation window buffer is actually connected to each of the partial dot product computation circuits in the core. That is, for the case with 64 such circuits, each value in the activation window buffer is carried by 128 total wires to 128 multiplexers (two for each of the partial dot product computation circuits). In some embodiments, the wiring arrangement is the same for each set of multiplexers (i.e., for each partial dot product computation circuit).

As mentioned, for redundancy, some embodiments use a number of dot product inputs (i.e., multiplexers) that is slightly more than required by the sparsity guarantee for the dot product computation. For instance, in the example above, rather than using 36 inputs (exactly 25% of the 144 input values), some embodiments use 38 or 40 inputs. In this case, some of the activations 2705 are mapped to three of the multiplexers 2710, rather than two.

Figure 28:
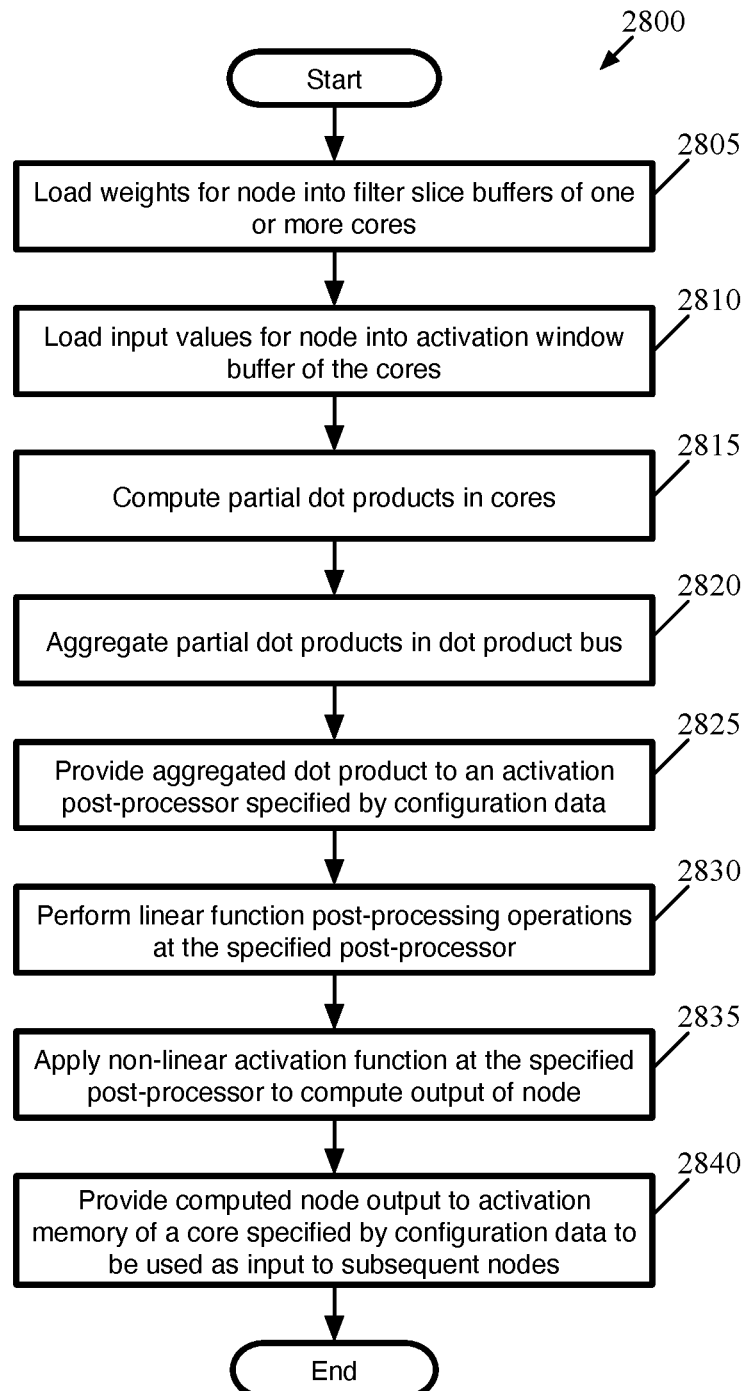
FIG. 28 conceptually illustrates a process of some embodiments for executing a set of instructions (or a portion of a set of instructions) to compute the output of a neural network node.

FIG. 28 conceptually illustrates a process 2800 of some embodiments for executing a set of instructions (or a portion of a set of instructions) to compute the output of a neural network node (specifically, a convolutional or fully-connected node). The process 2800 is executed by the chip fabric of a neural network IC, such as that described above. Typically, the process 2800 is executed simultaneously for multiple nodes, and operations 2810-2840 are performed repeatedly for multiple activation windows (i.e., multiple groups of input values loaded into the activation window buffer) in order to completely execute a layer (or portion of a layer) of the neural network. In the case of the process 2800, the dot product can be computed in a single cycle and does not involve any split filter slices (i.e., no time-multiplexing is required).

As shown, the process begins (at 2805) by loading the weights for a node into filter slice buffers of one or more cores. In addition, the process loads (at 2810) the input (activation) values for the node into the activation window buffer of these cores. In some embodiments, a set of input values are loaded into one activation window buffer in a core while the weight data for several nodes are loaded into several filter slice buffers of the core. Other embodiments load the weight data into the filter slice buffers first, then load the input values into the activation window buffer. Furthermore, some embodiments load the weight data once for a pass (that computes outputs for many activation nodes), then iteratively load sets of input values and compute dot products for numerous nodes without the need to re-load the weight data. In addition, the weights and activations for a node, in some embodiments, are divided among the filter slice and activation window buffers of all of the cores that are active for the current set of instructions. The storage of the weight and activation values and loading of these values into the filter slice buffer and activation window buffer, respectively, are also described in greater detail below.

The process 2800 then computes (at 2815) partial dot products in the cores. As described above, the activation values loaded into the activation window buffers in each of the active cores are multiplied by their corresponding weight values loaded into the filter slice buffers of these cores. In some embodiments, the size of the partial dot products is reduced using the wiring structure shown in FIG. 27, and with ternary weight values of {0, 1, −1}, the multiplication is handled by the ternary MAC circuits shown in this figure.

Next, the process aggregates (at 2820) these partial dot products in the dot product bus. In some embodiments, the partial dot products for a particular node are calculated by the adder tree with the same index (i.e., out of several adder trees) in each of the active cores, and thus these partial dot products are all passed to the same corresponding lane of the dot product bus (which has one lane for each of the adder trees in a core). In some embodiments, the final aggregation is performed by the dot product bus lane in the channel segment of the post-processor selected for the particular node.

The process 2800 then provides (at 2825) the aggregated dot product to an activation post-processor specified by configuration data. This configuration data, in some embodiments, is generated by a compiler and parsed by the hierarchical controller circuits of the neural network chip fabric, and indicates which channel segment will perform the post-processing. Each of the channel segments has an equal number of post-processing units, and the post-processing unit in the selected channel that corresponds to the dot product bus lane that aggregates the dot product is the post-processing unit that receives the aggregated dot product.

At the post-processing unit that receives the aggregated dot product, the process 2800 performs (at 2830) linear function post-processing operations. For all dot products, this includes the bias and scale operations described by reference to FIG. 22 above, with the values for these operations sent as configuration data from the cluster controller. In addition, certain dot products are aggregated over multiple cycles by the dot product input processing circuit (e.g., if time-multiplexing is required to handle dot products with a large number of components, or for dot products with double the standard number of bits).

Next, the process 2800 applies (at 2835) the non-linear activation function at the post-processing unit to complete the calculation of the node output value. In some embodiments, as shown in FIG. 22, a lookup table is used for this computation (e.g., a 5-bit to 4-bit mapping table). The mapping for each possible set of input bits is provided by configuration data from the cluster controller in some embodiments.

In some embodiments, the operations 2815-2835 are executed to compute the node output without storing the any intermediate values in memory. That is, none of the partial dot products are stored in any memories (e.g., RAM) during the computation within the core, and the same is true before and during the aggregation within the dot product bus. In some embodiments, a register is used to aggregate multiple dot product bus inputs over multiple cycles. However, in a standard case (e.g., for 4-bit dot products), this register passes the dot product input through and the entire set of operations 2815-2835 is executed in a single clock cycle.

Finally, the process 2800 provides (at 2840) the computed node output to the activation memory of one (or more) of the cores as specified by the configuration data, so that this output can be used as the input to a subsequent set of neural network nodes. In some embodiments, the node output value is carried to the specified core by the activation write bus, with the core index for the value specified by the cluster controller(s). In some embodiments, once at the specified core, the node output value may be temporarily stored in a write cache until the write cache is full and the data is written to the core memory.

As mentioned, the process 2800 illustrates the most simplistic case for computing a dot product. For this simplest type of dot product computation, the neural network computation circuit of some embodiments places the following restrictions on the computation: (i) all of the input values should be of the specified discrete size (e.g., 4 bits), (ii) the maximum number of input values is the size of the input buffer multiplied by the number of cores (e.g., 144 inputs×16 cores=2304 total input values), (iii) all of the weight values are either 0, +α, or −α (and thus can be stored as 0, 1, and −1), and a large enough percentage of the weight values are 0 that the input values with non-zero weight values can each map to a different multiplexer input.

As mentioned above by reference to FIG. 26, each core includes a block of memory to store the weight data and activation values used by the core to compute dot products (i.e., the activation values that are loaded into the activation window buffer and the weight data that is loaded into the filter slice buffers). In some embodiments, each core is allocated the same amount of memory in total, which is divided between weight memory and activation memory for a particular network by the compiler that designs the program for the inference circuit to execute the network. Some embodiments require that each core be divided between weight memory and activation memory in the same manner (i.e., the allocation of weight/activation memory to each core is the same for all of the cores), while other embodiments allow for different allocations between the cores. For example, in some embodiments the allocation is the same for each core within a cluster, but can vary between cores in different clusters (e.g., if a subset of cores are used for a majority of the layers of the network, then that subset of cores might need more of its memory allocated to weight data storage).

Within a core, the weight memory and activation memory partitions are themselves subdivided between layers of the network. As described above, all of the weight data used by a core is stored in the memory of that core at bootup time, because these values are the same for every input provided to the network. On the other hand, the activation values are determined at runtime (and occupy more memory per value than the weight data), so the cores do not store all of the activation values at a time. Depending on the type of network, only two layers of activations may need to be stored at once (the input activation values for the current layer being executed as well as the output activation values for that layer). In this case, once layer L is being executed (using the layer L activations as inputs and outputting the layer L+1 activations), the circuit can overwrite the layer L−1 activations. On the other hand, if a network has residual connections (i.e., the output activations from layer L are used as inputs for more than just layer L+1), then more than two layers of activations may need to be stored at once.

Figure 29:
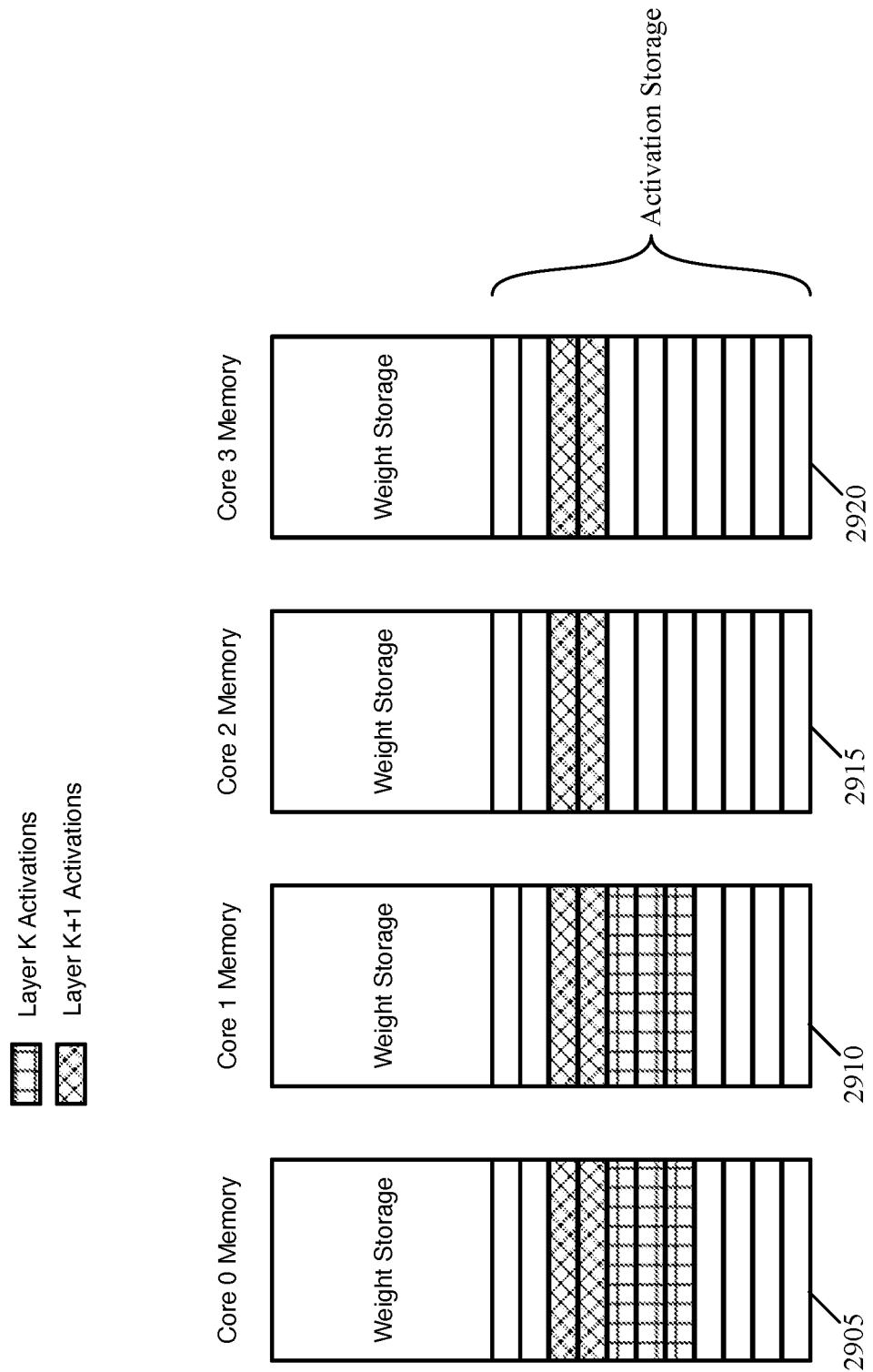
FIG. 29 conceptually illustrates the assignment of layers of activations to memories of four cores within a cluster.

FIG. 29 conceptually illustrates the assignment of layers of activations to memories 2905-2920 of four cores within a cluster. In this example, each of the cores is partitioned into weight storage (shown in the figure as a single block) as well as activation storage (shown as blocks of memory). Each of the blocks within the activation storage represents a set of memory locations (e.g., a bank of RAM, each containing numerous RAM words) in some embodiments. Though the figure shows a small number of such blocks within each core memory 2905-2920, it should be understood that a typical neural network computation circuit will have thousands of RAM words per memory. In addition, although the activation partition is larger than the weight partition in this example, the weight partition will often be the larger partition because all of the weight values for the entire network are stored in the memories at boot time.

The figure illustrates (using different types of cross-hatching) the memory portions allocated to the activation values (i.e., input activations) for each of two layers (layer K and layer K+1). In this example, the activations for layer K are divided across the memories 2905 and 2910 for two of the cores (meaning that only these two cores participate in the dot product calculations for this layer), whereas the activations for layer K+1 are divided across the memories 2905-2920 for all four illustrated cores. When there are replica layers, the input activations are the same for each replica layer, and the output activations for the replica layers will all be stored across the same set of cores (which may not be the same as the cores storing the input activations). For each of the layers, the first RAM word storing activations for that layer is aligned to the same memory address (i.e., the first activation for the layer stored in each core starts at an equivalent memory location within the respective core). In addition, the first activation for a layer starts at the beginning of a RAM word (i.e., the least significant bit in the word) in some embodiments.

In some embodiments, the activation values for a layer are divided evenly among the cores storing the activations for that layer (or as close to evenly as possible). Some embodiments require that the number of cores for a layer is a multiple of the number of cores in a cluster (e.g., a multiple of four). Other embodiments simply impose the requirement that the number of two-dimensional activation grids assigned to each core is equal (or as close to equal as possible). Referring to the three-dimensional structure of a layer of activations shown in FIG. 2, each two-dimensional grid of activations is assigned entirely to a single core. As such, if the number of activation grids is not evenly divisible by the number of cores to which those activations are assigned, then some of the cores will be assigned more of the actual activation values than other cores. However, some embodiments assign zero-grids (i.e., grids of activation values equal to zero) to make up the difference and even out the number of activations in each core for the layer. In other embodiments, rather than specifically ensuring the activation values are all zero (which would require generating one or more extra activation value grids of zeros and loading these values into the RAM each time the network is executed), the compiler ensures that the corresponding weight values stored in the weight memory are all zero, such that the data used for these activation value grids does not matter).

In addition, as shown in FIG. 29, all of the activation values for a layer are assigned to a contiguous block of each core's memory. As described further below, in certain cases, a portion of a RAM word may be zero-padded (or left with unverified data that is not used in the computations for the layer) within this contiguous block of memory.

Figure 30:
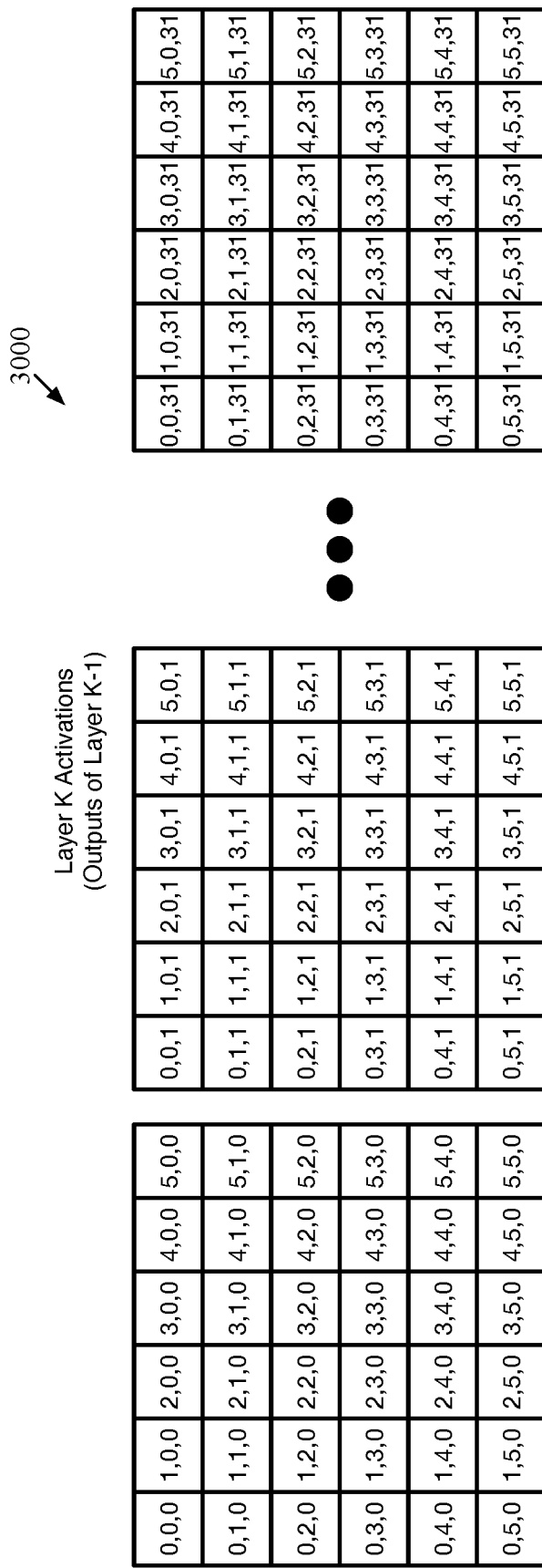
FIG. 30 conceptually illustrates a layer of activation values.
Figure 31:
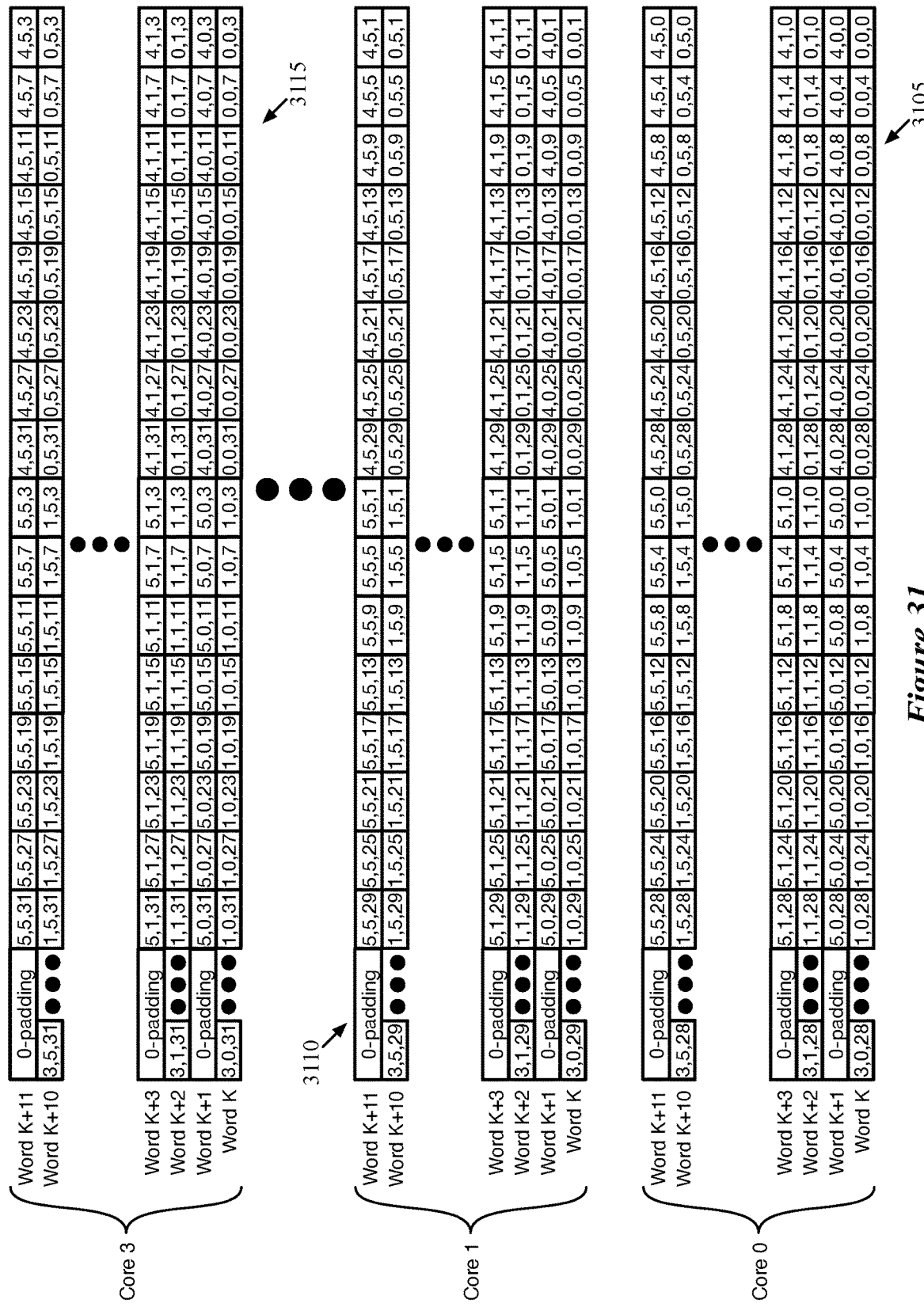
FIG. 31 conceptually illustrates the arrangement of the activation values of FIG. 30 among the memory of four cores.

FIG. 30 conceptually illustrates a layer of activation values 3000, and FIG. 31 conceptually illustrates the arrangement of these activation values 3000 among the memory of four cores. As shown in FIG. 30, the layer K activation values are structured as a 6×6×32 layer (i.e., 32 6×6 grids, meaning that the previous layer most likely had 32 filters). Each activation value in the layer is labeled with a three-dimensional (x, y, z) coordinate. The x-coordinate refers to the column to which the activation belongs (0-5), the y-coordinate refers to the row to which the activation belongs (0-5), and the z-coordinate refers to the grid to which the activation belongs (0-31). Each of these activations will have different values depending on the input data provided to the network, but the activation value at a given coordinate will be stored in the same location in the core memories each time the network is executed.

FIG. 31, as mentioned, illustrates the arrangement of the activation values 3000 according to the activation storage rules of some embodiments. In this case, the compiler determined that the activation values 3000 of Layer K will be stored in four cores of the neural network computation fabric (Cores 0-3). The memories 3105-3115 of each of the cores include numerous banks of RAM in some embodiments, divided into words that can each be read from or written to individually. These words may have different lengths in different embodiments; in this example, the words are each 128 bits long. Thus, if the activation values are each 4-bit values (as is the case in some embodiments), then a single word can hold 32 activation values. When larger 8-bit activation values are used, then a single word holds 16 activation values. In the figure, each word is shown with the least significant bits on the right, which will be referred to as the "start" of the word. Thus, the rightmost 4 bits (least significant nibble) of each word holds the first activation value of the word. In addition, the words are ordered, with this example showing the first word in each core (or at least the first word for the illustrated layer of activation values) at the bottom of the diagram.

To optimize the use of the core memory as well as the efficiency with which the activation values are read from the core memory, some embodiments organize the activation values in the memory according to a set of defined rules (which are shown by way of example in FIG. 31). As mentioned, each two-dimensional grid of activation values is assigned entirely to a single core. In this example, grids {0, 4, 8, . . . 28} are assigned to Core 0, grids {1, 5, 9, . . . 29} are assigned to Core 1, grids {2, 6, 10, . . . 30} are assigned to Core 2, and grids {3, 7, 11, . . . 31} are assigned to Core 3. The compiler may use different algorithms to assign grids of activation values to different cores in some embodiments, so long as the grids are assigned evenly (or as close as possible to evenly) to the cores.

The activation values within a core are not necessarily arranged with all of the activation values of a grid stored contiguously. Instead, within each core, some embodiments store all of the activations for a particular coordinate (i.e., an x-y coordinate) within the grids assigned to that core in a contiguous block. For a typical convolution, all of the activation values at a particular (x,y) coordinate will be used for dot product computations at the same time, so storing these values contiguously helps minimize resources used (and latency) for loading the activation values when computing the dot products for a layer.

As shown, the activation memory for layer K in each core starts with the activations at (0,0) for all of the grids assigned to that core. In this case, eight grids of activation values are assigned to each of the four cores (the 32 grids are evenly divisible by 4, so no zero-grids are required). Thus, the first eight values of the first word in each core (designated as word K) are the activations with (x,y) coordinates of (0,0). In some embodiments, if there are more grids assigned to a core than the number of activation values that a memory location (i.e., a RAM word) can store, then these are split up into separate sets of activations, and only a single word worth of activation values at the same coordinate are stored contiguously. That is, if 35 grids of activation values were assigned to Core 0, then only the first 32 activation values would have coordinates of (0,0). Those first 32 grids would be stored as a contiguous block that iterates through each (x,y) coordinate, followed by the remaining 3 grids of activation values (stored in the same way, iterating through each (x,y) coordinate).

Within the memory 3105-3115 of each core, the first 8 activation values are those located at coordinate (0,0). Next, the algorithm for activation value storage moves to the activation values coordinate (1,0)—that is, the x-coordinate is incremented as the next value in the same row of each grid is stored. This proceeds until the end of the current row is reached (i.e., the activation values with coordinate (5,0)). In some embodiments, once the end of a row in the activation grids is reached, the remainder of the current RAM word is 0-padded. As shown in the figure, this means that the last half (64 bits, or 16 activations) of word K+1 (as well as words K+3, K+5, etc.) in each of the memories 3105-3115 is 0-padded (or padded with unverified data that is never loaded into the activation window buffer). This pattern (arranging the activation values in row-major order) is repeated for each row of activation values in the grids assigned to a given core.

When loading the activation values as inputs to dot product computation, upon reaching the end of a row of the activation grids, the core memory controller returns to the start of the next row, and the activation values from the end of the previous row are not reused. The use of 0-padding (rather than starting the next row of activation values in the same RAM word) avoids the need to read multiple words when starting a new row of convolutional layer computations (which would require additional clock cycles).

As a result of this activation storage algorithm, a given memory location in one source core for a layer will store activations for the same x-y coordinates as that memory location in any of the other source cores. For example, the tenth activation in RAM word K+1 of Core 0 is the activation for coordinate (5,0) in activation grid 4. Correspondingly, the tenth activation in RAM word K+1 of any of the other cores is also an activation for coordinate (5,0), in different activation grids.

The weight values are stored in a similar manner, in some embodiments, with certain differences. Just as activation values for a layer are divided across multiple cores (and, specifically, the activation values for each particular dot product in a layer are divided across the multiple cores), the weight values for each filter in a layer also divided across these same multiple cores. Over the course of a convolutional layer, a particular weight value in a filter is multiplied by numerous activation values, all of which are in the same activation grid. As such, each weight value is stored in the same core as the activation grid that contains the activations by which that weight value is multiplied. However, in some embodiments, the length of each filter slice may be different, even within a single layer, due to the different number of non-zero weight values. That is, even if a filter slice buffer always has 36 (or 40) weight values, the amount of memory required to store those weight values may differ depending on the number of non-zero weight values. For a set of replica layers, the same input activations are used for each of the layers, and thus the weight values for each replica layer are stored in the same set of cores as the activations. If the replica layers have fewer non-zero weight values than the original layer, then the weights for these replica layers will occupy less memory in some embodiments.

As described above, the input activation values for a layer are read (e.g., by the read controller) and stored in a read cache. From this read cache, the activation values can be loaded into the activation window buffer, if being used for a convolutional (or fully-connected) layer, such as a replica layer. In addition, if being used for an element-wise or pooling layer (e.g., an element-wise addition layer used to combine the outputs of multiple replica layers), activations stored in RAM as shown in FIG. 31 may also be sent directly to the post-processing units via the ALU bus. The ALU bus maps activations to the PPUs for different types of operations in such a way as to take advantage of the manner in which the activations are stored in the core RAM.

FIGS. 32A-B illustrate a table 3200 showing the mapping of ALU outputs to the different post-processing units for a neural network computation circuit of some embodiments with 64 post-processing units (PPUs) per global channel segment. In this table, the first column is a PPU index, the second, third, and fourth columns are 4-bit ALU inputs by index, and the fifth column is an 8-bit ALU input (using adjacent indexes). For a given PPU, the inputs come from the ALUs of two or more of the four cores in the cluster corresponding to the global channel segment (e.g., alu0 is the ALU for core 0, alu1 is the ALU for core 1, etc.). The first two inputs (alu_a, alu_b) to each post-processing unit are output from the same index of two different cores (e.g., post-processing unit 27 receives the output from index 27 from cores 0 and 2). In some embodiments, this structure is repeated for each global channel segment with a set of PPUs and four cores that can store activation inputs.

In some embodiments, the different inputs are reserved for different types of math operations. In the example of FIGS. 32A-B, alu_a is selected for pooling operations (average or maximum) from cores 0 and 1, and alu_b is selected for pooling operations from cores 2 and 3. The third input alu_c is selected for element-wise operations (e.g. addition or multiplication). As discussed above, the fourth input alu_d is selected for any operations requiring 8-bit values. Based on the type of operation being performed, configuration data provided to the PPUs specifies which of these inputs to select.

As discussed above with reference to FIGS. 29, layers of activations are stored as RAM words in the activation memory of the cores. These words may have different lengths in different embodiments. For example, if the words are each 128 bits long and the activation values are each 4-bit values (as is the case in some embodiments), then a single word can hold 32 activation values. During a single clock cycle, the activation memory controller can output a single RAM word to the ALU bus. Accordingly, for 128-bit words and 4-bit activations, 32 activations can be read from each core simultaneously. When larger 8-bit activation values are used, then the corresponding block size is 16 activation values per core. For the subsequent discussion, 4-bit activations and 128-bit words are assumed for purposes of explanation.

In the example of FIGS. 32A-B, two inputs (alu_a and alu_b) are used for pooling operations, and each have indices that range from 0 to 32 from each of two cores. Therefore, for pooling operations a maximum block size of 32 activations per core can be output during a single clock cycle. The third input (alu_c) is used for element-wise operations and has indices that range from 0 to 16 for each of all four cores in the cluster. Therefore, for element-wise operations a maximum block size of 16 activations per core are output during a single clock cycle, leaving 16 activations per core unused in some embodiments. The fourth input (alu_d) is used for 8-bit activations from all four cores, with a maximum block size of 16 (8-bit) activations per core. As noted above, for non-dot product computations the activations are directly sent to the ALU bus from the core controller, and do not need to be sent to the activation window buffers. In some embodiments, these activations are still read to and output from the read cache. The read cache output data is directed to the ALU bus rather than to the activation window buffer when the configuration data specifies for ALU operations to be performed.

For element-wise operations (e.g., multiplication or addition), activations from multiple different layers (e.g., multiple replica layers) are combined. In typical element-wise operations, activations from two layers of the neural network are added or multiplied, though some embodiments allow for more than two layers to be combined (e.g., for a replicated layer with multiple replicas) and/or for other operations to be performed. As a typical example, activation values that have the same (x,y,z) coordinate in two different layers are combined. In this case, the two layers will generally have the same dimension sizes in order for element-wise operations to be performed. To use the example illustrated in FIG. 30, the activation values at each (x,y,z) coordinate of layer K are combined with the values at the identical (x,y,z) coordinate of layer K+1 (Note: the indices K represent different entities in FIG. 30 than they do in FIG. 31). According to the activation storage rules of some embodiments described above with reference to FIG. 31, each core used for storing activation values of a particular layer stores all of the activations in a subset of the grids of that particular layer. In addition, when two identically-sized layers are to be combined in an element-wise operation layer, the compiler of some embodiments ensures that the grids of the first layer are stored in the same cores as the corresponding grids of the second layer.

For example, suppose that the activations in grids 0-31 of layer K (shown in FIG. 30) are to be combined with the activations in corresponding grids 0-31 of replica layer K' using an element-wise operation, as described above by reference to FIG. 25. The activations of layer K are stored across four cores 0-3 as shown in FIG. 31, and the activations of layer K' would be stored across the same four cores 0-3, with the same eight grids of activations stored in each of the four cores.

The retrieval of these activations from core memory by the read controller and the provision of this data to the PPUs will now be discussed in detail for this illustrative example. As illustrated in FIGS. 32A-B, the input alu_c is reserved for element-wise operations, with PPUs 0-15 receiving activations from core 0, PPUs 16-31 receiving activations from core 1, PPUs 32-47 receiving activations from core 2, and PPUs 48-63 receiving activations from core 3. Thus, some embodiments use a fixed read block size of 16 for these element-wise operations. Because activations from the same layer do not need to be combined in any way (as they are for dot products or pooling operations), the actual block size of the activations in storage can be ignored in some embodiments. That is, the number of grids stored in each core is inconsequential to these operations, as 16 values from one layer are output from each core in a first cycle and the corresponding 16 values from the next layer are output from each core in the next clock cycle. In this case, the read controller can proceed sequentially through the RAM words in each core, rather than jumping back and forth.

Thus, in the example, the read controller in each core initially reads word K from the core memory, as well as the corresponding RAM word for layer K', and stores these two RAM words in the cache. In some embodiments, while the element-wise operations are being performed on these values, the next words of activations for each layer are also read into the cache. During the first cycle of computation, the read controllers in the various cores provide the first 16 activation values from RAM word K in core 0 {(0,0,0) ... (1,0,28)} to PPUs 0-15, the first 16 activation values from RAM word K in core 1 {(0,0,1) ... (1,0,29)} to PPUs 16-31, the first 16 activation values from RAM word K in core 2 {(0,0,2) ... (1,0,30)} to PPUs 32-47, and the first 16 activation values from RAM word K in core 3 {(0,0,3) ... (1,0,31)} to PPUs 48-63. Each of these PPUs stores this RAM word in its register 2420.

In the subsequent clock cycle, the read controllers in each core provide the corresponding activation values of layer K' from their respective cores to the PPUs. That is, the read controllers of the various cores provide the activation values {(0,0,0) ... (1,0,28)} of layer K' from core 0 to PPUs 0-15, the activation values {(0,0,1) ... (1,0,29)} of layer K' from core 1 to PPUs 16-31, the first activation values {(0,0,2) ... (1,0,30)} of layer K' from core 2 to PPUs 32-47, and the activation values {(0,0,3) ... (1,0,31)} from core 3 to PPUs 48-63. Depending on the configuration data received at the PPUs, each of these PPUs performs the appropriate element-wise operation to combine these values with the corresponding layer K values stored in their respective registers 2420, and provides these values to the additional post-processing operations shown in FIG. 22 (via the multiplexers 2215, configured to select from the ALU input datapaths 2400). In subsequent clock cycles, the next 16 values are output for layer K, which are combined with the corresponding 16 values for layer K', and so on.

Figure 33:
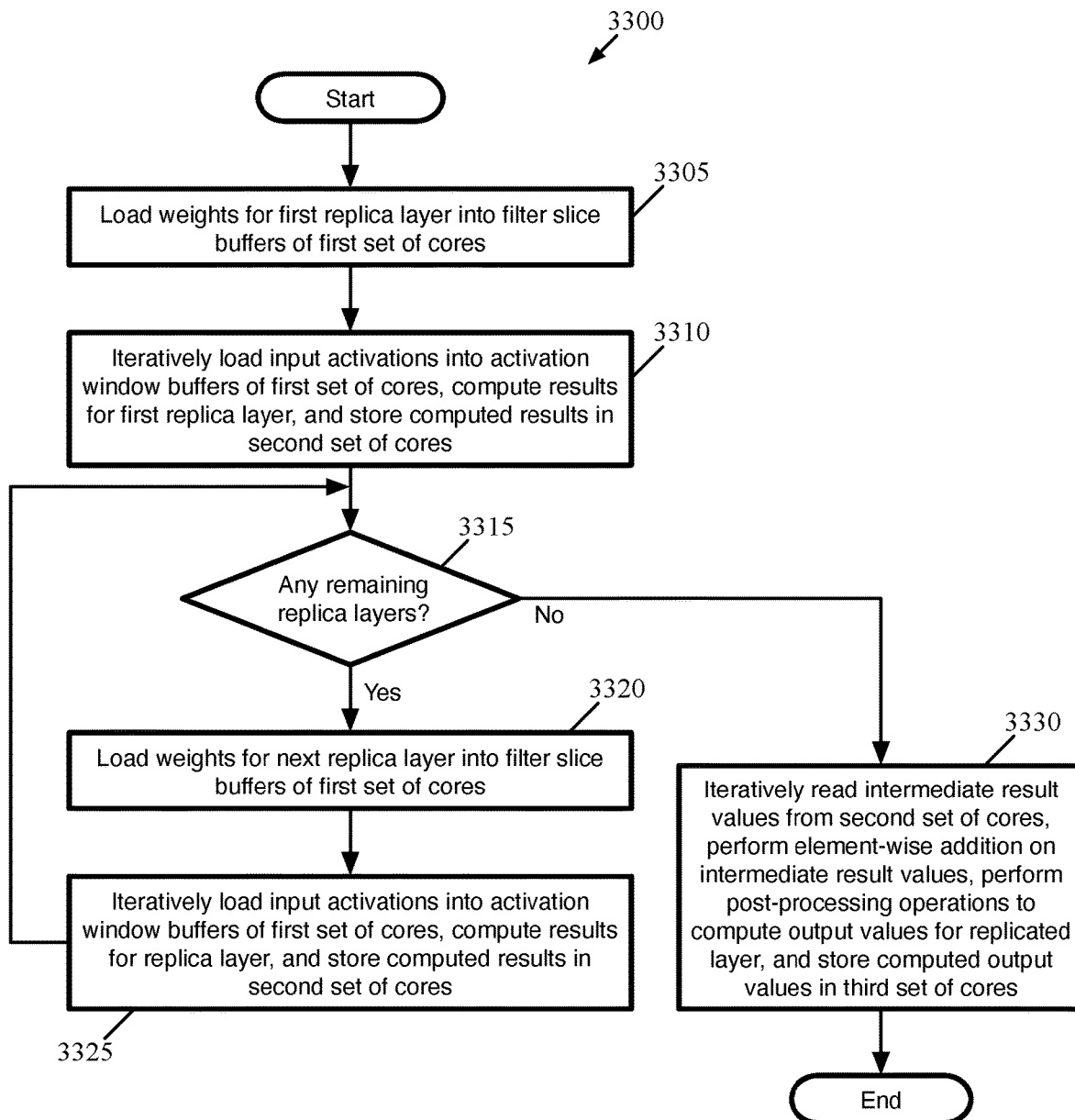
FIG. 33 conceptually illustrates a process of some embodiments for executing a replicated layer on a neural network inference circuit.

Now that the circuits for executing a set of replica layers on a neural network inference circuit of some embodiments have been described, the process for doing so on such a circuit will be elaborated upon. FIG. 33 conceptually illustrates a process 3300 of some embodiments for executing a replicated layer on a neural network inference circuit such as that described herein. The replicated layer of some embodiments includes at least two replica layers with their own sets of weights (e.g., having different weight scales $\alpha_k$, $\alpha_k/3$, $\alpha_k/9$, etc.).

As shown, the process 3300 begins by loading (at 3305) the weights for the first replica layer into the filter slice buffers of a first set of cores. As mentioned, these weights are the set of weights having a scaling factor of $\alpha_k$, but are stored as ternary values {1, 0, −1}. The compiler determines the first set of cores that store these weights (as well as the weights for the other replica layers) and perform all the dot product computations for the replica layers. It should be noted that, while the process 3300 describes the first layer (e.g., with a scale of $\alpha_k$) being executed before the other replica layers, this is not a requirement. Different embodiments execute the less significant layers first, execute the various replica layers in a random order, etc.

Next, the process 3300 iteratively (at 3310) loads the input activations for the replicated layer into the activation window buffers of the first set of cores, computes the results for the first replica layer (using these input activations and the weights loaded into the filter slice buffers), and stores the computed results in a second set of cores. As described above, the read controllers in the first set of cores load a set of input activation values into the activation window buffers of their respective cores. Once these values are loaded, the adder trees in these cores compute partial dot products, which are combined in the dot product bus. These combined dot products are provided to the post-processing units, which perform any scaling and bias that is required. In some embodiments, the scaling and bias factors for the layer are accounted for after the various replica layer outputs are combined. Some such embodiments nevertheless use the adder and multiplier circuits at this point to (i) account for the use of one's complement addition with negative weight values, as described in U.S. patent application Ser. No. 16/457,757, filed Jun. 28, 2019, now issued as U.S. Pat. No. 11,210,586, which is incorporated by reference, as well as (ii) to account for any quantization-related scaling. The outputs of the post-processing units are then stored in the second set of cores, which may be the same as the first set of cores, different than the first set of cores but with overlapping cores, or completely separate from the first set of cores, depending on the decisions made by the compiler. Additional input activations are then loaded into the activation window buffer, the partial dot products are again computed, and the next set of results for the first replica layer are stored in the second set of cores. This set of operations is repeated until the first replica layer is complete.

The process 3300 then determines (at 3315) whether any additional replica layers remain to be computed. If, for example, the layer is a standard convolutional layer with no replica layers, then the process does not need to perform any of the subsequent operations (i.e., there is no need to compute results for any replica layers, nor is there a need to add the replica layers together with any other layers). On the other hand, if there are two or more replica layers, then some embodiments compute the results for the replica layers until, after the last replica, the corresponding result values from all of the replica layers are added together.

It should be understood that FIG. 33 illustrates a conceptual process, and that neither the neural network inference circuit nor the system controller providing instructions to the circuit actually makes such a determination 3315 in some embodiments. Rather, the compiler defines the layers, source cores, and destination cores, and defines instructions for the chip to execute in order to perform the process 3300 (as part of the overall process of executing the neural network). In addition, the process 3300 is shown for the specific case in which there is at least one replica layer; if there is only a standard (non-replicated) convolutional layer, then this layer would be executed and there would be no need to combine those output values with any other replica layer output values.

Returning to the process 3300, if additional replica layers remain, the process loads (at 3320) the weights for the next replica layer into the filter slice buffers of the first set of cores. As mentioned, these weights are the set of weights having a scaling factor of $\alpha_k/3^x$ (where x indicates the number of the replica), but are stored as ternary values $\{1, 0, -1\}$. The compiler determines the first set of cores that store these weights (which is the same for all of the replica layers) and perform all the dot product computations for the replica layers.

Next, the process 3300 iteratively (at 3325) loads the input activations for the replicated layer into the activation window buffers of the first set of cores, computes the results for the current replica layer (using these input activations and the weights loaded into the filter slice buffers at 3320), and stores the computed results in a second set of cores. As described above, the read controllers in the first set of cores load a set of the input activation values into the activation window buffers of their respective cores. Once these values are loaded, the adder trees in these cores compute partial dot products, which are combined in the dot product bus. These combined dot products are provided to the post-processing units, which perform any scaling and bias that is required. In some embodiments, the scaling and bias factors for the layer are accounted for after the various replica layer outputs are combined. Some such embodiments nevertheless use the adder and multiplier circuits at this point to (i) account for the use of one's complement addition with negative weight values, as described in U.S. patent application Ser. No. 16/457,757, filed Jun. 28, 2019, incorporated by reference above, as well as (ii) to account for any quantization-related scaling. The outputs of the post-processing units are then stored in the second set of cores, which may be the same as the first set of cores, different than the first set of cores but with overlapping cores, or completely separate from the first set of cores, depending on the decisions made by the compiler. Additional input activations are then loaded into the activation window buffer, the partial dot products are again computed, and the next set of results for the current replica layer are stored in the second set of cores. This set of operations is repeated until the current replica layer is complete.

In some embodiments, the cores load the input activations in the same order for the each of the replica layers. This results in the storage of the result values for each of these layers in the same order in the memories of the second set of cores. That is, if a first result value computed from first replica layer filter and particular set of input values is stored in a particular core and particular relative memory location within its respective set of result values, then a second result value computed from the corresponding second replica layer filter and the same particular set of input values is stored in the same particular core and the same particular relative memory location within its own respective set of result values (i.e., the same RAM word relative to the starting point for that layer of result values and same offset within that RAM word).

Once all of the replica layers have been executed, the process 3300 iteratively (at 3330) reads the intermediate result values from the second set of cores, performs element-wise addition on the intermediate result values, performs post-processing operations to compute output values for the replicated layer, and stores computed output values in a third set of cores. As with the convolutional replica layers, this operation involves numerous repeated sub-operations. In some embodiments, as described above, a fixed number (e.g., 16 from each core) of the intermediate result values are output to the post-processing units at a time. In a first clock cycle, this number of result values from the first replica layer are output to the post-processing units from each core in the second set of cores, then the corresponding result values from the second replica layer, and so on for each replica layer in order to combine the corresponding sets of intermediate result values. Once all of the current sets of values are combined, the post-processing units apply the bias, scale, and activation functions to the values in order to compute the output values for the combined layer. These values are, as mentioned, transported to and stored in the third set of cores, which may be the same as or different from both the first and second sets of cores, depending on the compiler decisions. The process 3300 then ends.

It should be noted that process 3300 indicates only one of several different ways to execute a replicated layer. For instance, other embodiments might execute two of the replica convolutional layers, add the intermediate result values from these layers together, execute the next replica convolutional layer and add this layer to the previous two, and so on for each replica layer. Still other embodiments might execute all of the replica convolutional layers, then perform successive separate element-wise operations (e.g., adding the two least significant replicas together in a first element-wise layer, then adding this total to the most significant replica in a subsequent element-wise layer). These options allow for execution on a neural network inference circuit that is limited to only adding together two values in a single element-wise operation. In addition, while all of the convolutional layers are performed by the same first set of cores, and the first two result values that are added together are stored in the same second set of cores, these next result values (i.e., the sum of the first two replica layers) could be stored in a different third set of cores along with the intermediate convolutional results of the next replica layer. That is, each pair of result value sets that is to be added together in an element-wise operation need to be stored in the same set of cores, but not all of the replica layer result value sets need to be stored in this set of cores.

When executing layers on the neural network inference circuit described above, the circuit quantizes the output value after each replica layer and/or element-wise addition operation. For instance, if a particular network uses 4-bit inputs and outputs, then each individual replica layer result value is quantized to four bits. Similarly, if each element-wise addition operation is limited to two layers, then quantization to four bits is performed after each such element-wise operation.

One result of this intermediate result quantization is that replica layers with smaller weight scales (i.e., the $\alpha_k/3$ and/or $\alpha_k/9$ replicas) suffer a larger fractional error due to quantization. In order to minimize this loss of precision, some embodiments apply a scaling factor in the post-processing units to these intermediate results. For instance, some embodiments apply a scaling factor of e.g., 2, or 4 (or ¼ or ½), that effectively acts as a bit-shifting operation (e.g., to change the binary point in the output value), so long as this scaling factor is cancelled by a subsequent operation. In some embodiments, when the outputs of the replicas are summed, the math circuit that performs the element-wise operations performs any necessary un-scaling (e.g., by again bit-shifting to move the binary point) before computing the sum. In addition, if any scaling factors remain after summation of the intermediate values, this can be factored into the scaling factor in the post-processing unit or using the right bitshift circuit that is applied prior to quantization and the activation function.

An example implementation of a replicated layer that includes three replica layers (scaling factors of $\alpha_k$, $\alpha_k/3$ and $\alpha_k/9$, respectively) will now be described. First, the circuit executes a first convolutional layer using the input activation values, with a scaling factor of $\alpha_k$ and the first replica layer ternary weight values, to compute a first set of intermediate results. For this layer and the subsequent two convolutional layers, no activation function is applied (though batch normalization parameters may be applied), in some embodiments. In addition, these first set of intermediate result values are output with 2.2 precision (i.e., two bits before and two bits after the binary point).

Next, the circuit executes a second convolutional layer using the same input activation values, with a scaling factor of $\alpha_k/3$ and the second replica layer ternary weight values, to compute a second set of intermediate results. In this case, the intermediate result values are output with 1.3 precision (i.e., one bit before and three bits after the binary point), which is equivalent to scaling by a factor of 2 before quantization. Because this factor of two is applied to values that are scaled by $\alpha_k/3$, there is no worry of overflow due to this scaling factor (in fact, there is less overflow possibility than for the first replica layer). As with the first replica layer, no activation function is used, but batch normalization parameters (e.g., shift/scale) may be applied.

The circuit then executes a third convolutional layer again using the same input activation values, with a scaling factor of $\alpha_k/9$ and the third replica layer ternary weight values, to compute a third set of intermediate results. These intermediate result values are also output with 1.3 precision, which allows for the circuit to maintain one extra bit of precision for these two sets of intermediate values. In this case, with only three replica layers, there is no need to multiply by 4 or 8. However, if there is a fourth replica with a scale factor of $\alpha_k/27$, some embodiments scale these two layers by a larger factor (with the replica layer scaling factor of $\alpha_k/9$ and $\alpha_k/27$, there is not a worry of overflow).

With the three convolutional layers executed, the circuit executes an element-wise addition layer that adds the latter two sets of intermediate results (i.e., the results for the two replica layers) to compute partial sums. Some embodiments leave these partial sums with 1.3 precision (noting that the partial sums are again quantized to four bits).

Lastly, the circuit executes another element-wise addition layer between the first set of intermediate result values (from the first replica convolutional layer) and the partial sums from the first element-wise addition. To account for the difference in precision, some embodiments scale the first replica layer intermediate results by a factor of two before computing the sums (the internal computations in the post-processing circuits allow more than 4 bits, so data is not lost via this scaling). In some embodiments, the ALU input processing circuit can scale its inputs by a factor of 2 or 4, which is used to scale these inputs. The partial sum is scaled by ½, e.g. using the multiplier or the bit-shift circuit in the post-processing datapath shown in FIG. 22. At this point, any activation function (e.g., a ReLU, etc.) is applied, and the output values for the replicated layer are again quantized to 4 bits.

V. Electronic Device Incorporating Inference Circuit

Such a neural network inference circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the neural network inference circuit to be executed on the device. These devices can include mobile devices, desktop computers, Internet of Things (IoT) devices), etc.

Figure 34:
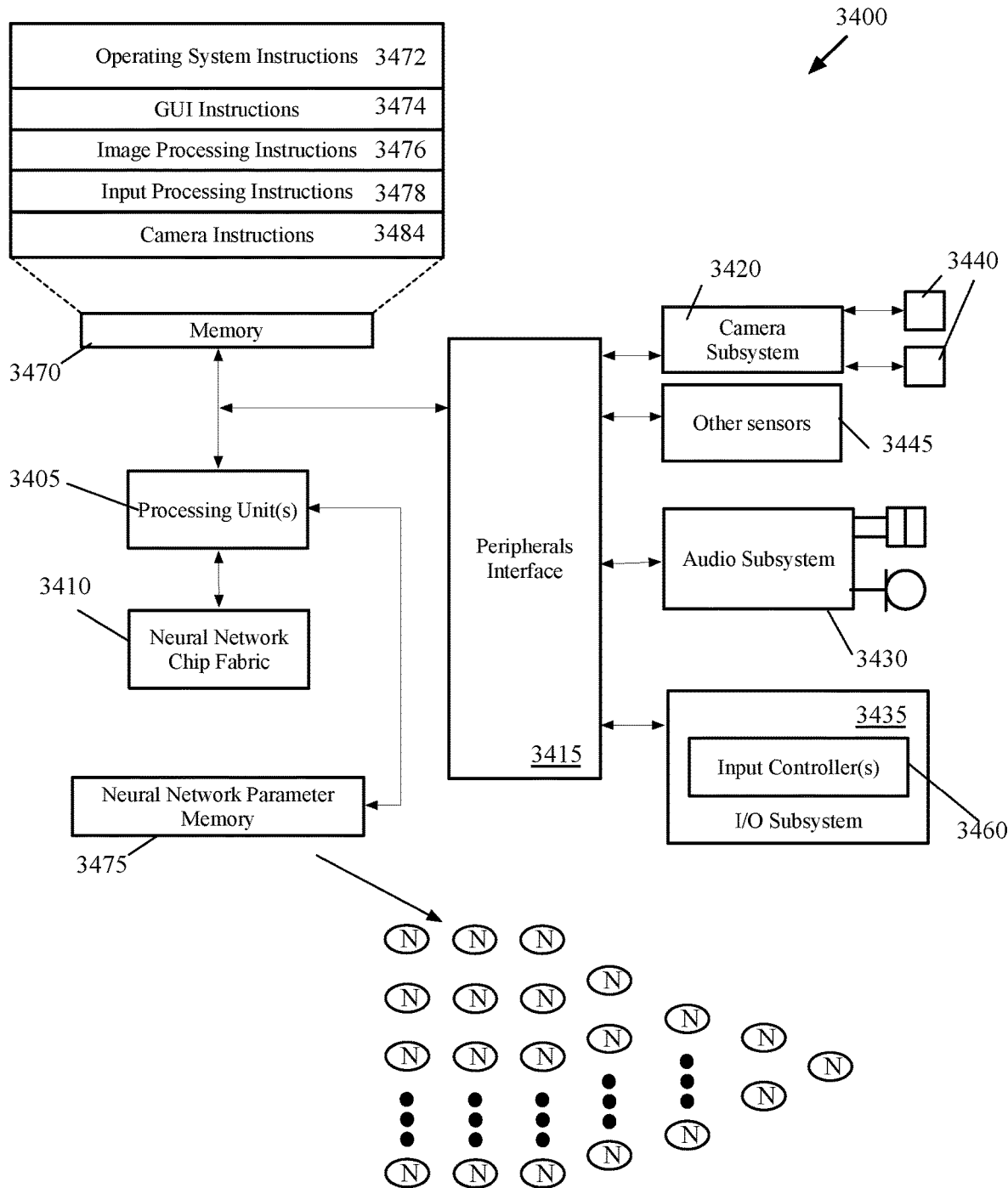
FIG. 34 illustrates an example of the architecture of a mobile computing device that stores neural network processing instructions.

FIG. 34 is an example of an architecture 3400 of an electronic device that includes a neural network integrated circuit of some embodiments. The electronic device may be a mobile computing device such as a smartphone, tablet, laptop, etc., or may be another type of device (e.g., an IoT device, a personal home assistant). As shown, the device 3400 includes one or more general-purpose processing units 3405, a neural network chip fabric 3410, and a peripherals interface 3415.

The peripherals interface 3415 is coupled to various sensors and subsystems, including a camera subsystem 3420, an audio subsystem 3430, an I/O subsystem 3435, and other sensors 3445 (e.g., motion/acceleration sensors), etc. The peripherals interface 3415 enables communication between the processing units 3405 and various peripherals. For example, an orientation sensor (e.g., a gyroscope) and an acceleration sensor (e.g., an accelerometer) can be coupled to the peripherals interface 3415 to facilitate orientation and acceleration functions. The camera subsystem 3420 is coupled to one or more optical sensors 3440 (e.g., charged coupled device (CCD) optical sensors, complementary metal-oxide-semiconductor (CMOS) optical sensors, etc.).

The camera subsystem 3420 and the optical sensors 3440 facilitate camera functions, such as image and/or video data capturing.

The audio subsystem 3430 couples with a speaker to output audio (e.g., to output voice navigation instructions). Additionally, the audio subsystem 3430 is coupled to a microphone to facilitate voice-enabled functions, such as voice recognition, digital recording, etc. The I/O subsystem 3435 involves the transfer between input/output peripheral devices, such as a display, a touch screen, etc., and the data bus of the processing units 3405 through the peripherals interface 3415. The I/O subsystem 3435 includes various input controllers 3460 to facilitate the transfer between input/output peripheral devices and the data bus of the processing units 3405. These input controllers 3460 couple to various input/control devices, such as one or more buttons, a touch-screen, etc.

In some embodiments, the device includes a wireless communication subsystem (not shown in FIG. 34) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 34, a memory 3470 (or set of various physical storages) stores an operating system (OS) 3472. The OS 3472 includes instructions for handling basic system services and for performing hardware dependent tasks. The memory 3470 also stores various sets of instructions, including (1) graphical user interface instructions 3474 to facilitate graphic user interface processing; (2) image processing instructions 3476 to facilitate image-related processing and functions; (3) input processing instructions 3478 to facilitate input-related (e.g., touch input) processes and functions; and (4) camera instructions 3484 to facilitate camera-related processes and functions. The processing units 3405 execute the instructions stored in the memory 3470 in some embodiments.

The memory 3470 may represent multiple different storages available on the device 3400. In some embodiments, the memory 3470 includes volatile memory (e.g., high-speed random access memory), non-volatile memory (e.g., flash memory), a combination of volatile and non-volatile memory, and/or any other type of memory.

The instructions described above are merely exemplary and the memory 3470 includes additional and/or other instructions in some embodiments. For instance, the memory for a smartphone may include phone instructions to facilitate phone-related processes and functions. An IoT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 3475 stores the weight values, bias parameters, etc. for implementing one or more machine-trained networks by the neural network chip fabric 3410. In some embodiments, different clusters of the fabric 3410 can implement different machine-trained networks in parallel in some embodiments. In different embodiments, these neural network parameters are stored on-chip (i.e., in memory that is part of the neural network chip fabric 3410) or loaded onto the IC 3410 from the neural network parameter memory 3475 via the processing unit(s) 3405.

While the components illustrated in FIG. 34 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 3405 and the neural network IC 3410, which enables the processing units 3405 to provide inputs to the neural network IC 3410 and receive the outputs of the network from the IC 3410. Also, while many of the functions have been described as being performed by one component, one of ordinary skill in the art will realize that the functions described with respect to FIG. 34 may be split into two or more separate components.

VI. Electronic System

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 35:
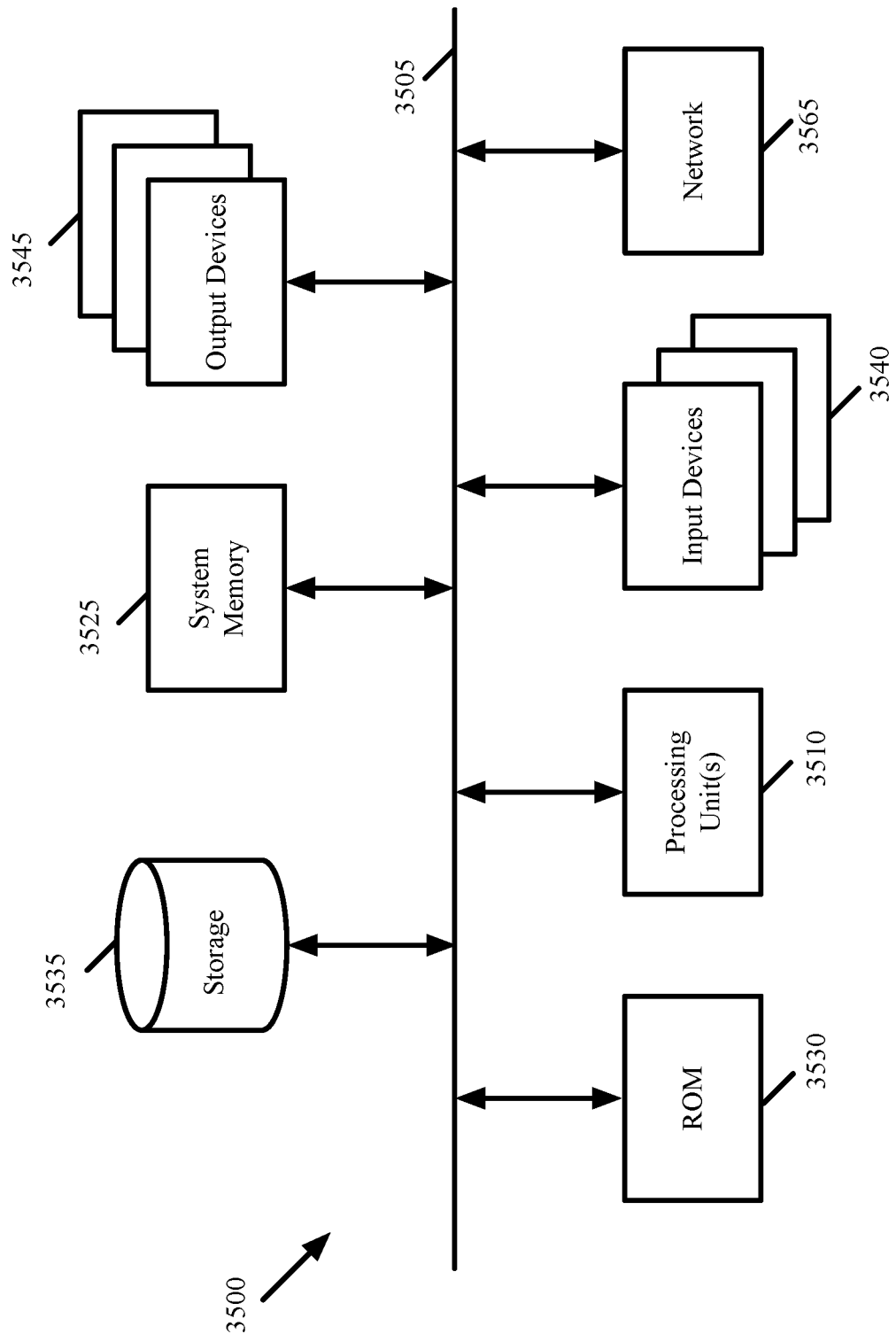
FIG. 35 conceptually illustrates an electronic system with which some embodiments of the invention are implemented.

FIG. 35 conceptually illustrates an electronic system 3500 with which some embodiments of the invention are implemented. The electronic system 3500 can be used to execute any of the applications (e.g., the training application) described above. The electronic system 3500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 3500 includes a bus 3505, processing unit(s) 3510, a system memory 3525, a read-only memory 3530, a permanent storage device 3535, input devices 3540, and output devices 3545.

The bus 3505 collectively represents all system, peripheral, and chipset buses that communicatively connect the numerous internal devices of the electronic system 3500.

For instance, the bus 3505 communicatively connects the processing unit(s) 3510 with the read-only memory 3530, the system memory 3525, and the permanent storage device 3535.

From these various memory units, the processing unit(s) 3510 retrieves instructions to execute and data to process in order to execute the processes of the invention. The processing unit(s) may be a single processor or a multi-core processor in different embodiments, and may include generic CPUs as well as graphics processing units (GPUs).

The read-only-memory (ROM) 3530 stores static data and instructions that are needed by the processing unit(s) 3510 and other modules of the electronic system. The permanent storage device 3535, on the other hand, is a read-and-write memory device. This device is a non-volatile memory unit that stores instructions and data even when the electronic system 3500 is off. Some embodiments of the invention use a mass-storage device (such as a magnetic or optical disk and its corresponding disk drive) as the permanent storage device 3535.

Other embodiments use a removable storage device (such as a floppy disk, flash drive, etc.) as the permanent storage device. Like the permanent storage device 3535, the system memory 3525 is a read-and-write memory device. However, unlike storage device 3535, the system memory is a volatile read-and-write memory, such a random-access memory. The system memory stores some of the instructions and data that the processor needs at runtime. In some embodiments, the invention's processes are stored in the system memory 3525, the permanent storage device 3535, and/or the read-only memory 3530. From these various memory units, the processing unit(s) 3510 retrieves instructions to execute and data to process in order to execute the processes of some embodiments.

The bus 3505 also connects to the input and output devices 3540 and 3545. The input devices enable the user to communicate information and select commands to the electronic system. The input devices 3540 include alphanumeric keyboards and pointing devices (also called "cursor control devices"). The output devices 3545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 35, bus 3505 also couples electronic system 3500 to a network 3565 through a network adapter (not shown). In this manner, the computer can be a part of a network of computers (such as a local area network ("LAN"), a wide area network ("WAN"), or an Intranet), or a network of networks, such as the Internet. Any or all components of electronic system 3500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 3, 28, and 33) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for training a plurality of parameters of a machine-trained (MT) network comprising a plurality of layers of processing nodes, the plurality of parameters subject to a sparsity constraint that requires a threshold portion of the parameters to be equal to zero, wherein a first set of the parameters subject to the sparsity constraint are grouped into groups of parameters, the method comprising:

adjusting values of the plurality of parameters by (i) propagating a plurality of training inputs through the plurality of layers of the MT network to generate network outputs, (ii) calculating a value of a loss function based at least in part on differences between the generated network outputs and expected network outputs, and (iii) using the calculated loss function value to modify the values of the first set of parameters and a second set of the parameters subject to the sparsity constraint;

for each parameter of the second set of the parameters subject to the sparsity constraint, determining an accuracy penalty associated with the parameter being set to zero from the adjusted value for the parameter, wherein (i) the parameters are organized by the layers of the MT network, (ii) each parameter has a set of allowed values to which the parameter can be set, (iii) for all parameters, the set of allowed values includes the value zero, and (iv) the sets of allowed values are the same for all parameters within a respective layer of the MT network; for each group of parameters in the first set of parameters, determining a minimum accuracy penalty for each possible number of parameters in the group being set to zero from the adjusted values for the parameters; and using the determined accuracy penalties to set to the value zero at least the threshold portion of the plurality of adjusted parameters such that the MT network fulfills the sparsity constraint to be executable on a particular type of limited-memory neural network inference circuit having sparsity requirements based on the neural network inference circuit using less memory for parameters set to the value zero than for parameters set to non-zero values.

2. The method of claim 1, wherein the accuracy penalty for each parameter in the second set of parameters is based on an estimated loss in accuracy of predictiveness of the MT network for setting the parameter to zero from the adjusted value for the parameter as compared to setting the parameter to a different one of the allowed values for the parameter.

3. The method of claim 2, wherein using the determined accuracy penalties comprises setting to zero each of the adjusted parameters in the second set of parameters for which the estimated loss in accuracy for setting the parameter to zero from the adjusted value for the parameter is less than the estimated loss in accuracy for setting the parameter to any of the other allowed values for the parameter.

4. The method of claim 1, wherein the accuracy penalty for each parameter in the second set of parameters is based on a distance between a trained floating-point value for the parameter and the value zero.

5. The method of claim 1, wherein each group of parameters within the first set of parameters comprises one parameter from each layer of a group of corresponding replica layers.

6. A method for training a plurality of parameters of a machine-trained (MT) network comprising a plurality of layers of processing nodes, the plurality of parameters subject to a sparsity constraint that requires a threshold portion of the parameters to be equal to zero, wherein (i) a first set of the parameters subject to the sparsity constraint are grouped into groups of parameters, (ii) each parameter has a set of allowed values to which the parameter can be set, and (iii) for all parameters, the set of allowed values includes the value zero, the method comprising:

adjusting values of the plurality of parameters by (i) propagating a plurality of training inputs through the plurality of layers of the MT network to generate network outputs, (ii) calculating a value of a loss function based at least in part on differences between the generated network outputs and expected network outputs, and (iii) using the calculated loss function value to modify the values of the first set of parameters and a second set of the parameters subject to the sparsity constraint;

for each parameter of the second set of the parameters subject to the sparsity constraint, determining an accuracy penalty associated with the parameter being set to zero from the adjusted value for the parameter;

for each group of parameters in the first set of parameters, determining a minimum accuracy penalty for each possible number of parameters in the group being set to zero from the adjusted values for the parameters, wherein, for a particular group of parameters, said determining comprises:

determining each possible configuration of allowed values assigned to the particular group of parameters;

computing an accuracy penalty for each possible configuration of allowed values;

for each possible number of parameters in the particular group being set to zero from the adjusted values for the parameters, identifying the possible configuration of allowed values with the minimum computed accuracy penalty; and using the determined accuracy penalties to set to the value zero at least the threshold portion of the plurality of adjusted parameters such that the MT network fulfills the sparsity constraint to be executable on a particular type of limited-memory neural network inference circuit having sparsity requirements based on the neural network inference circuit using less memory for parameters set to the value zero than for parameters set to non-zero values.

7. The method of claim 6, wherein the parameters are organized by the layers of the MT network, wherein the sets of allowed values are the same for all parameters within a respective layer of the MT network.

8. The method of claim 7, wherein each group of parameters within the first set of parameters comprises one parameter from each layer of a group of corresponding replica layers.

9. The method of claim 6, wherein two or more possible configurations of allowed values exist for at least one of the possible numbers of parameters in the particular group being set to zero.

10. The method of claim 6, wherein using the determined accuracy penalties comprises setting to zero all adjusted parameters in any group for which the configuration with the lowest computed accuracy penalty is for all parameters in the group to be set to zero.

11. The method of claim 6, wherein the accuracy penalty for each parameter in the second set of parameters is based on a distance between a trained floating-point value for the parameter and the value zero.

12. A non-transitory machine-readable medium storing a program which when executed by at least one processing unit trains a plurality of parameters of a machine-trained (MT) network comprising a plurality of layers of processing nodes, the plurality of parameters subject to a sparsity constraint that requires a threshold portion of the parameters to be equal to zero, wherein a first set of the parameters subject to the sparsity constraint are grouped into groups of parameters, the program comprising sets of instructions for:

adjusting values of the plurality of parameters by (i) propagating a plurality of training inputs through the plurality of layers of the MT network to generate network outputs, (ii) calculating a value of a loss function based at least in part on differences between the generated network outputs and expected network outputs, and (iii) using the calculated loss function value to modify the values of the first set of parameters and a second set of the parameters subject to the sparsity constraint;

determining, for each parameter of the second set of the parameters subject to the sparsity constraint, an accuracy penalty associated with the parameter being set to zero from the adjusted value for the parameter, wherein (i) the parameters are organized by the layers of the MT network, (ii) each parameter has a set of allowed values to which the parameter can be set, (iii) for all parameters, the set of allowed values includes the value zero, and (iv) the sets of allowed values are the same for all parameters within a respective layer of the MT network;

determining, for each group of parameters in the first set of parameters, a minimum accuracy penalty for each possible number of parameters in the group being set to zero from the adjusted values for the parameters; and using the determined accuracy penalties to set to the value zero at least the threshold portion of the plurality of adjusted parameters such that the MT network fulfills the sparsity constraint to be executable on a particular type of limited-memory neural network inference circuit having sparsity requirements based on the neural network inference circuit using less memory for parameters set to the value zero than for parameters set to non-zero values.

13. The non-transitory machine-readable medium of claim 12, wherein the accuracy penalty for each parameter in the second set of parameters is based on an estimated loss in accuracy of predictiveness of the MT network for setting the parameter to zero from the adjusted value for the parameter as compared to setting the parameter to a different one of the allowed values for the parameter.

14. The non-transitory machine-readable medium of claim 13, wherein the set of instructions for using the determined accuracy penalties comprises a set of instructions for setting to zero each of the adjusted parameters in the second set of parameters for which the estimated loss in accuracy for setting the parameter to zero from the adjusted value for the parameter is less than the estimated loss in accuracy for setting the parameter to any of the other allowed values for the parameter.

15. The non-transitory machine-readable medium of claim 12, wherein each group of parameters within the first set of parameters comprises one parameter from each layer of a group of corresponding replica layers.

16. The non-transitory machine-readable medium of claim 12, wherein the set of instructions for determining the minimum accuracy penalty for each possible number of parameters in a particular group of parameters being set to zero from the adjusted values for the parameters comprises sets of instructions for:

determining each possible configuration of allowed values assigned to the particular group of parameters;

computing an accuracy penalty for each possible configuration of allowed values; and identifying, for each possible number of parameters in the particular group being set to zero from the adjusted values for the parameters, the possible configuration of allowed values with the minimum computed accuracy penalty.

17. The non-transitory machine-readable medium of claim 16, wherein two or more possible configurations of allowed values exist for at least one of the possible numbers of parameters in the particular group being set to zero.

18. The non-transitory machine-readable medium of claim 16, wherein the set of instructions for using the determined accuracy penalties comprises a set of instructions for setting to zero all adjusted parameters in any group for which the configuration with the lowest computed accuracy penalty is for all parameters in the group to be set to zero.

19. The non-transitory machine-readable medium of claim 12, wherein the accuracy penalty for each parameter in the second set of parameters is based on a distance between a trained floating-point value for the parameter and the value zero.

* * * * *